(12) United States Patent
Thomas

(10) Patent No.: US 10,810,110 B1
(45) Date of Patent: Oct. 20, 2020

(54) METHODS, SYSTEMS, AND ARTICLES OF MANUFACTURE FOR TESTING WEB SERVICES USING A BEHAVIOR-DRIVEN DEVELOPMENT DOMAIN SPECIFIC LANGUAGE FRAMEWORK

(71) Applicant: INTUIT INC., Mountain View, CA (US)

(72) Inventor: Peter Thomas, Bagalore (IN)

(73) Assignee: INTUIT INC., Mountain View, CA (US)

(*) Notice: Subject to any disclaimer, the term of this patent is extended or adjusted under 35 U.S.C. 154(b) by 177 days.

(21) Appl. No.: 15/880,413

(22) Filed: Jan. 25, 2018

(51) Int. Cl.
*G06F 11/00* (2006.01)
*G06F 11/36* (2006.01)

(52) U.S. Cl.
CPC ...... *G06F 11/3664* (2013.01); *G06F 11/3684* (2013.01); *G06F 11/3688* (2013.01)

(58) Field of Classification Search
CPC ............ G06F 11/3664; G06F 11/3684; G06F 11/3688
USPC ...................................................... 714/38.1
See application file for complete search history.

(56) References Cited

U.S. PATENT DOCUMENTS

| | | | | |
|---|---|---|---|---|
| 10,521,612 | B2 * | 12/2019 | Arad | G06F 21/629 |
| 2002/0129001 | A1 * | 9/2002 | Levkoff | G06F 30/13 |
| 2005/0251863 | A1 * | 11/2005 | Sima | G06F 21/577 |
| | | | | 726/25 |
| 2007/0010975 | A1 * | 1/2007 | Fine | G06F 30/3323 |
| | | | | 703/2 |
| 2008/0209451 | A1 * | 8/2008 | Michels | G06F 9/54 |
| | | | | 719/328 |
| 2010/0306595 | A1 * | 12/2010 | Murata | G06F 11/3688 |
| | | | | 714/39 |
| 2013/0097307 | A1 * | 4/2013 | Vazac | G06F 11/3414 |
| | | | | 709/224 |
| 2016/0299936 | A1 * | 10/2016 | Chavda | H04L 67/02 |

OTHER PUBLICATIONS

"Data-driven testing", URL=https://en.wikipedia.org/wiki/Data-driven_testing, Aug. 3, 2016, Accessed on Dec. 28, 2017.
Scott Davis, "Mocking Web Services: How do you test online services . . . when you're not online?", Oct. 2006.
"Domain-specific language", URL=https://en.wikipedia.org/wiki/Domain-specific_language, Dec. 4, 2017, Accessed on Dec. 29, 2017.

(Continued)

*Primary Examiner* — Yair Leibovich
(74) *Attorney, Agent, or Firm* — DLA Piper LLP (US)

(57) ABSTRACT

Various aspects described herein relate to a method and system for testing software products or services using a behavior-driven development domain specific language (DSL) framework. The framework identifies one or more input payloads for testing a software product or service that comprises a Web service, wherein the software product or service operates on one or more application servers and normalizes data or information, at the test framework, in at least the one or more input payloads into normalized data or information. The framework recursively tests one or more components of the software product or service and generates results of testing the one or more components of the software product or service.

28 Claims, 39 Drawing Sheets

(56) References Cited

OTHER PUBLICATIONS

"JUnit", URL=https://en.wikipedia.org/wiki/JUnit, Nov. 17, 2017, Accessed on Dec. 29, 2017.
"Karate: Web-Services Testing Made Simple", URL=https://github.com/intuit/karate, Apr. 2017, Accessed on Jan. 25, 2018.
"List of web service frameworks", URL: https://en.wikipedia.org/wiki/List_of_web_service_frameworks, Jun. 9, 2017, Accessed on Dec. 29, 2017.
"Payload (computing)", URL: https://en.wikipedia.org/wiki/Payload_(computing), Dec. 30, 2017, Accessed on Jan. 1, 2018.
"TestNG", URL: http://testng.org/doc/, Dec. 19, 2017, Apr. 27, 2004, Accessed on Dec. 29, 2017.
"Karate: Estimated Cost", URL: https://www.openhub.net/p/karate/estimated_cost, Dec. 29, 2017, Accessed on Jan. 25, 2018.
"Rest Assured: Estimated Cost", URL: https://www.openhub.net/p/rest-assured/estimated_cost, Jan. 8, 2018, Accessed on Jan. 25, 2018.
"Web service", URL: https://en.wikipedia.org/wiki/Web_service, Nov. 11, 2017, Accessed on Jan. 1, 2018.
"Cucumber (software)", https://en.wikipedia.org/wiki/Cucumber_(software), Sep. 14, 2017, Accessed on Dec. 31, 2017.

\* cited by examiner

242D COMPARE MULTIPLE PAYLOADS FOR EQUALITY WHILE IGNORING A PORTION OF THE PAYLOAD

244D PROVIDE BUILT-IN, NATIVE FUNCTIONALITY FOR VALIDATING DATA-TYPE, CONDITIONAL-LOGIC, AND REGULAR EXPRESSIONS (REGEX)

246D VALIDATE SCHEMA OF ALL ELEMENTS IN A JSON ARRAY IN ONE STEP BY USING THE "MATCH" KEYWORD MODIFIED BY THE "EACH" MODIFIER

248D VALIDATE JSON AND/OR XML SCHEMA USING BUILT-IN VALIDATION SUPPORT WITH OPTIONAL JAVA INTEROP TO ADD JAVA LIBRARIES

250D PROVIDE NATIVE SYNTAX SUPPORT FOR COMPOSING JSON AND XML IN TESTS WITHOUT REQUIRING DOUBLE QUOTES OR ESCAPE CHARACTERS

252D PROVIDE SIMPLIFIED ASSERTIONS AND BUILT-IN MATCHING FUNCTIONALITY WITHOUT REQUIRING PLACEHOLDERS FOR SPECIFYING PATH PARAMETERS

254D SIMPLIFY TEST GENERATION BY ELIMINATING UNNECESSARY SYMBOLS, PUNCTUATIONS, OR INDENTATIONS

256D EXTRACT MULTIPLE DATA ELEMENTS (JSON CHUNKS, ARRAYS, ETC.) FOR REUSE IN SUBSEQUENT HTTP CALLS BY USING JSONPATH FOR JSON ELEMENTS OR XPATH FOR XML ELEMENTS

258D TEST THE WEB SERVICES WITH DATA DRIVEN TESTING WITHOUT USING 3$^{RD}$ PARTY TEST FRAMEWORK

FIG. 2F

260D  Update JSON, Nested JSON, XML in Payloads during Data Driven Testing by Using Path, Embedded Expressions, or Built-in String Replacement Keyword 262D  Modify A Response during Testing into A Modified Response and Reuse the Modify Response as the Next Request 264D  Provide Native Support for Messaging Protocol(s)

266D  Perform Web Service Testing without Requiring Certificates for HTTPS or SSL 268D  Provide Built-in, Native Support for Switching Environment Configurations by Editing the config.js File without Using Dependency Injection Framework or Equivalents for Reading Property Files 270D  Provide Extensible, Custom Authentication without Compilation 272D  Test HTTP Integration Tests, Unit Tests, Etc. for Web Services with Multi-Threading in Parallel 274D  Perform Auto Conversion for Numeric Assertions without Always Converting to Float 276D  Provide Built-in Test Reports without Using 3RD Party Test Frameworks

FIG. 2G

278D TEST JAVA SERVLETS, HTTP RESOURCE WHILE SUPPORT JAX-RS, CUSTOM SERVLETS, CONTROLLERS, ETC. BY USING AT LEAST PLUGGABLE HTTP CLIENTS WITHOUT REQUIRING A CONTAINER OR APPLICATION SERVER & WITHOUT HARD CODING THE TESTS

280D GENERATE TEST REPORT INCLUDING HTTP REQUEST(S) AND RESPONSE LOGS IN-LINE

282D CONSTRUCT JSON OR XML FROM SCRATCH USING ONLY PATH EXPRESSIONS VIA THE "SET" KEYWORD

FIG. 2H

```
package com.intuit.karate.demo.domain;

import java.util.ArrayList;
import java.util.List;

public class Cat { private int id;
    private String name;
    private List<Cat> kittens;

public void addKitten(Cat kitten) {
        if (kittens == null) {
            kittens = new ArrayList<>();
        }
        kittens.add(kitten);
    } public int getId() {
        return id;
    } public void setId(int id) {
        this.id = id;
    } public String getName() {
        return name;
    } public void setName(String name) {
        this.name = name;
    } public List<Cat> getKittens() {
        return kittens;
    } public void setKittens(List<Cat> kittens) {
        this.kittens = kittens;
    }

```
Cat billie = new Cat();
billie.setName("Billie");
Cat bob = new Cat();
bob.setId(23);
bob.setName("Bob");
billie.addKitten(bob);
Cat wild = new Cat();
wild.setId(42);
wild.setName("Wild");
billie.addKitten(wild);
```

```
boolean found = false;
if (billie.getKittens() != null) {
    for (Cat kitten : billie.getKittens()) {
        if (kitten.getId() == 42 && "Wild".equals(kitten.getName())) {
            found = true;
        }
    }
}
assertTrue(found);
```

```
private static boolean hasKitten(Cat cat, Cat kitten) {
    if (cat.getKittens() != null) {
        for (Cat kit : cat.getKittens()) {
            if (kit.getId() == kitten.getId()) {
                if (kit.getName() == null) {
                    if (kitten.getName() == null) {
                        return true;
                    }
                } else if (kit.getName().equals(kitten.getName())) {
                    return true;
                }
            }
        }
    }
    return false;
}
```

* def billie =
"""
{
  name: 'Billie',
  kittens: [
      { id: 23, name: 'Bob' },
      { id: 42, name: 'Wild' }
  ]
}
"""
                                                302D
                                                              304D
* match billie.kittens contains { id: 42, name: 'Wild' }

* match billie.kittens contains { id: '#? _ > 25', name: '#string' }
```

| Type | Directive |
|---|---|
| Ignore / Exists | #ignore \| #null \| #notnull |
| Primitive Type | #boolean \| #number \| #string |
| Complex Type | #array \| #object |
| Special | #uuid |
| RegEx | #regex <regex string> |
| Predicate | #? <expression> |

304E

```
Given def cat =
"""
{
  name: 'Billie',
  kittens: [
      { id: 23, name: 'Bob' },
      { id: 42, name: 'Wild' }
  ]
}
"""
```

FIG. 3E

```
Then match cat.kittens[*].id == [23, 42]
Then match cat.kittens[*].id contains 23
Then match cat.kittens[*].id contains [42, 23]
Then match each cat.kittens contains { id: '#number' }
Then match each cat.kittens == { id: '#notnull', name: '#regex [A-Z][a-z]+' }

* def isLessThanFifty = function(x) { return x < 50 }
Then match each cat.kittens contains { id: '#? isLessThanFifty(_)' }
```

FIG. 3F

| Type | Directive |
|---|---|
| Replace | #(<expression>) |

FIG. 3G

```
Given def foo = 42
And def bar = { hello: 'world' }
And def temp = { id: '#(foo)', value: '#(bar.hello)' }
Then match temp == { id: 42, value: 'world' }

Given def temperature = { celsius: 100, fahrenheit: 212 }
Then match temperature contains { fahrenheit: '#(5.celsius * 1.8 + 32)' }
```

FIG. 3H

```
* def foo =
"""
<records>
   <record index="1">a</record>
   <record index="2">b</record>
   <record index="3" foo="bar">c</record>
</records>
"""

# json style
* assert foo.records.record.length == 3 xpath assertions
* match foo count(/records//record) == 3
* match foo //record[@index=2] == 'b'
* match foo //record[@foo='bar'] == 'c'
```

FIG. 3I

```
* def foo = [{ a: 1, b: 'x' }, { a: 2, b: 'y' }]

* def exact = { a: '#number', b: '#string' }
* def partial = { a: '#number' }
* def nope = { c: '#boolean' }

* def reversed = [{ a: 2, b: 'y' }, { b: 'x', a: 1 }]
* def first = { a: 1, b: 'x' }
* def others = [{ a: 3, b: 'u' }, { a: 4, b: 'y' }]
```

```
@Test public void
lotto_resource_returns_200_with_expected_id_and_winners() { when().
    get("/lotto/{id}", 5).
  then().
    statusCode(200).
      body("lotto.lottoId", equalTo(5),
      "lotto.winners.winnerId", containsOnly(23, 54));

given().
    param("key1", "value1").
    param("key2", "value2").
  when().
    get("/somewhere").
  then().
    body(containsString("OK"));
```

FIG. 4A

```
Scenario: lotto resource returns 200 with expected id and
winners

Given path 'lotto', 5
When method get
Then status 200
And match $.lotto.lottoId == 5
And match $.lotto.winners[*].winnerId contains only [23,
54]

Given param key1 = 'value1'
And param key2 = 'value2'
And path 'somewhere'
When method get
Then response contains 'OK'
```

FIG. 4B

```
package com.ontestautomation.restassured.workshop.answers;

import static io.restassured.RestAssured.*;
import static org.hamcrest.Matchers.*;
import io.restassured.RestAssured;

import org.testng.annotations.BeforeClass;
import org.testng.annotations.DataProvider;
import org.testng.annotations.Test;

public class RestAssuredAnswers2 {

@BeforeClass
    public void initPath() {
        RestAssured.baseURI = "http://localhost:8080";
    }

@DataProvider(name = "circuits")
    public String[][] createCircuitData() {
        return new String[][] {
                { "monza", "Italy" },
                { "spa", "Belgium" },
                { "sepang", "Malaysia" }
        };
    }

@DataProvider(name = "pitstops")
    public Object[][] createPitstopData() {
        return new Object[][] {
                { "1", 1 },
                { "2", 3 },
                { "3", 2 },
                { "4", 2 }
        };
    }

@Test(dataProvider = "circuits")
    public void checkCountryForCircuit(String circuitName, String circuitCountry) {
        given().
            pathParam("circuitName", circuitName).
        when().
            get("/api/f1/circuits/{circuitName}.json").
        then().
            assertThat().
            body("MRData.CircuitTable.Circuits.Location[0].country",equalTo(circuitCountry));
    }

@Test(dataProvider = "pitstops")
    public void checkNumberOfPitstopsForMaxVerstappenIn2015(String raceNumber, int numberOfPitstops) {
        given().
            pathParam("raceNumber", raceNumber).
        when().
            get("/api/f1/2015/{raceNumber}/drivers/max_verstappen/pitstops.json").
        then().
            assertThat().
            body("MRData.RaceTable.Races[0].PitStops",hasSize(numberOfPitstops));
    }
}
```

```
@Test(dataProvider = "pitstops")
public void checkNumberOfPitstopsForMaxVerstappenIn2015(String raceNumber, int numberOfPitstops) {
    given().
        pathParam("raceNumber", raceNumber).
    when().
        get("/api/f1/2015/{raceNumber}/drivers/max_verstappen/pitstops.json").
    then().
        assertThat().
        body("mrData.RaceTable.Races[0].PitStops",hasSize(numberOfPitstops));
}
```

FIG. 4E

```
Scenario Outline: given race number, validate number of pitstops for Max Verstappen in 2015

Given path 'api/f1/2015/<race>/drivers/max_verstappen/pitstops.json'
When method get
Then assert response.MRData.RaceTable.Races[0].PitStops.length == <stops>
```

FIG. 4F

| Purpose | REST-assured File Name | REST-assured | Karate | Karate File Name |
|---|---|---|---|---|
| /auth end-point helper | src/main/java/com/restfulbooker/api/api/Auth.java | 18 | | |
| /booking end-point helper | src/main/java/com/restfulbooker/api/api/Booking.java | 35 | | |
| Auth request payload POJO | src/main/java/com/restfulbooker/api/payloads/request/AuthPayload.java | 44 | | |
| Part of Booking request POJO | src/main/java/com/restfulbooker/api/payloads/request/BookingDatesPayload.java | 26 | | |
| Booking request payload POJO | src/main/java/com/restfulbooker/api/payloads/request/BookingPayload.java | 105 | | |
| Auth response payload POJO | src/main/java/com/restfulbooker/api/payloads/response/AuthResponse.java | 19 | | |
| Booking details response POJO | src/main/java/com/restfulbooker/api/payloads/response/BookingDetails.java | 46 | | |
| Part of Booking details POJO | src/main/java/com/restfulbooker/api/payloads/response/BookingDetailsDates.java | 24 | | |
| Booking response payload POJO | src/main/java/com/restfulbooker/api/payloads/response/BookingResponse.java | 29 | | |
| Actual Test | src/test/java/com/restfulbooker/api/ApiTest.java | 85 | 51 | src/test/java/restfulbooker/api-test.feature |
| Date format helper | | | 5 | src/test/java/restfulbooker/new-date.js |
| JUnit test runner | | | 11 | src/test/java/restfulbooker/ApiTest.java |
| | Total lines of code | 431 | 67 | |

FIG. 4H

```
"$schema": http://json-schema.org/draft-04/schema#,
"title": "Product set",
"Type": "array",
"Items": {
  "title": "Product",
  "type": "object",
  "properties": {                                              4021

"id": {
       "description": "The unique identifier for a product",
       "type": "number"
    }                                                          4041

"number": {
       "type": "string",
    }                                                          4061

"price": {
       "type": "number",
       "minimum": 0,
       "exclusiveMinimum": true
    }                                                          4081

"tags": {
       "type": "array",
       "items": {
          "type": "string"
       }
       "minItems": 1,
       "uniqueItems": true
    }                                                          410I
```

FIG. 4I

```
"dimensions":
    "type": "object"
    "properties":
        "length": {
            "type": "number"
        },
        "width": {
            "type": "number"
        },
        "height": {
            "type": "number"
        }
    },
    "required": [
        "length",
        "width",
        "height"
    ]
},                                                              412l
"warehouseLocation": {
    "description": "Coordinates of the warehouse with the product",
    "$ref": "http://json-schema.org/geo"
    }
},
"required": [
"id",
"name",
"price"
"dimensions"
]
}
}                                                               414l
```

FIG. 4J

```
* def warehouseLocation = { latitude: '#number', longitude: '#number' }
* def productStructure =
"""
{
    id: "#number"                                    ← 402K
    name : '#string',                                ← 404K
    price: '$? _ > 0',                               ← 406K
    tags: '##[_ > 0] #string',                       ← 408K
    dimensions: {
        length: '#number',
        width: '#number',        ⎤                   ← 410K
        Height: '#number'        ⎦
    },
    warehouseLocation:  '##(warehouseLocation)'      ← 412K
}
"""
* def json = read( 'products.json' )
* match json == '#[ ] productStructure'              ← 414K
```

```
Scenario: set via table where variable does not exist
  note how the Framework creates parent paths if needed

* set foo
  | path | value   |
  | bar  | 'baz'   |
  | a.b  | 'c'     |
  | fizz | { d: 'e' } |

* match foo == { bar: 'baz', a: { b: 'c' }, fizz: { d: 'e' } }

Scenario: set via table with fancy array paths and multi-dimensional arrays

* set foo
  | path   | value |
  | bar[0] | 'baz' |
  | a[0].b | 'ban' |
  | c[0]   | [1, 2] |
  | c[1]   | [3, 4] |

* match foo == { bar: [ 'baz'], a: [{ b: 'ban' }], c: [[1, 2], [3, 4]] }

Scenario: set via table, and blanks are skipped

* set search
     | path       | 0       | 1      | 2       |
     | name.first | 'John'  | 'Jane' |         |
     | name.last  | 'Smith' | 'Doe'  | 'Waldo' |
     | age        | 20      |        |         |

* match search[0] == { name: { first: 'John', last: 'Smith' }, age: 20 }
  * match search[1] == { name: { first: 'Jane', last: 'Doe' } }
  * match search[2] == { name: { last: 'Waldo' } }
```

FIG. 4L

| | Steps | | | | | Scenarios | | | Features | |
|---|---|---|---|---|---|---|---|---|---|---|
| F3 | 27 | 1 | 0 | 0 | 0 | 28 | 0 | 1 | 1 | t |

← 502C

Feature F3
  Background v                                           654ms
    Steps v
      * url demoBaseUrl                         654ms
  Scenario create kittens and then create parent cat v   712ms
    Steps v
      * call create-two-cates.feature             000ms
      * url demoBaseUrl                         000ms
      Given path 'cats'                         000ms
      And request { name: 'Bob' }         000ms
      When method post                    000ms
        Doc string
          08:10:05.182 DEBUG –
          1 > POST http://127.0.0.1: 58317/cats
          1 > Accept-Encoding: gzip, deflate
          1 > Connection: Keep-Alive
          1 > Content-Length: 14
          1 > Host: 127.0.0.1:58317
          1 > User-Agent: Apache-HttpClient/4.5.3 (Java/1.8.0_112)
          {"name" : "Bob"}

08:10:05.418 DEBUG –
          1 < 200
          1 < Cache-control: no-cache, no-store, max-age=0, must-revalidate
          1 < COnten-Type: application/json; charset=UTF-8
          1 < Date: Tue, 05, Nov 2017 02:40:05 GMT
          1 < Exprires: 0
          1 < Pragma: no-cache

FIG. 5C

METHODS, SYSTEMS, AND ARTICLES OF MANUFACTURE FOR TESTING WEB SERVICES USING A BEHAVIOR-DRIVEN DEVELOPMENT DOMAIN SPECIFIC LANGUAGE FRAMEWORK

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Software applications are generally developed to be consumed by the human beings, where a user sends a request to a software service which in turn returns a response in human readable format. In the modern era of technology if a user would like to build a software application the user does not need to build each and everything from scratch. Many software services are readily available that the user may plug them into the software application and may start providing those services in the software application. Web services allow this type of software implementations and may be called by a software application using, for example, SOAP (Simple Object Access Protocol), REST (Representation State Transfer Architecture), or application protocols for distributed, collaborative, and hypermedia information systems such as the HTTP (Hypertext Transfer Protocol) protocol.

A Web service includes a service provided by an electronic device to another electronic device, communicating with each other via the World Wide Web. In a Web service, the Web technology such as HTTP that is originally designed for human-to-machine communication is utilized for machine-to-machine communication for the purpose of, for example, transferring machine-readable file formats such as XML (Extensible Markup Language) and JSON (JavaScript Object Notation). A Web service may thus describe a standardized way of integrating Web-based applications using the XML, SOAP, WSDL (Web Services Description Language), and UDDI (Universal Description, Discovery, and Integration) open standards over an Internet Protocol backbone. XML is the data format used to contain the data and provide metadata around it, SOAP is used to transfer the data, WSDL is used for describing the services available and UDDI lists what services are available. A Web service may, for example, provide an object-oriented Web-based interface to a database server, utilized for example by another Web server, or by a mobile app, that provides a user interface to the end user. Another common application offered to the end user may be a mashup, where a Web server consumes several Web services at different machines, and compiles the content into one user interface. Web services also provide technologies used to implement highly reusable back-end business logic upon which offerings of products or services of businesses and end-user experiences are built.

Like any other software delivery artifacts, Web services require quality-control and testing (e.g., end-to-end functional testing, unit testing, HTTP integration test, etc.) and even more so because of their foundational nature. Web services testing includes the testing of Web services and its protocols (e.g., SOAP, REST, etc.) To test a Web service, a user may test the Web service manually, create own automation code, and/or use an off-the shelf automation tool like SoapUI.

Conventional solutions for testing Web services depend on programming languages that are not suited to this task. Conventionally, Web service testing tools use Java programming language to, for example, compose tests or test suites despite the fact that Java is not tailored to Web service testing. The extensive use of Java in Web service testing results in unnecessarily large codebase due to, for example, the required use of require POJOs (Plain Old Java Objects) and/or helper code to represent payloads and HTTP endpoints, and the quality of Web service testing consequently suffers, simply because of the friction to compose and maintain tests with these programming languages (e.g., the lack of built-in or native support for JSON, JsonPath, XML, and XPath in conventional approaches). In addition, the tests or test suites written in Java lacks readability and requires programming expertise to even properly understand such tests or test suites, let alone composing such tests. As a result, Web service testing often requires highly skilled programmers with extensive knowledge and experiences in Java programming language and is not for non-programmers or owners of software products or services.

Moreover, conventional Web service testing approaches cannot validate multiple payloads to determine whether these multiple payloads are equal while ignoring one or more smaller portions of the payload(s) during such validations. Conventional approaches also have difficulties in handling complex data elements (e.g., non-primitive data elements, plain strings, numbers, Boolean expressions, nested objects, multiple data elements enclosed between two curly brackets "{ }", etc.) In addition, conventional approaches also lack the ability to report which data element (and/or path) is not as expected during Web service testing and thus often render debugging and troubleshooting much more difficult and require much more computational resources and human capital to properly test and provide the Web services.

Another shortcoming of conventional approaches is the lack of reusability of tests (e.g., HTTP integration tests, unit tests, etc.), functions (e.g., custom functions, user-defined functions, etc.), payload data, custom code (e.g., custom Java code), etc. across multiple tests. When testing Web services involving HTTP Secure (HTTPS), Transport Layer Security (TLS), or Secure Sockets Layer (SSL), conventional approaches also require key-stores, trust-stores, or digital certificates that certify the respective ownership of the public keys by the respective named subjects of the digital certificates and indicate certain expected usages of the keys. Another drawback of conventional approaches is the lack of multi-threading or parallel execution capability and the lack of support for data driven tests (DDTs). Conventional approaches also lack the support for tagging or grouping tests and thus often require the use of third-party software suites such as TestNG or JUnit for such purposes.

Furthermore, conventional Web service testing often requires one or more application servers be operational for testing, for example, controller servlets such as Spring Boot controllers, Spring MVC (Model View Controller), or Jersey JAX-RS (Java Application Programming Interface for RESTful Web Services) resource end-points, etc. For example, conventional approaches require starting, for example, Tomcat, Jetty, Grizzly, etc. application servers to properly perform the aforementioned Web service testing.

Therefore, there exists a need for a method, system, and computer product for testing Web services using a behavior-driven development domain specific language (DSL) framework to address at least the aforementioned challenges.

SUMMARY

Disclosed are various embodiments relating to methods, systems, and articles of manufacture for testing Web services using a behavior-driven development domain specific language (DSL) framework. One or more embodiments relate to a method for testing Web services using a behavior-driven development domain specific language (DSL) framework.

Certain embodiments relate to an apparatus for implementing various processes described herein for testing Web services using a behavior-driven development domain specific language (DSL) framework. More details about the apparatus for implementing various processes will be described in some of the subsequent paragraphs with reference to one or more drawing figures. In these embodiments, the system may include a newly developed behavior-driven development domain specific language (DSL) framework that provides native, built-in support for testing software products or services and performs various functions described herein.

Certain embodiments relate to an article of manufacture having stored thereupon a sequence of instructions which, when executed by a mobile computing or communication device, causes the mobile computing or communication device to perform various processes or to invoke various modules described herein. More details about the article of manufacture will be described in some of the subsequent paragraphs with reference to one or more drawing figures.

Further details of various embodiments are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of various embodiments briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which:

FIGS. 2D-2H illustrate a more detailed block diagram for implementing various processes described herein for testing Web services using a behavior-driven development domain specific language (DSL) framework in one or more embodiments.

FIGS. 3A-3C illustrate an example of a simplified test implemented in Java programming language for Web services.

FIG. 3D illustrates the same example of the simplified test illustrated in FIGS. 3A-3C yet implemented in the behavior-driven development domain specific language (DSL) framework in one or more embodiments.

FIGS. 3E-3F illustrates some examples of inexact or fuzzy matching capability for validating Web services using JsonPath and RegEx (regular expressions) in one or more embodiments.

FIG. 3G-3H illustrates an example of the dynamic data driven testing characteristic with JSON templates as well as on-the-fly interpretation and computation of responses provided by the behavior-driven development domain specific language (DSL) framework in one or more embodiments.

FIG. 3I illustrates an example of the capability of mixing JSON and XML in a test and performing validation in one or more embodiments.

FIGS. 3J-3K illustrates examples of schema validation using a standard form or an inline form under the behavior-driven development domain specific language (DSL) framework in one or more embodiments.

FIGS. 3L-3N illustrate an example user interface demonstrating a new debug class that may be used in testing Web service with the behavior-driven development domain specific language (DSL) framework in one or more embodiments.

FIGS. 4A-4H illustrate some examples of the simplicity and smaller code base of the behavior-driven development domain specific language (DSL) framework compared with other approaches in one or more embodiments.

FIGS. 4I-4K illustrates an example of the built-in, native support for JSON/XML schema validation of the behavior-driven development domain specific language (DSL) framework in one or more embodiments.

FIG. 4L illustrates examples of constructing JSON or XML from scratch using path expressions with the built-in keyword "set" in the behavior-driven development domain specific language (DSL) framework in one or more embodiments.

FIGS. 5A-5C illustrate an example of a testing report interface of the behavior-driven development domain specific language (DSL) framework in one or more embodiments.

DETAILED DESCRIPTION OF ILLUSTRATED EMBODIMENTS

Figure 1:
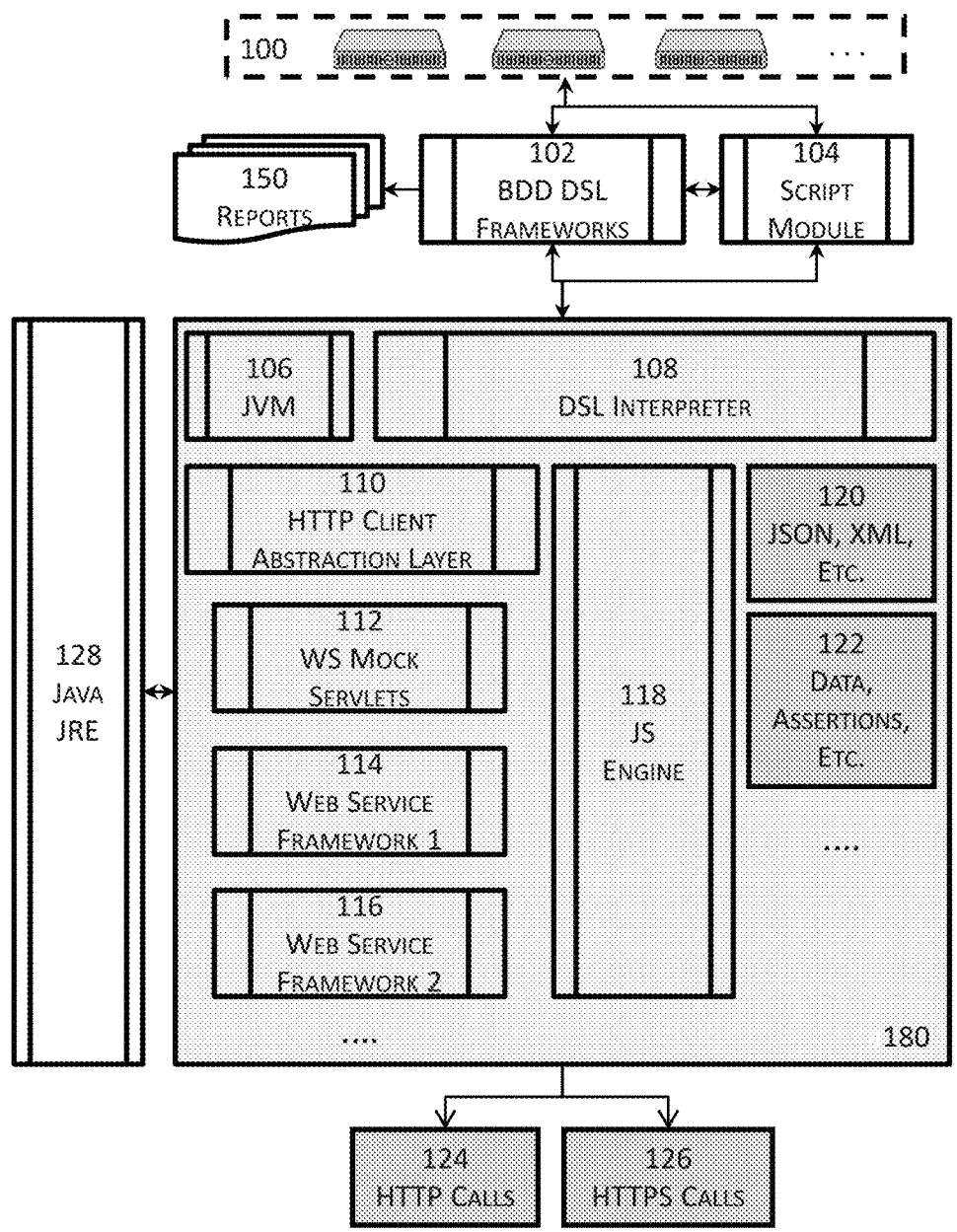
FIG. 1 illustrates a high level block diagram of a system for implementing various processes described herein for testing Web services using a behavior-driven development domain specific language (DSL) framework in one or more embodiments.

Some embodiments relate to a method or system that implements the behavior-driven development domain specific language (DSL) framework in one or more embodiments. The behavior-driven development domain specific language (DSL) framework includes a new scripting language that is laser-focused on testing Web services although this framework may also be utilized in testing other software products or services. Unlike conventional Web service testing suites that require the use of programming languages that require compilation and are hard to read and understand (e.g., Java, Groovy, or other programming language supporting dynamic typing, etc.) and one or more third-party software products or services (e.g., TestNG, JUnit, the Fluent Interface, SOAP and SoapUI, Spring-MVC, etc.), the behavior-driven development domain specific language (DSL) framework adopts a newly created scripting language (e.g., a statically typed, non-dynamic scripting language) that requires no compilation for execution, that is readable and understandable by users having no or very little knowledge or experience in the aforementioned programming languages. In one embodiment, a software product or service includes an electronic tax return preparation or filing software application, a financial management software application, a payroll software application, an accounting software application, or any combinations thereof. Some examples of such software products or services include online financial management systems such as MINT, QUICKBOOKS, etc. electronic tax preparation software products or services such as TURBOTAX, etc. QUICKBOOKS, MINT, and TURBOTAX are registered trademarks of Intuit Inc. of Mountain View, Calif.

A test thus created by using the behavior-driven development domain specific language (DSL) framework described herein has a much smaller code base and thus requires much less computational resources for execution. In addition, the behavior-driven development domain specific language (DSL) framework eliminates the need for POJO or helper code to represent payloads, HTTP end-points, Java objects, etc. that are required by conventional approaches; and this elimination leads to further reduction in size of the resulting code base. The behavior-driven development domain specific language (DSL) framework also provide native, built-in capability of mocking servlets (e.g., HTTP servlets) for testing any controller servlets (e.g., Spring Boot, Spring-MVC, Jersey JAX-RS, etc., without requiring to start an application server for the testing to further conserve computational resources. This servlet mocking capability enables users to reuse HTTP integration tests, which usually take much longer time than, for example, unit tests, by simply switching the environment, without any changes in the HTTP integration tests. This reuse of HTTP integration tests without changes provides another time-saving and computational resource-conserving advantage of the behavior-driven development domain specific language (DSL) framework described herein.

The behavior-driven development domain specific language (DSL) framework provides native, built-in support for JSON, HTTP, XML, etc. and allows mixing data elements of different types (e.g., data elements in the JSON format and other data elements in the XML format) in the same file (e.g., a part of the payload for testing Web services) by normalizing (e.g., transforming) such different types into an intermediate format at an intermediate level and performing various testing tasks at this intermediate level. The behavior-driven development domain specific language (DSL) framework also provides native, built-in support for multi-threaded, parallel execution of various tasks of testing or validating Web services.

The behavior-driven development domain specific language (DSL) framework also includes built-in exact and fuzzy (or inexact, approximate) matching functionality that may be used to validate the responses from Web services against expected results or responses. An expected response or result is also expressed in a readable, human-friendly, and well-formed format such as JSON or XML and may be asserted in a single step to validate whether the entire response payload is as expected, regardless of the complexity or nested structure of the payload. The behavior-driven development domain specific language (DSL) framework also interprets, computes, or evaluates complex expressions (e.g., mathematical expressions or relations) on the fly during runtime to further expand the extensibility and capability of this framework described herein for Web service testing. Furthermore, the behavior-driven development domain specific language (DSL) framework adopts the future-proof pluggable HTTP client abstraction that supports various other frameworks such as Apache, Jersey, etc. so that users may choose what better or best fits a particular test and will not be blocked by, for example, library conflicts, dependency conflicts, etc.

A user may also selectively identify and ignore a portion or one or more data elements during the Web service testing or validation; and the behavior-driven development domain specific language (DSL) framework also allows the dynamic passing of data that are dynamically generated during Web service testing by using placerholders and templates to enable dynamic data driven testing of Web services. The native, built-in capability of data-driven testing of Web services of the behavior-driven development domain specific language (DSL) framework is also achieved, without relying on or requiring any third-party software such as TestNG or JUnit. A user may also reuse payload data, user-defined functions, custom code, etc. for different environments, organizations, or test purposes.

Various embodiments will now be described in detail with reference to the drawings, which are provided as illustrative examples so as to enable those skilled in the art to practice various embodiments described herein. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates a high level block diagram of a system for implementing various processes described herein for testing Web services using a behavior-driven development domain specific language (DSL) framework in one or more embodiments. In these embodiments, one or more computing systems 100 operated by one or more users may access the behavior-driven development domain specific language (DSL) framework 102 that is further coupled to a scripting module 104 providing a newly created scripting language that provides built-in, native support for BDD (Behavior Driven Development) and is a true DSL (Domain Specific Language) that is custom tailored for Web service testing for various payloads 120 having data elements in one or more formats (e.g., JSON, XML, HTTP, etc., or any combinations thereof). In addition to providing the native, built-in functionality of identifying and composing tests, executing the tests, and collecting testing results and diagnostics, the behavior-driven development domain specific language (DSL) framework also supports other popular testing frameworks such as TestNG, JUnit, etc.

JUnit is a unit testing framework for the Java programming language. JUnit has been important in the development of test-driven development, and is one of a family of unit testing frameworks that is collectively known as xUnit that originated with SUnit. TestNG is a testing framework inspired from JUnit and NUnit but introduces some new functionalities that render TestNG more powerful and easier to use.

This new scripting language is developed based on yet extends far beyond JavaScript and Gherkin as well as the Cucumber framework for Web service testing, without requiring the unique syntax of the Java programming language. Regarding Web service testing, the behavior-driven development domain specific language (DSL) framework 102 identifies a payload, apply various macros, perform various comparisons and validation tasks, and generate various test reports, diagnostic data, etc. 150.

The behavior-driven development domain specific language (DSL) framework 102 also collaborate or is coupled to various modules 180 that are executing on one or more Java runtime engine (JRE) 128. These modules include, for example, an abstract computing machine 106 (e.g., the Java virtual machine) that enables a computer (e.g., the DSL interpreter 108) to execute Java programs, one or more DSL interpreters 108, and a JavaScript engine 118 (e.g., Java 8 Nashorn) that may be invoked on demand from, for example, a DSL interpreter 108 and/or the scripting module 104.

In one embodiment, a domain specific language (DSL) is a computer language specialized to a particular application domain. This is in contrast to a general-purpose language (GPL), which is broadly applicable across domains. Various embodiments support a wide variety of DSLs, ranging from widely used languages for common domains, such as HTML for Web pages, to languages used by only one or a few pieces of software, such as Emacs Lisp for GNU Emacs and XEmacs. DSLs may be further subdivided by the kind of language, and include domain-specific markup languages, domain-specific modeling languages (more generally, specification languages), and domain-specific programming languages.

Simpler DSLs, such as ones used by a single application, may sometimes be informally referred to as mini-languages. For example, Gherkin is a language designed to define test cases to check the behavior of software (e.g., Web services), without specifying how that behavior may be implemented. Such a language is designed to be read, used, and understood by non-technical users using a syntax that is more akin to a natural language syntax and a line-oriented design. The tests defined with such a language (e.g., Gherkin) may then be implemented in a general programming language. Then, the steps in a test may act as a syntax for method invocation accessible to non-developers.

A DSL interpreter 108 may include, for example, the Cucumber framework. The behavior-driven development domain specific language (DSL) framework 102 also supports a pluggable HTTP client abstraction layer 110 and Web service servlet mocking functionality 112 for various Web service frameworks (114, 116, etc.) such as Jersey RESTful Web services framework, Apache Axis Web Service framework, etc. for issuing various HTTP calls or HTTPS (HTTP Secure) calls via TLS (Transport Layer Security) or SSL (Secure Sockets Layer) using the data, assertions, etc. 122. An HTTP or HTTPS call may include, for example, post, get, etc. having constituents such as the URL's and basic segments to make a connection (e.g., http (kind of connection)://(separator ends connection type definition), localhost (e.g., the address of the machine to talk to):(separator optional if port number is given. Default http port # is 80), 680 (port on server to make connection), ' (separator terminates connection info), cgi/cgimfc1 (instruct browser the process to run or page to return, this is part of the transmitted data), ? (separator optional ends process definition), query info that server may use to handle the request—part of the transmitted data, etc.

The behavior-driven development domain specific language (DSL) framework 102 mocks up Web services or at least a portion thereof as stand-in for the real Web services to save bandwidth, monetary costs, and/or lag-time. The behavior-driven development domain specific language (DSL) framework 102 may also support other Web service frameworks such as Java, C++, PHP (recursive acronym for Hypertext Preprocessor), C, GAE/Java (Google App Engine/Java), Visual Basic.NET, .NET, etc. while supporting protocols such as SOAP, WSDL, MTOM (Message Transmission Optimization Mechanism), WSDL 2.0. REST, XML-RPC (XML-Remote Procedure Call), REST, JSON, JSON-RPC (JSON-Remote Procedure Call), Odata (Open Data Protocol), etc.

Figure 2A:
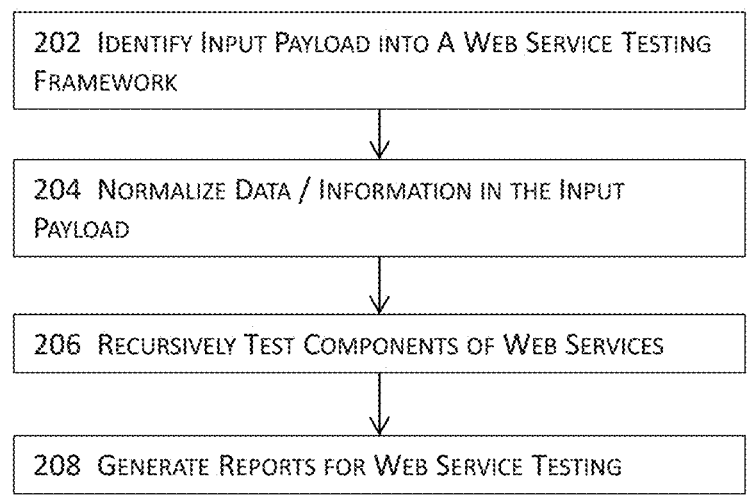
FIG. 2A illustrates a high level block diagram for implementing various processes described herein for testing Web services using a behavior-driven development domain specific language (DSL) framework in one or more embodiments.

FIG. 2A illustrates a high level block diagram for implementing various processes described herein for testing Web services using a behavior-driven development domain specific language (DSL) framework in one or more embodiments. In these embodiments, an input payload may be identified at 202 into a behavior-driven development domain specific language (DSL) framework 102. For example, a payload for Web service testing and optionally other data (e.g., header, metadata, etc.) may be identified at 202.

Web services include the mechanism or the medium of communication through which two applications or machines may exchange the data irrespective of their underline architecture and the technology. In general, software applications are developed to be consumed by human beings, where a person sends a request to a software service which in turn returns a response in human readable format. A Web service may be called by a software application using, for example, an HTTP protocol or any other suitable protocols. Web services may also be implemented in different ways such as SOAP (Simple Object Access Protocol), REST (Representational State Transfer architecture), etc. The behavior-driven development domain specific language (DSL) framework 102 described herein support all these Web service implementations.

One unique characteristic of the behavior-driven development domain specific language (DSL) framework 102 described herein is that payloads and/or the tests may include elements of different formats (e.g., JSON, XML, etc., or a mix of different formats) in some embodiments. In these embodiments, the behavior-driven development domain specific language (DSL) framework 102 normalizes or transforms these elements in different formats into a normalized or intermediate format at an intermediate level and performs the testing or validation at this intermediate level. This normalization or transformation is performed automatically without human intervention so that a user may leverage various elements (e.g., payload data, a test, one or more steps in a test, etc.) in different formats without having to worry about compatibility among these different formats.

All the components of the Web service under test may be recursively tested at 206. As described above, one of the unique features of the behavior-driven development domain specific language (DSL) framework described herein is that a user may selectively identify a portion of the test to ignore during the validation or testing of the software products or services (e.g., Web services) in some embodiments. In addition or in the alternative, a user may pause and subsequently resume the testing at any point and may replay any part of the testing either manually or in an assisted manner.

In some embodiments, testing Web services may include the act of understanding the input file(s) such as a WSDL (Web Service Definition Language) file although files in other formats or languages may also be similarly processed by the behavior-driven development domain specific language (DSL) framework described herein. WSDL is an XML format for describing network services as a set of endpoints operating on messages containing either document-oriented or procedure-oriented information. The operations and messages in a WSDL file are described abstractly and then bound to a concrete network protocol and message format to define an endpoint. In some embodiments, WSDL files may be generated automatically by the behavior-driven development DSL framework or by any other third-party software products or services such as Apache Axis2, SoapUI, etc.

It shall be noted that as described in numerous other places herein, the behavior-driven development DSL framework described herein allows a user to mix payload data, tests (e.g., test steps, definitions, test scripts, etc., or a portion thereof), or any other associated files or data in different formats (e.g., JSON, XML, HTML, etc.) and normalizes such payload data, test, or other associated data or files into an intermediate format at an intermediate level to perform various validation tasks at this intermediate level. It shall be further noted that normalizing data or files in different formats into corresponding data or files in an intermediate format at an intermediate level may be achieved with various transformations using syntactic and/or semantic mappings between these different formats and the desired intermediate format. In some embodiments, the behavior-driven development DSL framework normalizes data or files in various other formats into corresponding data or files in JavaScript. In some of these embodiments, such syntactic and/or semantic mappings may further include custom functions, code, etc. to expand the capability of JavaScript in order to provide new functionality that JavaScript does not provide. More details about such new functionality will be described below with reference to FIGS. 2D-2H.

Once the input files are identified by the behavior-driven development DSL framework, testing or validating software products or services (e.g., Web services) may also include determining the operations that a Web service under validation provides. In some embodiments where the inputs include data or files in different formats and hence normalized into an intermediate format at an intermediate level, the format for the requests (e.g., get request, post request, etc.) as well as the format for the responses may also be determined. One of the reasons for determining the format of responses is that a response from the Web service or from the mocked Web service may be further utilized as an input for further testing or validation. With the format for the requests and the format for the responses determined, test code may be generated by or with the behavior-driven development DSL framework for the requests; and the response may be validated by, for example, invoking the proper method with appropriate input to generate the corresponding response, and by using the matching functionality provided by the behavior-driven development DSL framework to compare the responses to or with the expected responses. More details about testing a software product or service will be described in greater details below with reference to FIGS. 2B-2H.

The behavior-driven development DSL framework may then generate one or more reports at 208 for testing or validation the software products or services. These one or more reports may include detailed information about whether a software product or service has passed or failed a test or validation in some embodiments. For example, a report may include the functional test steps in a test script and indicate whether each of these functional test steps has produced a response that matches the corresponding expected response and hence passed the test.

When a step fails to pass a test or validation, a report may also include data or information (e.g., diagnostic data) such as the response produced by the software product or service or a component thereof in response to an input and the corresponding expected response therefor to reflect the mismatch. In some embodiments, a report may even identify the pertaining line or lines of code (e.g., in the source code) in the software product or service that are responsible for generating the response and allows the user to replay or step through each of the line or lines of code to help identify the root cause of the failure in the validation. These reports generated by the behavior-driven development DSL framework may help a designer with debugging the software product or service under test. More details about the reporting functionalities of the behavior-driven development DSL framework are described below with reference to FIGS. 2G-2H and 5A-5C. With the aid of these one or more reports, any bugs or unexpected behaviors of the software product or service may be fixed; and the software product or service may then be launched to provide its services and functionality to online users.

Figure 2B:
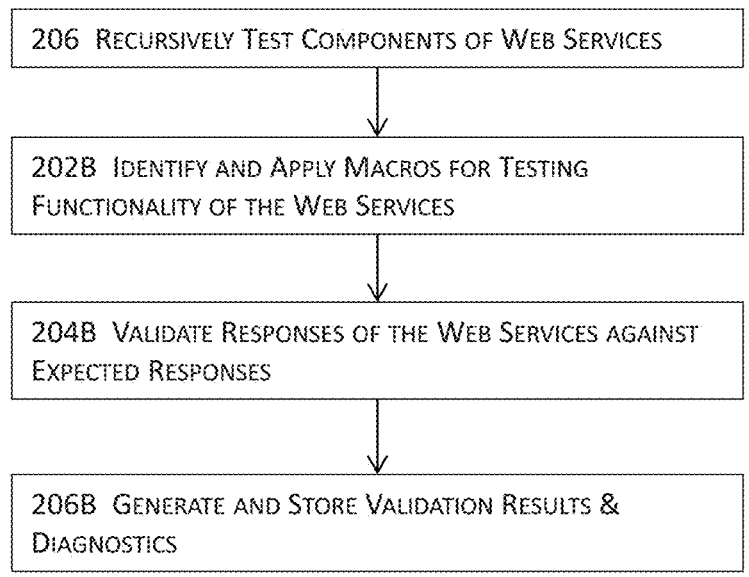
FIG. 2B illustrates more details about a portion of the block diagram illustrated in FIG. 2A in one or more embodiments.

FIG. 2B illustrates more details about a portion of the block diagram illustrated in FIG. 2A in one or more embodiments. More specifically, FIG. 2B illustrates more details about recursively testing the components of a Web service of 206 in FIG. 2A. In these embodiments, one or more macros may be identified at 202B and applied for testing the functionality of the Web service. A macro includes instructions in an abbreviated format to perform what the Web service under validation actually performs in response to a request. For example, a macro may include a rule or a pattern of instructions that specifies how a certain input is to be mapped to an output according to a defined procedure.

One or more requests may be generated by, for example, the behavior-driven development DSL framework and sent to the Web service or mocked Web service. An appropriate method corresponding to these one or more requests may be invoked to perform the Web service operations to generate the response. The behavior-driven development DSL framework may then identify the expected response and invoke its native, built-in matching functionality to compare the response returned by the Web service or mocked Web service to or with the expected response to validate the response of the Web Service at 204B.

The validation results may be generated and stored at 206B. In some embodiments where the Web service or a portion thereof (e.g., a step or a scenario in the validation) under validation fails to pass the validation, diagnostics may be generated to identify where the validation fails (e.g., which step or which scenario fails to pass the validation), the possible reasons for this validation failure (e.g., what the expected responses and the discrepancy in the Web service's response are). Such diagnostics and/or validation results may be presented in a unique interface such as the one described below with reference to FIGS. 3M-3N.

Figure 2C:
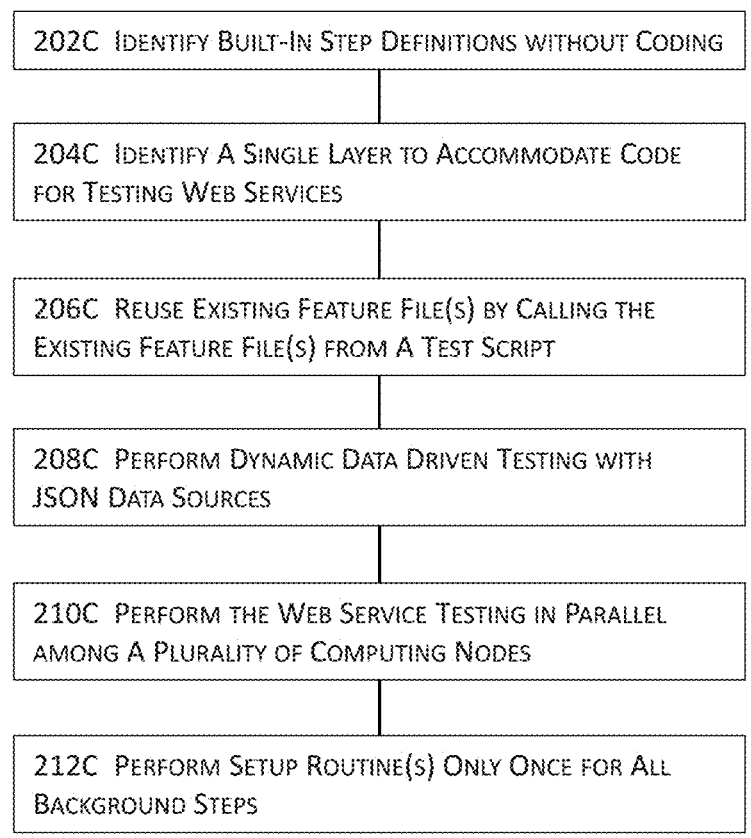
FIG. 2C illustrates a more detailed block diagram for implementing various processes described herein for testing Web services using a behavior-driven development domain specific language (DSL) framework in one or more embodiments.
Figure 2D:
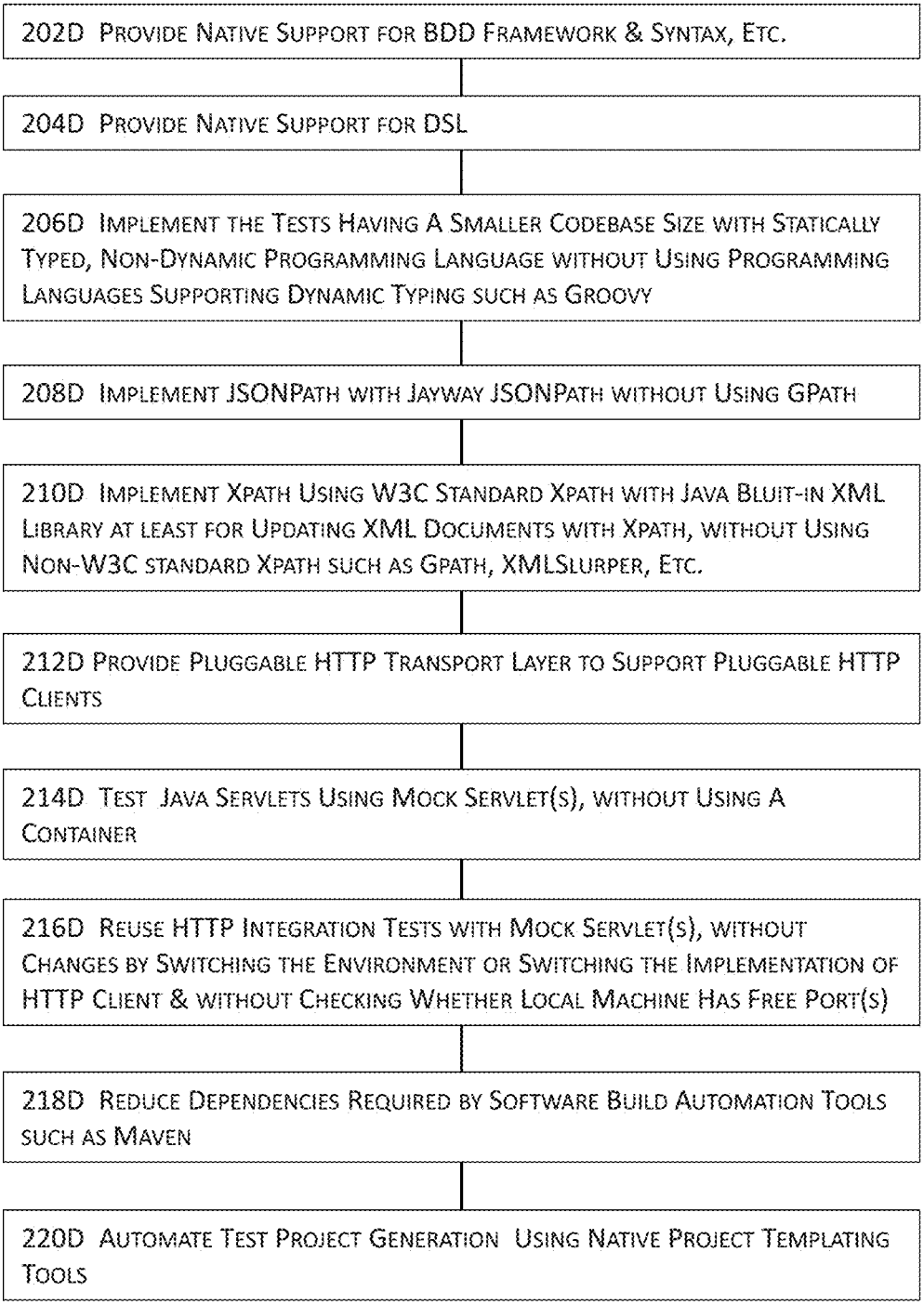
Figure 2E:
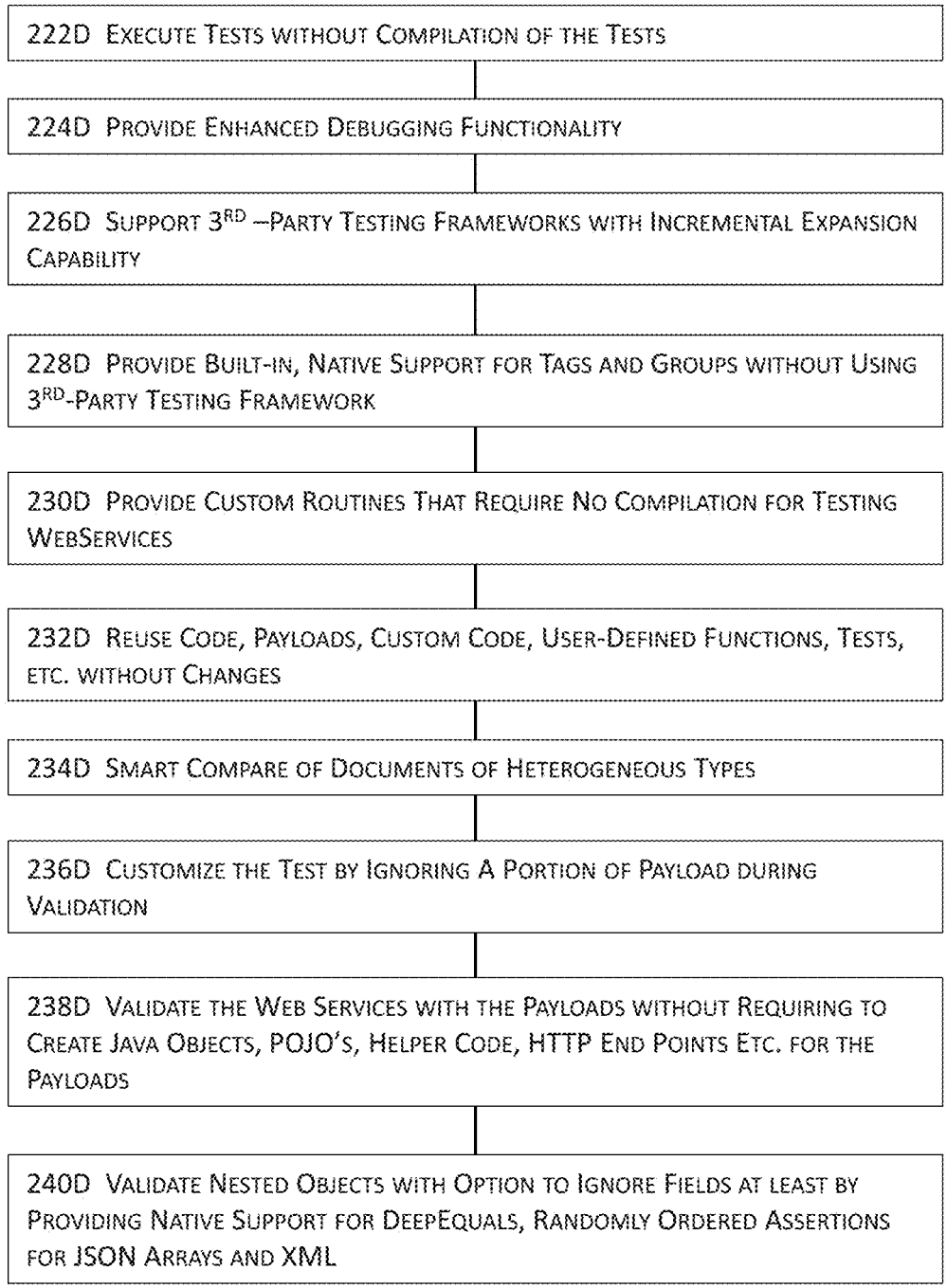

FIG. 2C illustrates a more detailed block diagram for implementing various processes described herein for testing Web services using a behavior-driven development domain specific language (DSL) framework in one or more embodiments. In these embodiments, one of the programming languages adopted in the behavior-driven development DSL framework is the Gherkin language; yet the behavior-driven development DSL framework includes software code and modules to expand the functionality of the conventional Gherkin programming language.

Gherkin is a programming language that some conventional software tools (e.g., Cucumber written in the Ruby programming language) use to define test cases and to allow expected software behaviors to be specified in a logical language that are easy to understand by users. Gherkin is designed to be non-technical and human readable, and collectively describes use cases relating to a software system although Gherkin as well as such conventional software tools have their own limitations and shortcomings. The ii. Syntax is centered on a line-oriented design, similar to that of Python. The structure of a file is defined using whitespace and other control characters. # is used as the line-comment character, and can be placed anywhere in a file. Instructions are any non-empty and non-comment line. They consist of a recognized Gherkin keyword followed by a string. Like Gherkin, the files have the .feature file extension, and each .feature file may contain a single feature definition for the system under test and are an executable test script.

A feature is a use case that describes a specific function of the software being tested. There are three parts to a Feature. Each feature is made of a collection of scenarios. A single scenario is a flow of events through the Feature being described and maps one-to-one with an executable test case for the system. For example, a scenario might describe how a user requests money and what happens to their account. A characteristic of a scenario is defined by a sequence of steps outlining the preconditions and flow of events that will occur. The first word of a step is a keyword, typically one of: Given (providing, for example, preconditions and initial states before the start of a test), When (providing, for example, actions taken by a user during a test), Then (providing, for example, the outcome resulting from actions taken in the When clause), And (logical and), But (logically the same as And but used in the negative form). Steps in Gherkin's .feature files may be considered a method invocation. Before a step may be executed, the system is informed, via for example a step definition, how that step is to be performed.

In these embodiments, the behavior-driven development DSL framework identifies a plurality of built-in step definitions for a test case for Web service under verification at 202C. Each step in the test case may be mapped to a step definition that in turn includes a block of code that will be executed when the scenario is run in some embodiments. If any line of code inside a step definition returns an error or exception to the validation engine of the behavior-driven development DSL framework, this particular step may then be marked as failed, otherwise as passed. The behavior-driven development DSL framework requires no extra Java code to compose these step definitions for tests.

In some embodiments, the behavior-driven development DSL framework identifies and needs only a single layer at 204C to accommodate software program code for testing or validating Web services. The use of a single layer is in sharp contrast with conventional software tools that requires multiple layers to accommodate the software code. For example, Cucumber, which is a popular software tool for software testing, requires at least one layer for Gherkin specification or the *.feature files and another layer for Java step definitions. This requirement of multiple abstraction layers to accommodate software code of conventional approaches not only increases the complexities of testing software products or services but also need more storage and memory space and is hence less efficient in computational resource utilization.

The behavior-driven development DSL framework may also reuse existing feature files at 206C. For example, the behavior-driven development DSL framework may reuse an existing feature file by calling the existing feature file from within an ongoing test (e.g., from a test script). A feature file includes an entry point to tests and is where a user may describe the tests with a descriptive language that is more akin to a natural language. A feature file may serve as an automation test script as well as live documents and may comprise a single scenario or may include multiple scenarios in a single feature file.

On the other hand, a feature file usually comprises a list of scenarios. As a practical example, a *.feature file may include a single feature where line starting with the keyword Feature followed by free indented text to mark the beginning of the feature. A feature may include a list of scenarios. A user may write whatever the user desires up until the first scenario, which starts with the keyword Scenario (or any localized equivalents as Gherkin is localized for dozens of languages) on a new line. A user may use tagging to group features and scenarios together independent of the file and directory structure. A scenario includes a list of steps, which must start with one of the keywords Given, When, Then, But or And.

The behavior-driven development DSL framework may test Web services by performing data driven testing (DDT) at 208C with data sources of a single format (e.g., JSON) or a mix of multiple formats (e.g., JSON, XML, HTTP, etc.) This is another aspect that the behavior-driven development DSL framework described herein sharply distinguishes itself from conventional approaches. For example, a scenario outline in conventional approaches (e.g., Cucumber) expects the examples to include a fixed set of rows. In contrast, the behavior-driven development DSL framework supports for calling other *.feature files and allows users to use a JSON array as the data source. Moreover, the behavior-driven development DSL framework also provides the capability of JSON templating, which will be described in greater details below, that uses placeholders for intermediate state variables that may receive their values during the test from the output of other component(s) or function(s).

The behavior-driven development DSL framework may also perform the Web service testing in multi-threaded parallel execution at 210C among a plurality of computing nodes, without the use of or reliance on any third-party software tools. In comparison, conventional approaches (e.g., Cucumber) often require the use of third-party software tools for parallel execution or even partial parallel execution. For example, the behavior-driven development DSL framework may partition a test or validation into multiple portions and allocate these multiple portions to a plurality of threads of execution or a plurality of computing nodes so that the plurality of threads or computing nodes may execute the test in parallel.

As described above, the behavior-driven development DSL framework adopts specific programming languages and platforms so that the behavior-driven development DSL framework requires no compilation for execution in some embodiments although behavior-driven development DSL framework is equally equipped with the capability to invoke appropriate compilers to compile various code segments, routines, etc. in various programming languages (e.g., Java, C++, etc.) In these embodiments, the behavior-driven development DSL framework may subdivide a test or validation into such multiple portions based at least in part upon, for example, heuristics or other historical data for parallel processing so that the plurality of threads or computing nodes involved may complete their respective portions of the test or validation at approximately the same time so that no threads or computing nodes are burdened to execute their respective portions while one or more other threads or computing nodes are sitting idle due to early completion of their respective portions.

In some embodiments, the behavior-driven development DSL framework may further include a dynamic load balancing module to further leverage its no compilation characteristic. For example, certain HTTP integration tests may require much longer time to test or validate than other tests such as unit tests. In these embodiments, the behavior-driven development DSL framework may monitor the progress of the test or validation on the plurality of threads of computing nodes. Once the behavior-driven development DSL framework identifies that a specific thread or computing node may have encountered a test that may require more time to complete, the behavior-driven development DSL framework may identify the remainder of the portion of the test or validation, identifying the part in the remainder that has no dependency from the other parts or the part in which dependency among various components or test steps is fully enclosed, and redistribute the part to one or more other threads or computing nodes on the fly during the execution of the plurality of threads or computing nodes. The behavior-driven development DSL framework may perform such redistribution dynamically on the fly so that the plurality of threads or computing nodes complete their respective portions of the test or validation at approximately the same time to conserve computational resources.

In addition or in the alternative, the behavior-driven development DSL framework may perform setup routines only once for all background steps at 212C. In contrast, conventional approaches such as the popular Cucumber has a hard limitation where the steps in the Background section are re-executed or re-run for every scenario and also for every examples row within the scenario outline. This execute-once is another unique character of the behavior-driven development DSL framework and further leads to the reduction of utilization of computational resources that would be otherwise expended with conventional approaches in re-executing or re-running the steps in the Background section.

FIGS. 2D-2H illustrate a more detailed block diagram for implementing various processes described herein for testing Web services using a behavior-driven development domain specific language (DSL) framework in one or more embodiments. In these embodiments, the behavior-driven development DSL framework provides native, built-in support at 202D for BDD framework and syntax.

Behavior-driven development (BDD) is a software development process that emerged from test-driven development (TDD). Behavior-driven development (BDD) combines the general techniques and principles of TDD with ideas from domain-driven design and object-oriented analyses and design to provide software development and management teams with shared tools and a shared process to collaborate on software development. The behavior-driven development DSL framework described herein has this framework and syntax built-in to provide native support therefor. The behavior-driven development DSL framework also provides built-in, native support for Domain Specific Languages (DSLs) at 204D.

A domain-specific language (DSL) is a computer language specialized to a particular application domain. This is in contrast to a general-purpose language (GPL), which is broadly applicable across domains. There is a wide variety of DSLs, ranging from widely used languages for common domains, such as HTML for Web pages, down to languages used by only one or a few pieces of software, such as Emacs Lisp for GNU Emacs and XEmacs. DSLs may be further subdivided by the kind of language, and include domain-specific markup languages, domain-specific modeling languages (more generally, specification languages), and domain-specific programming languages.

In addition or in the alternative, the behavior-driven development DSL framework implements the test framework that includes a smaller codebase size at 206D. In some embodiments, the behavior-driven development DSL framework includes a statically typed, non-dynamic programming language without using programming languages that support dynamic typing (e.g., Groovy). In software development, a codebase (or code base) refers to a whole collection of source code that is used to build a particular software system, application, or software component. Generally, a codebase includes only human-written source code files; thus, a codebase usually may not include source code files generated by software tools (generated files) or binary library files (object files), as these files may be built from the human-written source code. Moreover, a codebase generally includes configuration and property files, as these files include the data necessary for the build.

Statically typed programming languages perform type checking (e.g., the process of verifying and enforcing the constraints of types) at compile-time as opposed to run-time. Dynamically typed programming languages perform type checking at run-time as opposed to compile-time. Dynamically typed languages (e.g., Ruby, Python, etc.) may allow for some flawed code to be written with ease. But more dangerously, it is possible for the code to appear to run fine until a certain context arises upon which a runtime error occurs. On the other hand, statically typed languages provide a very natural way of avoiding such problems at runtime, instead having them be caught at compile-time.

Ruby and Python are dynamically typed languages. They don't support static typing. OCaml and Haskell are statically typed languages. They don't support dynamic typing. The difference is clear enough however. VB Script (Visual Basic Script) is a dynamically typed language yet is not a dynamic language. Ruby and Python use dynamic typing and they are also dynamic languages.

The behavior-driven development DSL framework also implements JSONPath with Jaway JSONPath at 208D without using GPath to avoid the limitations imposed by GPath in some embodiments. In these embodiments, the behavior-driven development DSL framework optionally eliminates the need for Java objects, POJOs, and helper code that is used to represent payloads and HTTP end-points, and dramatically reduce the lines of code needed for a test. Moreover, JSONPath has syntax "$..b" that may be used to select all b's from a string of data items, and this functionality may be useful in testing software products or services. GPath, on the other hand, does not provide such functionality. In other words, a user needs to write additional code in order to invoke such functionality during a test that in turn requires additional compilation as most conventional software testing tools do as well as additional computational resources during execution.

The behavior-driven development DSL framework may also implement XPath at 210D using the W3C standard XPath with Java built-in XML libraries at least for updating XML documents with XPath, without using non-W3C standard XPath such as GPath, XMLSlurper, etc. In contrast, some conventional approaches (e.g., REST or RESTful Web services, etc.) do not provide users with the capability to update XML documents simply because these conventional approaches use GPath and XMLSlurper.

The behavior-driven development DSL framework described herein also provides a pluggable HTTP transport layer at 212D to support pluggable HTTP clients. This pluggable HTTP transport layer allows users to build on top of the low-level HTTP of the users' choice and optimizes for the Java platform on which the users' applications are running. In addition, this pluggable HTTP transport layer also enables users to write code for one platform, and such code will automatically work across all supported platforms, from mobile applications such as those built for Android, to installed applications, to web applications such as those built on Google App Engine.

In addition or in the alternative, the behavior-driven development DSL framework may also test Java servlets using mock servlets at 214D, without using a container and thus result in additional savings in computational resource utilization. A mock servlet mocks a servlet container by overriding one or two methods of the mock-implementation, without implementing the mock servlet from scratch. These two methods to override are Servlet getServlet(HttpRequestBuilder request) and ServletContext getServletContext( ). The use of mock servlets in the behavior-driven development DSL framework described herein provides additional advantages over conventional approaches (e.g., RESTful). For examples, a user may test Spring-MVC (Spring Web Model-View-Controller), Spring Boot controllers, Jersey JAX-RS resource end-points, without having to start application servers such as Tomcat, WildFly (also known as JBoss or JBoss AS), WebSphere, Glassfish, etc. The elimination of the requirement of application servers for testing software products or services (e.g., Web services) produces a huge saving in computational resource utilization.

JAX-RS (Java API for RESTful Web Services) is a Java programming language API spec that provides support in creating web services according to the Representational State Transfer (REST) architectural pattern. The Spring Framework is an application framework and inversion of control container for the Java platform. The framework's core features can be used by any Java application, but there are extensions for building web applications on top of the Java EE (Enterprise Edition) platform.

In Web service testing, HTTP integration tests usually require much longer time than, for example, unit tests. The behavior-driven development DSL framework provides the functionality of reusing HTTP integration tests without changes at 216D. A user may simply switch the environment or switch the implementation of the HTTP client with the pluggable HTTP transport layer. Moreover, with the provided capability to reuse HTTP integration tests without changes, a user need not wait for the former application server to stop and the latter application server to start because the behavior-driven development DSL framework simply bypasses HTTP on the wire. A user also need not worry about whether the local machine has free ports.

The behavior-driven development DSL framework may further reduce dependencies (218D) that are required by software build automation tools. For example, Maven is a popular build automation tool that has been used primarily for Java projects. Maven addresses two aspects of building software by describing how software is built and by describing its dependencies. The following illustrates an example of the reduced dependencies by the behavior-driven development DSL framework.

[INFO]+-- com.company.BDD-DSL-framework:BDD-DSL-framework-apache:jar:0.6.0:test
[INFO]|+-- com.company.BDD-DSL-framework:BDD-DSL-framework-core:jar:0.6.0:test
[INFO]||+-- com.jayway.jsonpath:json-path:jar:2.1.0:test
[INFO]|||\- net.minidev:json-smart:jar:2.2:test
[INFO]||| \- net.minidev:accessors-smart:jar:1.1:test
[INFO]||| \- org.ow2.asm:asm:jar:5.0.3:test
[INFO]||+-- info.cukes:cucumber-java:jar:1.2.5:test
[INFO]|| \- org.yaml:snakeyaml:jar:1.18:test
[INFO]|+-- org.apache.httpcomponents:httpclient:jar:4.5.3:test
[INFO]||+-- org.apache.httpcomponents:httpcore:jar:4.4.6:test
[INFO]|| \- commons-codec:commons-codec:jar:1.9:test
[INFO]|+-- org.apache.httpcomponents:httpmime:jar:4.5.3:test
[INFO]|+-- org.slf4j:jcl-over-slf4j:jar:1.7.25:test
[INFO]|| \- org.slf4j:slf4j-api:jar:1.7.25:test
[INFO]| \- ch.qos.logback:logback-classic:jar:1.2.3:test
[INFO]| \- ch.qos.logback:logback-core:jar:1.2.3:test
[INFO] \- com.company.BDD-DSL-framework:BDD-DSL-framework-junit4:jar:0.6.0:test
[INFO] \- info.cukes:cucumber-junit:jar:1.2.5:test
[INFO]+-- info.cukes:cucumber-core:jar:1.2.5:test
[INFO] |+-- info.cukes:cucumber-html:jar:0.2.3:test
[INFO] |+-- info.cukes:cucumber-jvm-deps:jar:1.0.5:test
[INFO] | \- info.cukes:gherkin:jar:2.12.2:test
[INFO] \- junit:junit:jar:4.12:test
[INFO] \- org.hamcrest:hamcrest-core:jar:1.3:test The behavior-driven development DSL framework may also automate test project generation by using at least the native, built-in project templating capability at 220D. A project template includes an original pattern or model from which all other things of the same kind are made. The name fits as we are trying to provide a system that provides a consistent means of generating test projects. Project templates help users create project templates and provide users with the means to generate parameterized versions of project templates.

Contrary to conventional approaches that adopt programming languages (e.g., Java) that require compilation before execution, the behavior-driven development DSL framework includes scripting language (e.g., JavaScript) and non-technical and human readable programming language (e.g., Gherkin) with expansions and additions beyond what these languages provide by default and executes tests to validate software products or services without compilation of such tests at 222D.

In addition, the behavior-driven development DSL framework further provides enhanced debugging functionality at 224D in the event of failures of testing of software products or services. The enhanced debugging functionality includes, for example, providing the user with the capability to view error traces and HTTP logs in-line with the test data or structures, debugging and playing (or replaying) a single step or multiple steps in a test in a custom user interface (e.g., FIGS. 5A-5C), or providing a native, built-in debug class for placing conditional breakpoints (e.g., FIG. 3L), etc.

Although the behavior-driven development DSL framework may be self-sustained and self-complete, the behavior-driven development DSL framework may support third-party testing frameworks with incremental expansion capability at 226D. The behavior-driven development DSL framework described herein may coexist with other testing frameworks (e.g., TestNG, JUnit, etc.); and a user may add features provided by the behavior-driven development DSL framework incrementally in such other testing frameworks. TestNG is a testing framework inspired from JUnit and Nunit. TestNG is designed to cover all categories of tests: unit, functional, end-to-end, integration, etc. JUnit is a unit testing framework for the Java programming language. JUnit is one of a family of unit testing frameworks which is collectively known as xUnit that originated with SUnit.

The behavior-driven development DSL framework also provides built-in, native support for tags and groups at 228D, without requiring or relying on any third-party testing frameworks. For example, a test suite may be represented by a file (e.g., an XML file) that may include one or more tests and may be defined by the <suite> tag. A test may be further represented by <test> and may further include one or more classes (e.g., TestNG classes). A TestNG class is a Java class that includes at least one TestNG annotation and is represented by the <class> tag and may comprise one or more test methods.

Users may create custom routines, user-defined functions, etc. with the behavior-driven development DSL framework at 230D. Because of the unique characteristics of the behavior-driven development DSL framework, these custom routines need not be compiled for testing software products or services. This is sharp contrast with conventional approaches (e.g., REST-assured) where custom routines, user-defined functions, etc. need to be compiled before they can be executed.

In addition to reusing HTTP integration tests described above with reference to 216D, Software code, payloads, payload data, custom code, user-defined functions, tests, etc. may also be reused across multiple tests at 232D in the behavior-driven development DSL framework without any changes thereto. As described herein, the behavior-driven development DSL framework allows a user to mix data or files of different formats (e.g., JSON and XML) by normalizing such data or files into an intermediate format at an intermediate level and by performing various validation tasks at the intermediate level. The behavior-driven development DSL framework further provides smart compare functionality at 234D for data or documents of heterogeneous formats or types by performing the comparison or validation procedures at this intermediate level. For example, this smart compare functionality may be invoked to compare a JSON document and an XML document, without being affected by white-space or the order in which data elements actually appear in these two documents.

Unlike conventional approaches, users may customize a test at 236D with the behavior-driven development DSL framework, even when the behavior-driven development DSL framework is to compare two payloads for equality (e.g., to determine whether these two payloads are equal). For example, a user may selectively identify and ignore a portion of a payload with the behavior-driven development DSL framework. Moreover, information about which data elements or which portion of a payload to ignore may be embedded in the baseline or expected payload. This baseline payload or expected payload including the information about the data elements or the portion of the payload to ignore during validation may also be reused across multiple tests.

Software products or services (e.g., Web services) may be validated with a payload at 238D, without requiring the generation or creation of any Java objects, POJOs (Plain Old Java Objects), helper code, HTTP end-points, etc. for the payload in some embodiments. A POJO is a normal Java object class (that is, not a JavaBean, EntityBean etc.) that does not serve any other special role or implement any special interfaces of any of the Java frameworks. The elimination of POJOs and helper code for payloads dramatically reduce the line of code and hence the codebase for a test.

Although the behavior-driven development DSL framework may complete bypass Java programming language, this framework nevertheless provides the capability of validating nested objects with an option to ignore one or more fields at 240D at least by providing native, built-in support for DeepEqual, randomly ordered assertions, etc. for JSON and XML as well as for complex data objects such as JSON arrays.

The behavior-driven development DSL framework may also compare multiple payloads for equality at 242D while ignoring a respective portion of one or more payloads (e.g., a first portion of a first JSON file, a second portion of a second JSON file, etc.) In some embodiments, the behavior-driven development DSL framework may dynamically change the portion of a payload to ignore every time the software product or service under validation is invoked. HTTP response payloads may have some data-elements that dynamically change every time the web-service is invoked. Some examples include system-generated unique identifiers, date fields, and time-stamps. Conventional approaches simply do not provide the capability to compare two payloads for equality while ignoring one or more sections of the payload at the same time.

The behavior-driven development DSL framework also provides built-in, native functionality for validating data types, conditional logic, regular expressions, etc. at 244D. For example, when expressing expected results (in JSON or XML, for example), a user may mark one or more fields to be ignored when the matching functionality is performed. A user may even use a regular-expression so that rather than checking for equality, the behavior-driven development DSL framework validates that the actual value conforms to the expected pattern. This means that even when a user has dynamic server-side generated values such as UUIDs and time-stamps in the response, the user may still assert that the full-payload matched in one step.

The behavior-driven development DSL framework may also validate the schema of elements in an array (e.g., a JSON array) in one step at 246D by using at least the "match" keyword that is further modified by the "each" modifier. An example is illustrated in FIG. 3F that is further described below. The behavior-driven development DSL framework may also validate JSON and/or XML schemas at 248D by using at least the built-in, native validation support with an optional Java COM Interop (also known as Java Interop) to add Java libraries. Some examples of schema validation are illustrated in FIGS. 4I-4K described in greater details below.

The behavior-driven development DSL framework also provides built-in, native syntax support at 250D for composing JSON and XML (and other formats) in tests without requiring double quotes or escape characters that are required by conventional software testing approaches such as REST-assured. For example, the REST-assured expression "{\"name\": \"Billie\"}" may be expressed as {name: 'Billie' } in the behavior-driven development DSL framework; and the REST-assured expression "<cat name=\"Billie\"></cat>" may be expressed as <cat name="Billie"></cat> in the behavior-driven development DSL framework without using double-quotes or escape characters.

The behavior-driven development DSL framework described herein also provides simplified assertions and built-in matching functionality at 252D for specifying path parameters without requiring placeholders. The following code illustrates an example of path parameter specification in REST-assured.

```
@Test public void
    lotto_resource_returns_200_with_expected_id_and_winners(
){
    when ( ).
        get ("/lotto/{id}", 5).
    then ( ).
        statusCode (200).
            body("lotto.lottoId", equalTo(5),
            "lotto.winners.winnerId",
        containsOnly (23, 54));
}
```

The following code illustrates an example of path parameter specification in the behavior-driven development DSL framework descried herein.

Scenario: lotto resource returns 200 with expected id and winners
  Given path 'lotto', 5
  When method get
  Then status 200
  And match $.lotto.lottoId==5
  And match $.lotto.winnersp*].winnerId
  contains only [23, 54]

In the aforementioned examples, the behavior-driven development DSL framework provides much simpler syntax and format (e.g., without requiring indentation), without requiring placeholders for specifying path parameters.

With the behavior-driven development DSL framework in some embodiments, multiple data elements (e.g., chunks or segments of JSON code, arrays, etc.) may be extracted for subsequent reuse at 256D (e.g., reuse for subsequent HTTP calls) by using, for example, JSONPath for JSON elements or XPath for XML elements. For example, the behavior-driven development DSL framework may extract multiple values from a response to a former request for reuse in one or more latter requests for further validation.

As a practical example, the behavior-driven development DSL framework may extract, for example, the title of a Web page, the content type of the Web page, a link to the next Web page, etc. from a response to a former request. The behavior-driven development DSL framework may perform further validation to determine, for example, whether the title matches the expected title, and whether the content type is JSON, etc. by using the extracted title, content type, etc. in a subsequent request. In some embodiments, the entire response to a former request may be returned for extracting multiple values of data elements. In some embodiments, the behavior-driven development DSL framework extracts multiple data elements without requiring any third-party software products or services such as the Fluent Interface.

The behavior-driven development DSL framework performs data driven testing (DDT) for software products or services at 258D without requiring any third-party testing framework such as TestNG. The behavior-driven development DSL framework may use dynamic JSON as a data source for testing software products or services (e.g., Web services).

The behavior-driven development DSL framework may also update JSON, nested JSON, and/or XML elements in payloads at 260D during data driven testing by using, for example, path expressions, embedded expressions, and/or built-in string replacement keywords. This capability of the behavior-driven development DSL framework is in sharp contrast with conventional approaches like REST-assured that cannot update JSON, nested JSON, or XML elements, especially during data driven testing.

The behavior-driven development DSL framework may also modify a response to a request during testing into a modified response having the syntax and format of a request with the data values from the response at 262D. The behavior-driven development DSL framework may then reuse this modified response as the subsequent request in the testing for further validation at 262D.

The behavior-driven development DSL framework also provides native, built-in support for one or more messaging or communication protocols at 264D. For example, the behavior-driven development DSL framework provides native, built-in support for the SOAP (Simple Object Access Protocol) that is a protocol specification for exchanging structured information in the implementation of web services in computer networks. Conventional testing frameworks such as REST-assured do not provide such support for these messaging or communication protocols.

In addition, the behavior-driven development DSL framework described herein performs testing of software products or services (e.g., Web services) at 266D without requiring certificates. For example, the behavior-driven development DSL framework may perform various testing of Web services without requiring any certificates such as the certificates for HTTPS, SSL, etc. In contrast, although some conventional approaches (e.g., REST-assured) attempt to loosen the certificate requirements, these convention approaches may nevertheless fail to connect to, for example, an SSL website because the certificate chain is not trusted. These conventional approaches are thus required to, for example, export a certificate from the website to a PEM file or perform additional configuration (e.g., additional configuration for SSL) for proper authentication. All these additional computational resource utilization may be eliminated with the behavior-driven development DSL framework described herein.

The behavior-driven development DSL framework also provides built-in, native support for switching environment configurations or implementations of the behavior-driven development DSL framework or HTTP client implementations for testing software products or services at 268D at least by editing or modifying a configuration file, without requiring dependency injection framework or equivalents thereof. For example, the behavior-driven development DSL framework may switch from one environment (e.g., Apache) to a different environment (e.g., Jersey) by editing a configuration file (e.g., config.js) to add one or more new variables to a test, without requiring any dependency injection framework. In contrast, conventional approaches (e.g., REST-assured) require a dependency injection framework for reading property files in order to switch from one environment to another.

A dependency is an object that can be used (a service). An injection is the passing of a dependency to a dependent object (a client) that would use it. Dependency injection is a technique whereby one object supplies the dependencies of another object. Common dependency injection framework includes, for example, CDI (Contexts and Dependency Injection for Java EE) and its implementations such as Weld, Spring, Guice, Play Framework, Salta, Glassfish HKS, Dagger, etc.

The behavior-driven development DSL framework further provides extensible, custom authentication at 270D without requiring compilation of software code. This characteristic of the behavior-driven development DSL framework is due at least partially to the codebase of the behavior-driven development DSL framework is based on JavaScript and Gherkin and is thus in sharp contrast with conventional approaches such as REST-assured that utilize Java programming language and thus require compilation before any code may be executed.

The behavior-driven development DSL framework includes the native capability of performing various tests at 272D for Web services in multi-threaded parallel execution. This multi-threaded parallel execution capability of the behavior-driven development DSL framework is especially important in tests such as HTTP integration tests that usually require much longer runtime than other tests such as unit tests although the behavior-driven development DSL framework described herein may also perform unit tests with multi-threaded parallel execution.

The behavior-driven development DSL framework may also perform automatic conversion assertions involving numeric expressions at 274D to preserve or enhance accuracy in such assertions and subsequent validation, without always converting such numeric expressions to floating point or without always converting such numeric expressions first to floating point. Depending on at least the required or desired accuracy, the behavior-driven development DSL framework may even automatically convert a number to BigDecimal if desired or required.

Figure 5A:
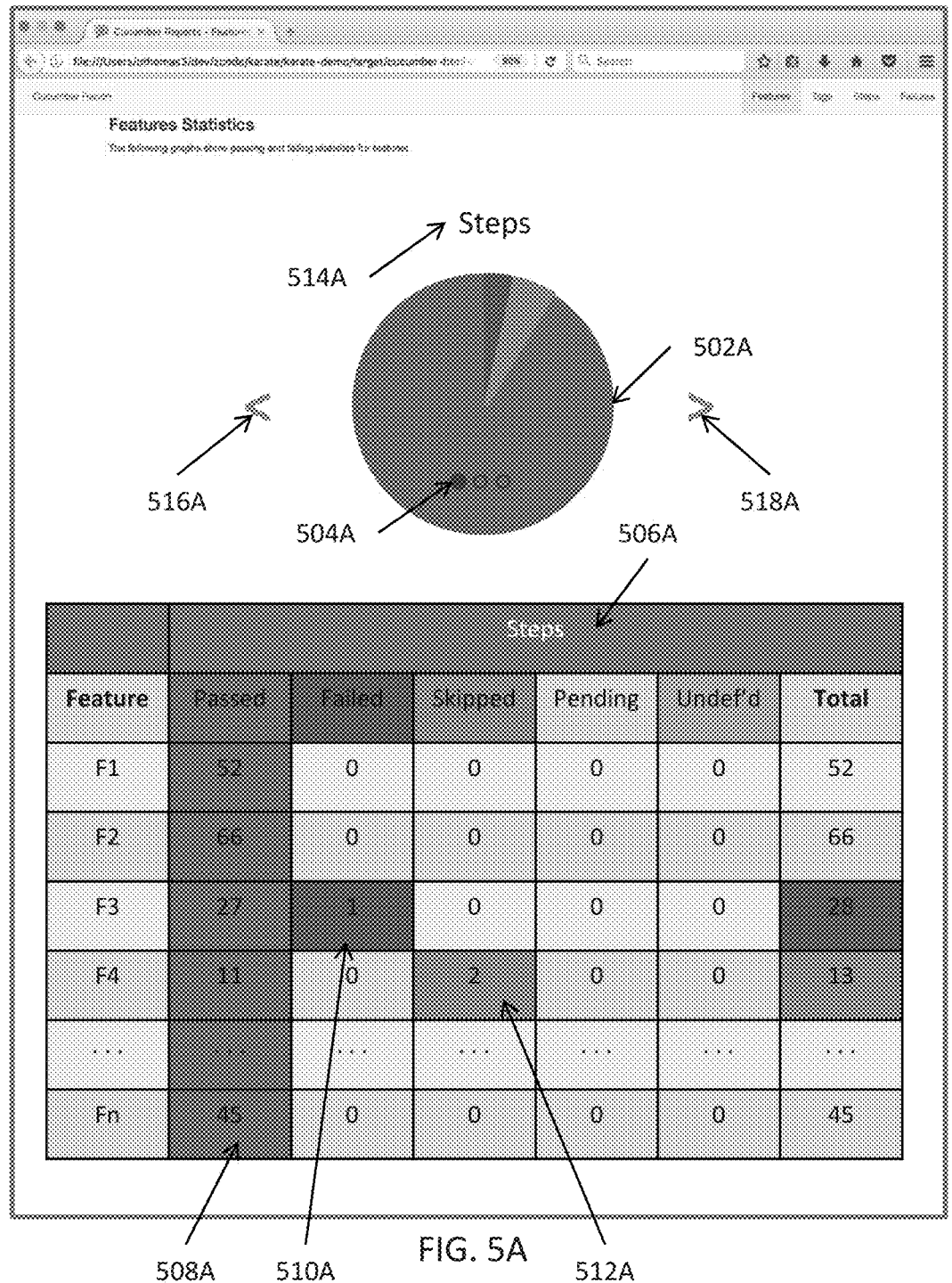
Figure 5B:
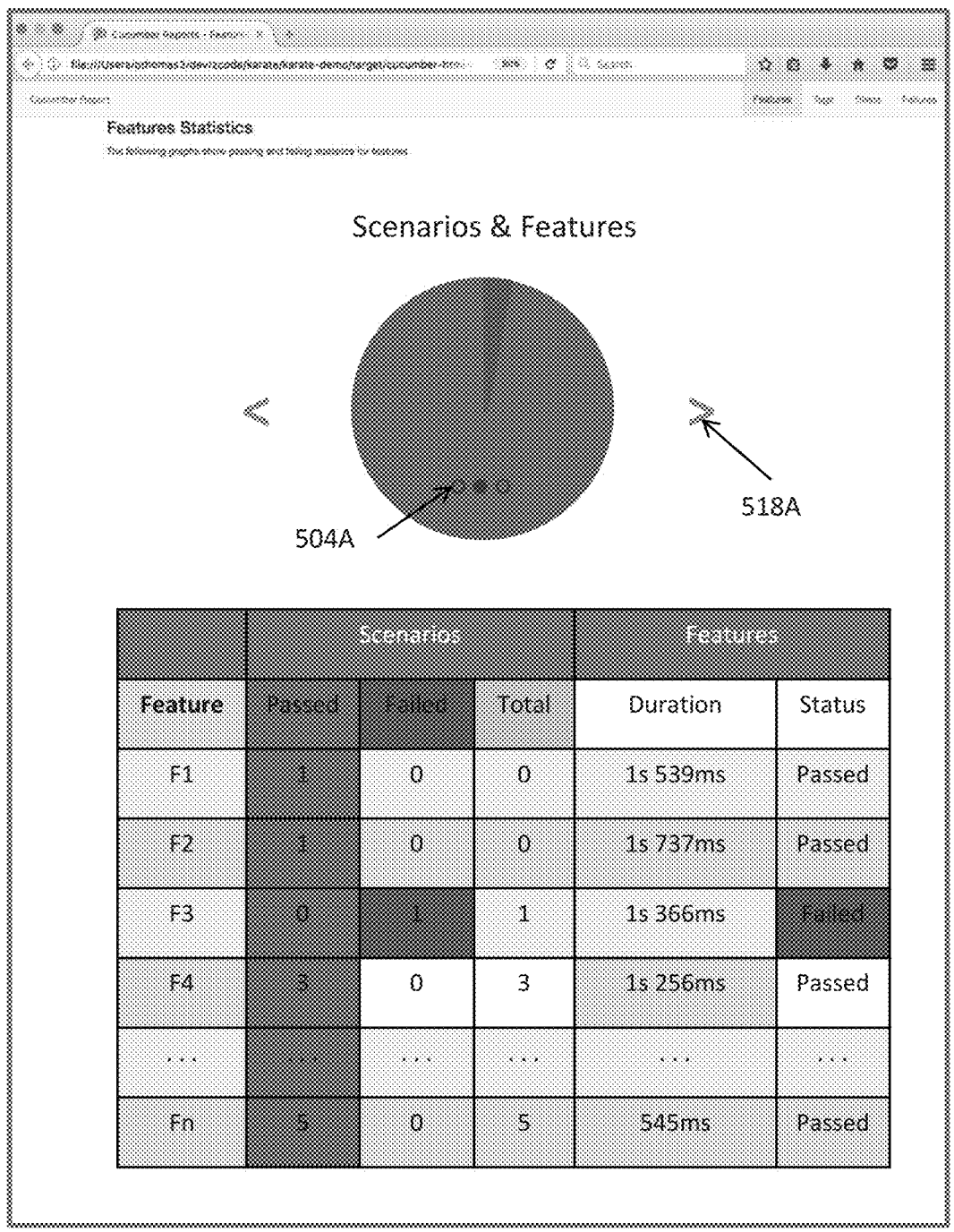

The behavior-driven development DSL framework also provides built-in test report generation modules at 276D to generate and format test reports, diagnostics, etc., without using other third-party test frameworks. Some examples of test reports and diagnostics are illustrated in FIGS. 5A-5C described below.

Although the behavior-driven development DSL framework is not built upon Java, the behavior-driven development DSL framework also provides the capability to test Java servlets, HTTP resources, etc. at 278D while supporting JAX-RS, custom servlets, controllers, etc. at least by using pluggable HTTP clients provided by the pluggable HTTP client abstraction described above, without requiring any containers or hard coding any tests.

Moreover, as described above, the behavior-driven development DSL framework provides the smart compare functionality described above and several mocking capabilities such as mocking servlet containers, mocking HTTP client implementations, etc. so that the behavior-driven development DSL framework may test, for example, Spring-MVC, Spring Boot controllers, Jersey JAX-RS resource endpoints, without having to start any application servers (e.g., Tomcat, JBoss, WebSphere, Glassfish, etc.) Users may thus reuse various tests (e.g., HTTP integration tests) by simply switching the environment, without changes. The behavior-driven development DSL framework will automatically run the tests and bypass HTTP on the wire. Users thus need not wait for a former application server to stop and a latter application server to start to perform the tests.

The behavior-driven development DSL framework also provides the option of generating test reports, diagnostics, etc. at 280D and includes one or more HTTP requests and one or more responses or a portion thereof in-line. Some examples of such test reports, diagnostics, and debugging capability are illustrated in FIGS. 5A-5C described below.

The behavior-driven development DSL framework also provides the native, built-in capability at 282D for users to construct JSON, XML, etc. from scratch by using only path expressions via the native "set" keyword. An example thereof is illustrated in FIG. 4L described below.

FIGS. 3A-3C illustrate an example of a simplified test implemented in Java programming language for Web services. More specifically, FIGS. 3A-3C illustrate an example code in Java for testing a simple functionality of a software product or service where the test aims to validate whether certain kittens correspond to their respective identification numbers. FIG. 3D illustrates the same test implemented with the behavior-driven development DSL framework described herein.

As FIGS. 3A-3D clearly show, the code needed for the behavior-driven development DSL framework for the same test is much shorter, readable, and understandable than that implemented with Java that has been the programming language of choice for most, if not all, conventional software testing frameworks. For example, the lines of code in FIGS. 3A-3B for the Java implementation (e.g., REST-assured) can be done with merely nine (9) lines of code 300D in FIG. 3D; the match function 302C in FIG. 3C can be done with merely one line 302D; and the match function 304C in FIG. 3C can be done with merely one line 304D. This reduction in the size of the codebase produced by the behavior-driven development DSL framework described herein not only is human readable and understandable but also conserves precious computational resources. In addition, the code in the behavior-driven development DSL framework can be executed without compilation, whereas the code implemented in Java as shown in FIGS. 3A-3C must be compiled first before execution.

FIG. 3E illustrates a validation example for complex JSON objects with the behavior-driven development DSL framework described herein. More specifically, given a complex JSON object 304E, the behavior-driven development DSL framework utilizes various regular expressions (e.g., examples illustrated in 302E) to perform exact matches as well as inexact, fuzzy matches using the smart compare functionality illustrated in FIG. 3F. These capabilities of the behavior-driven development DSL framework illustrated in FIGS. 3E-3F extend far beyond what JavaScript or Gherkin provides.

For example, in the example "Then match cat.kittens[*] .id==[23, 42]" illustrated in FIG. 3F, the behavior-driven development DSL framework parses through all the kittens (with the asterisk "*") of the cat object and then matches cat.kittens[*].id==[23, 42]. The behavior-driven development DSL framework enables parsing through all the kittens in the cat object without listing the libraries, etc. as required by JavaScript. Furthermore, a user may extract only the elements that the user is interested in with the behavior-driven development DSL framework. As a result, users may reduce a larger amount of data to only the data elements that the users are interested in and are much easier to manipulate. FIG. 3F further illustrates the keyword "contain" (e.g., "contains 23", "contains [42, 23], etc.) that may be used by the behavior-driven development DSL framework to extract data elements that contain the input value(s), without caring about the order in which the input values appear.

FIG. 3G-3H illustrates an example of the dynamic data driven testing characteristic with JSON templates as well as on-the-fly interpretation and computation of responses provided by the behavior-driven development domain specific language (DSL) framework in one or more embodiments. More specifically, FIG. 3G illustrates the syntax of JSON templating that may be used by the behavior-driven development DSL framework for dynamic data driven testing where a response for a request is used as an input of another request.

In the example line of code "And def temp={id: '#(foo)', value: '#(bar.hello)'" in FIG. 3H, the behavior-driven development DSL framework uses #(foo) as the placeholder whose value is provided (e.g., from a response to an earlier request) during runtime. The example line of code "Then match temperature contains {Fahrenheit:'#($.celsius*1.8+ 32)' }" in FIG. 3H demonstrates the capability of the behavior-driven development DSL framework to accommodate complex logic (e.g., mathematical relations) so that the value of a first data element is the result of operation of the complex logic of a second data element, even when both the first and second data elements are in the same document or even in the payload having multiple documents.

FIG. 3I illustrates an example of the capability of mixing JSON and XML in a test and performing validation in one or more embodiments. As described above, the behavior-driven development DSL framework may mix data elements of different formats in the same test case. In this example, the example test case includes elements in both the JSON format and XML format. In addition to allowing a mix of data elements of different formats, the behavior-driven development DSL framework also allows a user to mix different query languages in the same document. For example, a test script may include the XPath (XML Path Language) query language expressions for selecting nodes from an XML document and JsonPath expressions that refer to a JSON structure for nodes.

Figure 3K:

FIGS. 3J-3K illustrates examples of schema validation using a standard form or an inline form under the behavior-driven development domain specific language (DSL) framework in one or more embodiments. These examples in FIGS. 3J-3K illustrate the schema validation where the behavior-driven development DSL framework determines whether an instance document conforms to a schema. FIG. 3K lists two forms of expressions in the behavior-driven development DSL framework. The standard forms are listed in column 302K; and the corresponding in-line forms are listed column 304K. These two forms may be used interchangeably, even in the same test. FIG. 3J illustrates some code examples of defining objects in the behavior-driven development DSL framework. The following example demonstrates the power of the in-line form to reduce the size of the codebase where the matching is performed with a single line of code (* match cat=={name: 'Billie', kittens: '#(^^expected)'}).

* def cat=
"""
{
name: 'Billie',
kittens: [
  {id: 23, name: 'Bob' },
  {id: 42, name: 'Wild' }
]
}
"""
* def expected=[{id: 42, name: 'Wild' }, {id: 23, name: 'Bob' }]
* match cat=={name: 'Billie', kittens: '#(^^expected)'}

Figure 3L:
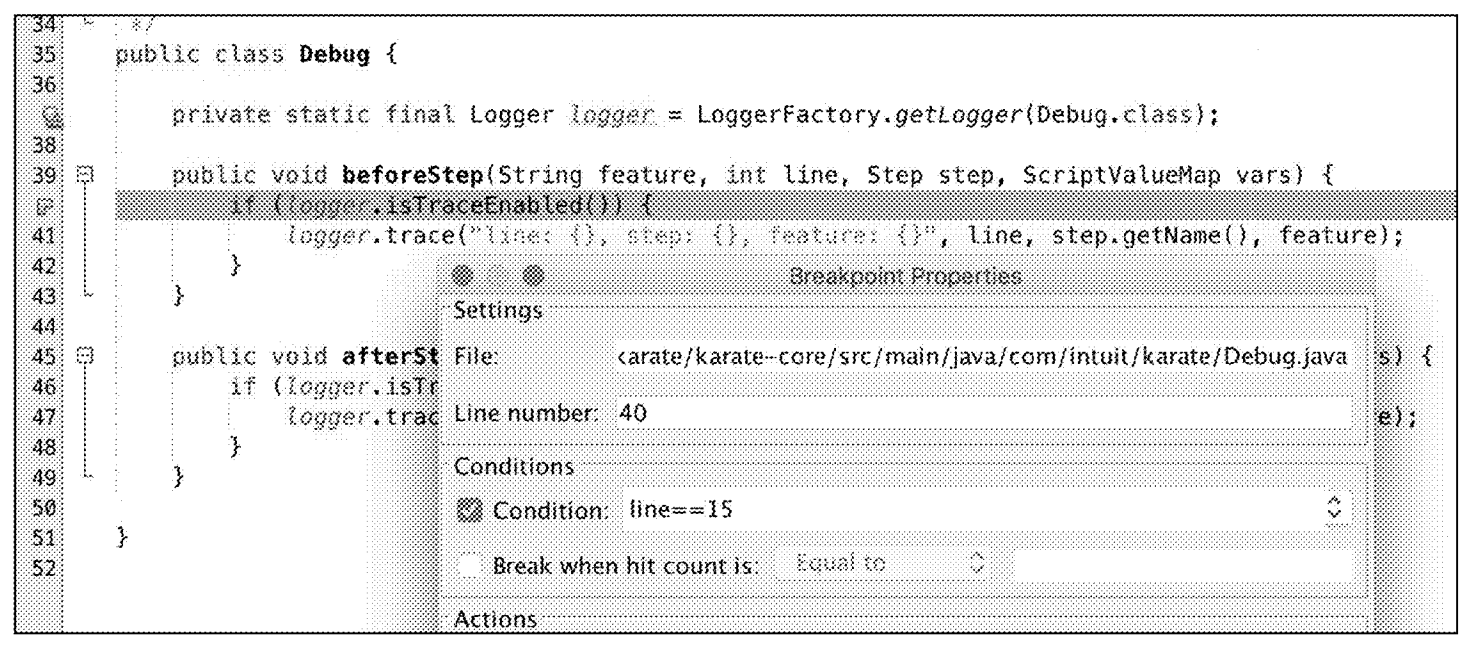
Figure 3M:
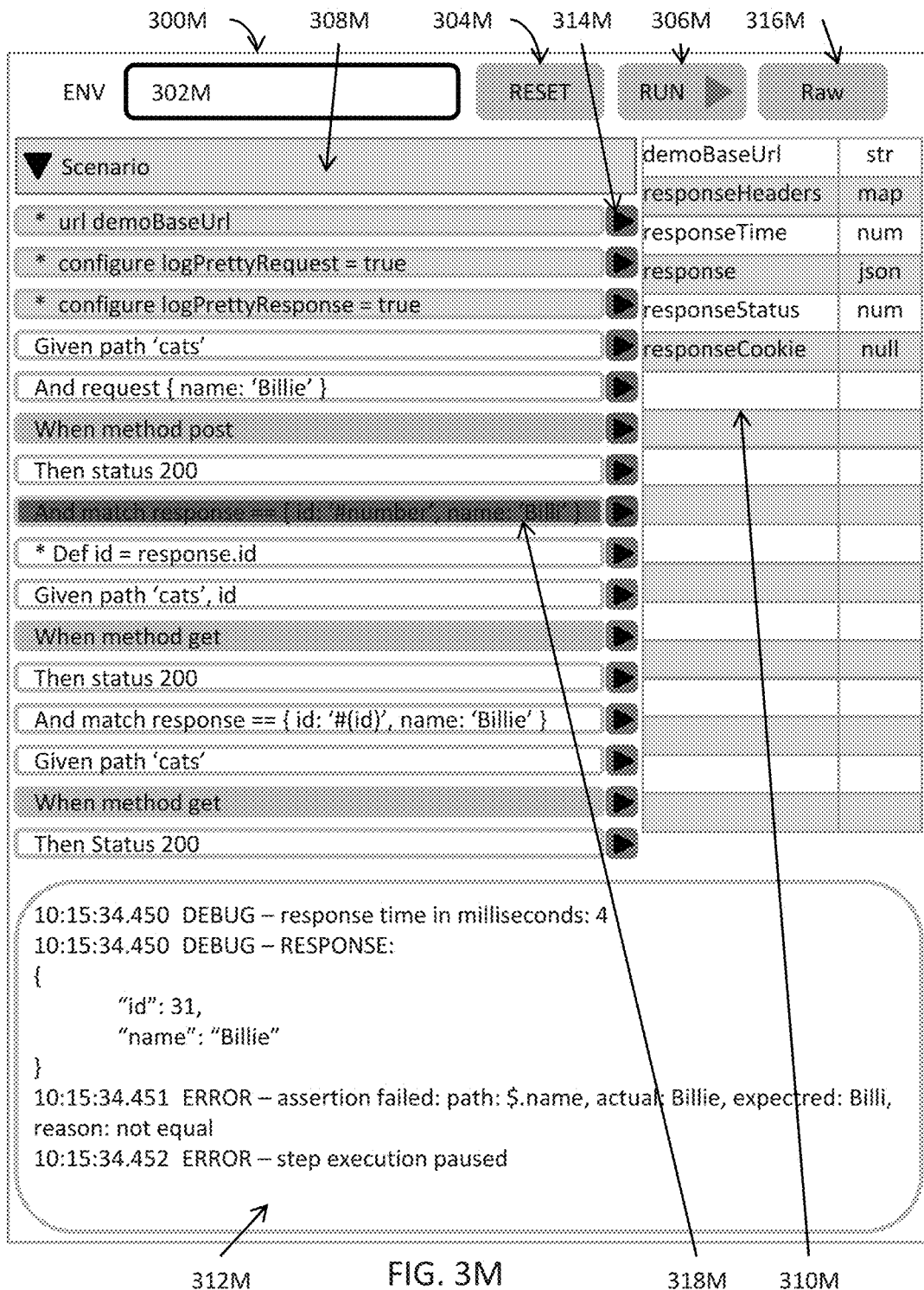
Figure 3N:
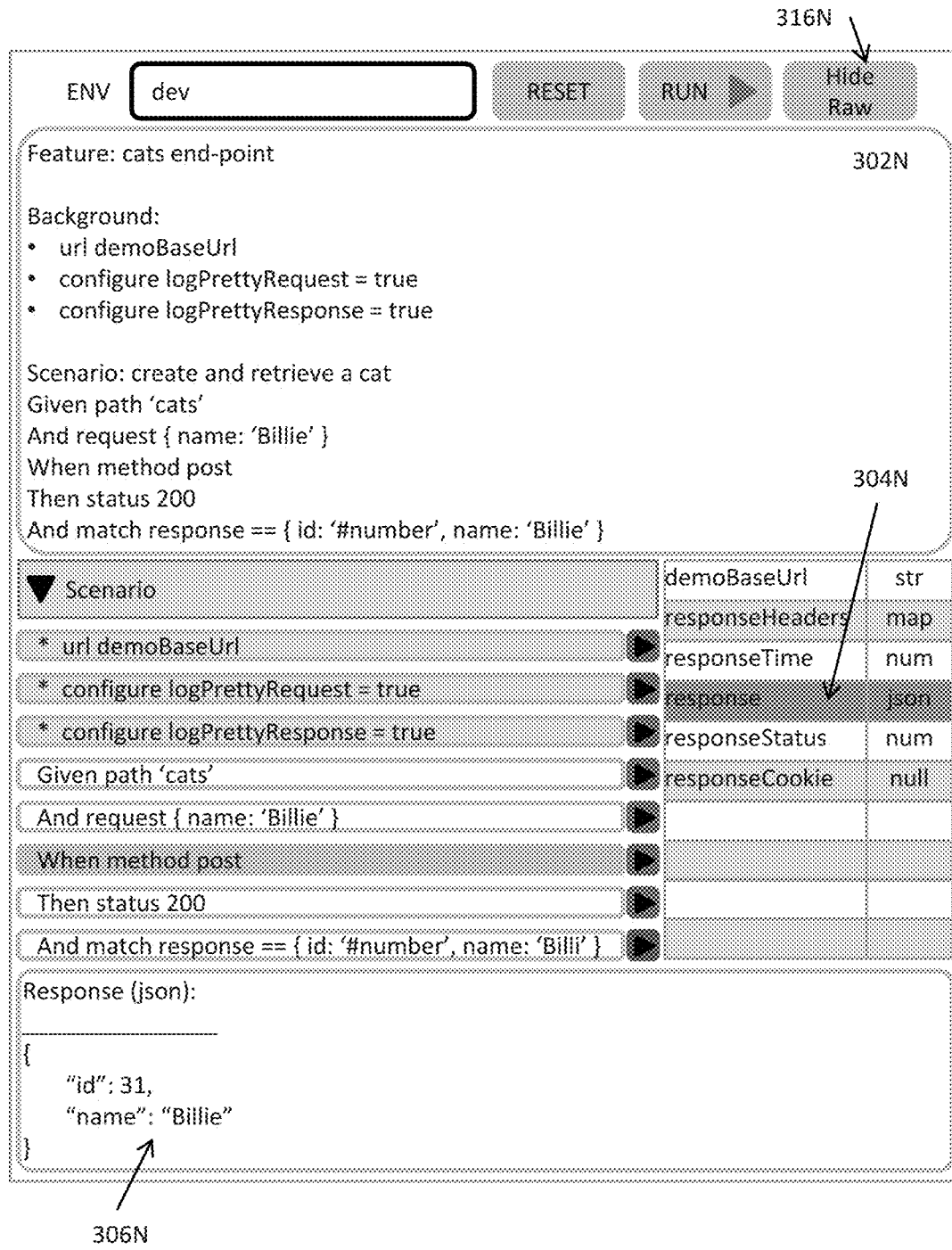

FIGS. 3L-3N illustrate an example user interface demonstrating a new debug class that may be used in testing Web service with the behavior-driven development domain specific language (DSL) framework in one or more embodiments. FIG. 3L illustrates a new debug class as described above with reference to 222D in FIG. 2D to aid debugging when a user is working in, for example, the Java IDE.

FIG. 3M illustrates a custom user interface demonstrating the debugging capability of the behavior-driven development DSL framework. This custom user interface 300M includes a command line input field 302M for a user to enter command-line entries, a reset button 304M to reset a test, a run button 306M to run all the steps in a test, and a raw button 316M to show raw data such as 302N in FIG. 3N. The custom user interface 300M also includes a test case area 308M listing, for example, test scenarios each of which may be individually collapsed as a single entry showing, for example, the identification of the test scenario, or expanded to show detailed steps under a test scenario.

Each step includes the expressions or scripts of the step and may be further linked to an individual run button 314M. A user may click on an individual run button 314M linked to a step to individually play or replay the step. Once an individual run button 314M is clicked upon, its icon may change to a pause button upon which a user may click to pause the execution of this particular step. The custom user interface also allows a user to individually edit the content of each step or even the scenario field (e.g., to modify its metadata or other associated data) even during the execution of the test.

These individual run buttons (e.g., 314M) may be color coded to reflect whether a particular step passes or fails. For example, an individual run button may be colored coded in green to indicate that the corresponding step has passed validation; an individual run button color coded in red (e.g., 318M) indicates that the corresponding step has failed the validation; and individual run buttons color coded in another color (e.g., blue, gray, etc.) indicate that the corresponding test steps are pending execution. In some embodiments, a step may also be color coded accordingly to reflect its state (e.g., passed, failed, pending, etc.) The color coding of a step may be done in a variety of different manners and may be configured by a user. For example, the content of a step may be color coded accordingly. In the alternative, the background of a step may be color coded accordingly to reflect the state of the step.

The custom user interface also includes a variable inspection area 310M for inspecting the corresponding values of one or more variables. For example, a user may click on a specific step, and the custom user interface 300M lists the variables associated with the selected step, the types of the variables, the expected values of the variables, and the returned values of the variables during the test. In some embodiments, a user may actuate (e.g., double click) a variable to pretty-print the variable. For example, a user may double click on a variable in the variable inspection area 310M, and the behavior-driven development DSL framework applies a customizable style of a plurality of selectable stylistic formatting conventions to the selected variable and/or its associated values or data (e.g., type, expected value, returned value, etc.)

The custom user interface 300M may also include a log window 312M to show various pieces of information pertaining to the test. For example, the behavior-driven development DSL framework may display detailed information for an assertion error, match response(s), or any other information or data pertaining to the assertion error. In the example illustrated in FIG. 3M, step 318M failed to pass validation and is thus highlighted (e.g., color coded in red) as such. A user may click on step 318M, and the behavior-driven development DSL framework display details about this assertion failure such as the variable(s) involved, the expected value(s), and the mismatched returned value(s), etc.

FIG. 3N illustrates more details about the example custom user interface 300M illustrated in FIG. 3M. In this example illustrated in FIG. 3N, a user may have clicked on the raw button 316M which in turn changes to "Hide Raw" 316N. The custom user interface 300M is also rearranged to display the raw data in the first display area 302N. FIG. 3N further illustrates an example where a user double clicks on a variable 304N to pretty-print the selected variable 304N; and the behavior-driven development DSL framework shows the results of the pretty-print in the second display area 306N.

Figure 4D:
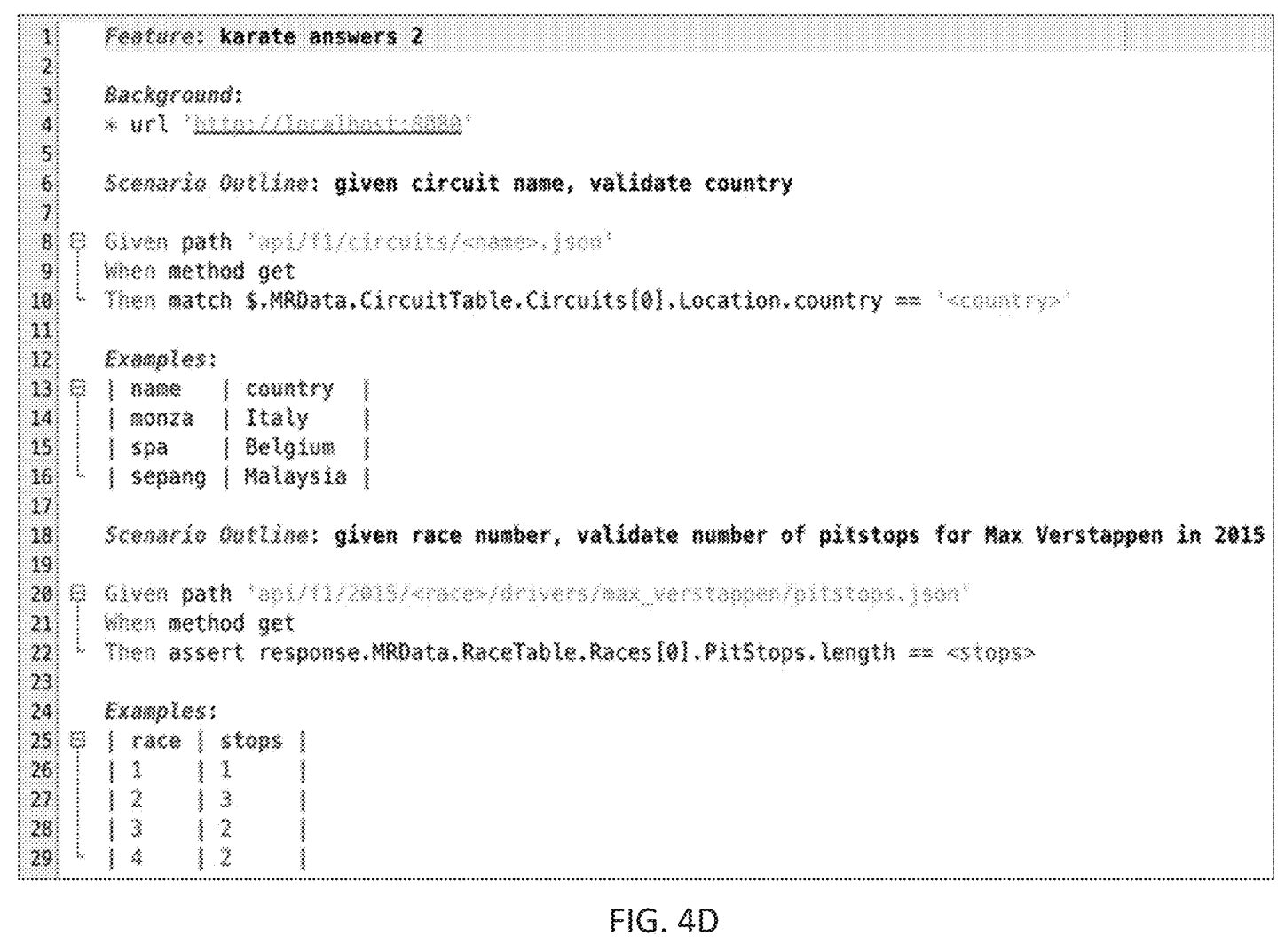
Figure 4G:

FIGS. 4A-4H illustrate some examples of the simplicity and smaller code base of the behavior-driven development domain specific language (DSL) framework compared with other approaches in one or more embodiments. More specifically, FIG. 4A illustrates the example code for a test implemented in REST-assured; and FIG. 4B illustrates the example code for the same test implemented in the behavior-driven development DSL framework. As shown in FIGS. 4A-4B, the behavior-driven development DSL framework provides a more human readable and understandable code; and unlike REST-assured, the behavior-driven development DSL framework does not require indentation.

FIGS. 4C-4D illustrates another comparison between the popular software testing framework REST-assured and the behavior-driven development DSL framework for a slightly more complex test. As shown in FIGS. 4C-4D, the code for REST-assured is substantially longer than that for the behavior-driven development DSL framework. Moreover, the array structures in REST-assured in FIG. 4C are not only non-intuitive but also less understandable than those in the behavior-driven development DSL framework illustrated in FIG. 4D.

FIGS. 4E-4F illustrates another comparison of a few simplified assertions between the popular software testing framework REST-assured (FIG. 4E) and the behavior-driven development DSL framework (FIG. 4F). This comparison further illustrates the readability, compactness (smaller codebase size), and ease of formatting (e.g., no indentations) of the behavior-driven development DSL framework described herein.

FIG. 4G illustrates the differences in an example array between REST-assured and the behavior-driven development DSL framework. The same array when implemented in REST-assured results in the block of code 402G; and the same array implemented in the behavior-driven development DSL framework is illustrated in 404G. As illustrated in FIG. 4G, arrays implemented in the behavior-driven development DSL framework are clearly more intuitive, more human readable and understandable, and more compact in size.

FIG. 4H illustrates the metrics of the comparison between REST-assured and the behavior-driven development DSL framework for the same test illustrated in FIGS. 4C-4G. As shown in FIG. 4H, the code implemented in REST-assured includes 431 lines of code, whereas the code implemented in the behavior-driven development DSL framework includes only 67 lines—nearly 85% reduction in the total lines of code. As the metrics shown in FIG. 4H, the behavior-driven development DSL framework is more efficient than the widely adopted Java language upon which REST-assured is built in that the behavior-driven development DSL framework achieves the same results without having any POJOs or helper code that jointly account for 346 lines of code out of the total 431 lines of code in the REST-assured implementation.

FIGS. 4I-4K illustrates an example of the built-in, native support for JSON/XML schema validation of the behavior-driven development domain specific language (DSL) framework in one or more embodiments. More specifically, these figures illustrate an example of the built-in schema validation of the behavior-driven development DSL framework. FIGS. 4I-4J illustrate the benchmark code for schema validation implemented with the widely popular REST-assured framework. FIG. 4K illustrates the code 400K for the same validation implemented with the behavior-driven development DSL framework described herein.

FIGS. 4I-4K again illustrates the efficiency, readability, and understandability of the behavior-driven development DSL framework. For example, the code 400K needs only the expression id: "#number" (402K) to achieve the same as the block of code 404I in FIG. 4I. Code 400K uses name: '#string', (404K) to achieve the same as the block of code 406I in FIG. 4I. The code segment price: '$? _>0', in code 400K under the behavior-driven development DSL framework achieves the same as the block of code 408I in FIG. 4I. Similarly, tags: '##[_>0] #string', in code 400K achieves the same as the block of code 410I in FIG. 4I. The block of code 410K in code 400K under the behavior-driven development DSL framework achieves the same as the block of code 412I in FIG. 4J. Code segment 412K in code 400K is functionally equivalent to the block of code 414I in FIG. 4J. Code segment 414K invokes the smart compare functionality, and the symbols #[ ] declares an array.

FIG. 4L illustrates examples of constructing JSON or XML from scratch using path expressions with the built-in keyword "set" in the behavior-driven development domain specific language (DSL) framework in one or more embodiments. This example demonstrates the capability of the behavior-driven development DSL framework to set multiple keys via path expressions in one step. If shall be noted that non-existent keys or array elements will be created automatically for convenience in some embodiments. This example further demonstrates that if the variable itself does not exist, the variable will be created automatically for JSON; and JSON arrays may be created or modified by using multiple columns. In addition, the behavior-driven development DSL framework may move the parent path to the top, next to the set keyword for a plurality of deeply nested keys to further reduce the size of the codebase. Although this example is illustrated in JSON, the same also applies to XML, and the behavior-driven development DSL framework may build complicated payloads from scratch in a few lines. In XML implementations, the value column may receive expressions, even XML chunks.

FIGS. 5A-5C illustrate an example of a testing report interface of the behavior-driven development domain specific language (DSL) framework in one or more embodiments. FIG. 5A illustrates that the testing report interface may include the table structure 506A that displays data of interest according to the use's selection by pressing, for example, the left arrow 516A, the right arrow 518A, or the radio buttons 504A. For example, the table structure 506A in FIG. 5A groups the steps according to the features they respectively correspond to in a test.

For each feature listed in the table structure 506A, the testing report interface further lists how many steps passed the validation, how many steps failed the validation, how many steps are skipped in the validation, how many steps are pending in the validation, and how many steps are undefined. The table structure 506A further lists the total number of steps for each listed feature. Steps in different states in the test may be graphically and/or textually emphasized. For example, steps that have passed validation (e.g., 508A) may be color coded in green; steps that have failed validation (e.g., 510A) may be color coded in red; steps that have been skipped (e.g., 512A) in the validation may be color coded in blue; steps that are still pending in the validation may be color coded in yellow; and steps that are undefined may be color coded in orange. The total number of steps for each listed feature may be similarly graphically and/or textually emphasized based on, for example, the criticality of the states of the corresponding steps in each listed feature.

The testing report interface may further include a relative graphical representation of the steps based on the states of these steps in the test. In this example illustrated in FIG. 5A, a pie chart 502A is shown with portions that respectively correspond to the percentages or the numbers of steps associated with their respective states (e.g., passed failed, skipped, pending, undefined). An identification 514A (e.g., the description of what is being shown in the testing report interface) of the relative graphical representation (e.g., the pie chart 502A) may also be attached to or associated with the relative graphical representation.

The radio buttons 504A may also be refreshed to indicate what type of data is being displayed in the testing report interface. When a type of data (e.g., steps illustrated in FIG. 5A) is displayed, the corresponding radio button 504A may be graphically emphasized (e.g., filled circular button), whereas radio buttons 504A corresponding to data that is not displayed in the testing report interface may be graphically de-emphasized (e.g., non-filled circular button). The radio buttons 504A also correspond to the left arrow 516A and right arrow 518A so that when a user clicks on an arrow, the data as well as the corresponding radio button are automatically refreshed.

FIG. 5B illustrates another example of the testing report interface that displays the data about scenarios and features. For example, a user may click on the right arrow 518A to display such data; and the radio button 504A is automatically reflected accordingly. The scenario and feature data lists the validation results of scenarios grouped by features, the temporal duration of execution of each listed feature, and the status of validation of each listed feature as shown in FIG. 5B.

FIG. 5C illustrates another example of the testing report interface that displays the feature report for a selected feature. In this example, a user selected "feature 3" or "F3" (502C) by, for example, double click on or near "feature 3", and the behavior-driven development DSL framework automatically retrieves various validation results pertaining to this selected "feature 3" and displays the retrieved results in the testing report interface. For example, the behavior-driven development DSL framework may retrieve the Background and its steps, the scenario and its steps, as well as other information or data concerning the validation of the selected feature.

Figure 6:
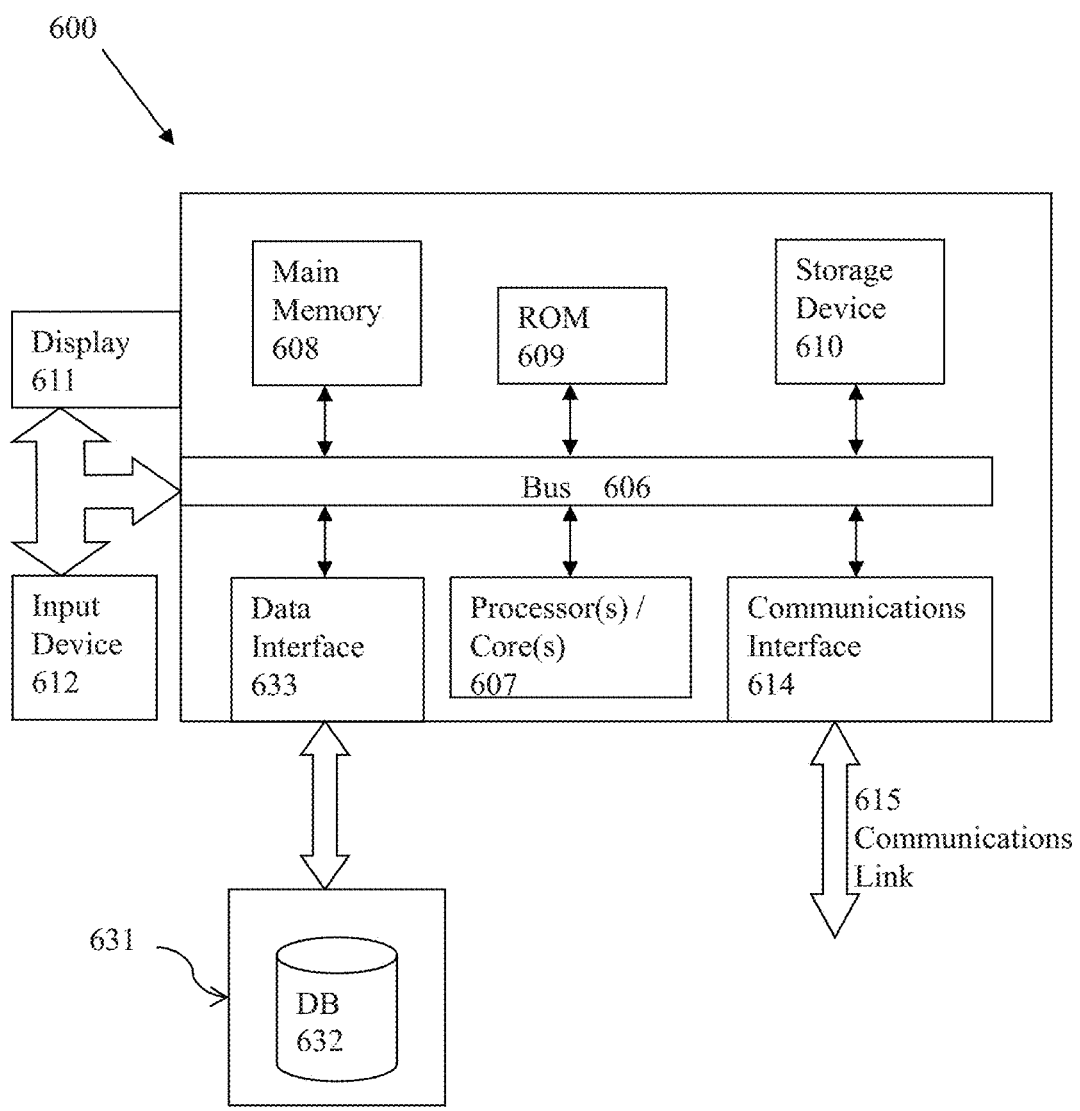
FIG. 6 illustrates a block diagram of an illustrative computing system suitable for the behavior-driven development domain specific language (DSL) framework described herein in one or more embodiments.

Referring to FIG. 6, a block diagram of components of an illustrative computing system 600 suitable for the behavior-driven development domain specific language (DSL) framework described herein in one or more embodiments. For example, the exemplary computing system 600 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 600 includes a bus 606 or other communication mechanism for communicating information, which interconnects subsystems and devices, such as processor 607, system memory 608 (e.g., RAM), static storage device 909 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

According to one embodiment, computer system 600 performs specific operations by one or more processors or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement various embodiments described herein. Thus, these embodiments described herein are not limited to any specific combination of hardware circuitry and/or software. In one embodiment, the term "logic" shall mean any combination of software or hardware that is used to implement all or part of various embodiments described herein. In the single embodiment or in some embodiments, the one or more processors or processor cores 607 may be used to perform various actions such as various actions, processes, or modules involving determining, analyzing, performing actions, etc. In some embodiments, at least one of the one or more processors or processor cores 607 has the multithreading capability.

In one embodiment, the term "logic" shall mean any combination of software or hardware that is used to implement all or part of various embodiments described herein. In the single embodiment or in some embodiments, the one or more processors or processor cores 607 may be used to perform various acts such as various acts involving determining, analyzing, performing actions, etc. In some embodiments, at least one of the one or more processors or processor cores 607 has the multithreading capability to execute a plurality of threads to perform various tasks as described in the preceding sections.

Various actions as described in the preceding paragraphs may be performed by using one or more processors, one or more processor cores, or combination thereof 607. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment, execution of the sequences of instructions to practice this embodiment is performed by a single computer system 900. According to other embodiments, two or more computer systems 600 coupled by communication link 615 (e.g., LAN, PTSN, or wireless network) may perform the sequence of instructions required to practice these other embodiments in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633. A data interface 933, which is coupled to the bus 606, transmits and receives electrical, electromagnetic or optical signals that include data streams representing various types of signal information, e.g., instructions, messages and data. In some embodiments, the functions of the data interface 633 may be performed by the communication interface 614.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

It shall also be noted that although various examples described or drawings illustrated herein refer to a merchant's pairing a connected device (e.g., a cellular phone) with a wireless peripheral (e.g., a wireless transaction card reader), various aspects described apply with full and equal effects to any users who are pairing their connected devices to various types of wireless peripherals. Therefore, the reference to a merchant or a wireless transaction card reader are not intended to and shall not be interpreted as limiting the scope of the application or the scope of the claims, unless otherwise specifically recited or claimed.

Further, where methods or processes described above indicate certain events occurring in certain order, those of ordinary skill in the art having the benefit of this disclosure would recognize that the ordering may be modified and that such modifications are in accordance with the variations of various embodiments described herein. Additionally, parts of methods may be performed concurrently in a parallel process when possible, as well as performed sequentially. Accordingly, embodiments are intended to exemplify alternatives, modifications, and equivalents that may fall within the scope of the claims.

APPENDIX

This Appendix section lists some non-limiting examples, syntax, features, and characteristics of the behavior-driven development DSL framework described herein to demonstrate some example capabilities thereof.

I. Setting and Using Variables
def
　The following examples demonstrate how to set a named variable with the new programming language.
assigning a string value:
Given def myVar='world'
using a variable
Then print myVar
assigning a number (a user may use '*' instead of Given/When/Then)
* def myNum=5
　It shall be noted that in the aforementioned examples, def may overwrite any variable that was using the same name earlier. In some embodiments, the start-up configuration routine could have already initialized some variables before the script even started.
　The examples demonstrate a variety of expression 'shapes' are supported on the right hand side of the =symbol. More details are provided in the Expressions section.
assert
　The following examples demonstrate how to assert if an expression evaluates to true.
　Once defined, a user may refer to a variable by name. Expressions are evaluated using an embedded JavaScript engine. The assert keyword may be used to assert that an expression returns a Boolean value.
Given def color='red'
And def num=5
Then assert color+num=='red 5'
　In the above example, everything to the right of the assert keyword may be evaluated as a single expression.
　It shall be noted that a user may not necessarily need to use assert in test scripts. Rather, the user may use the match keyword that is designed for performing powerful assertions against JSON and XML response payloads.
print
　The following examples demonstrate how to log to the console.
　A user may use print to log variables to the console in the middle of a script. In some embodiments, a user may have multiple expressions separated by commas, so this is the recommended pattern:
* print 'the value of a is:', a
　If a user uses commas (instead of concatenating strings using +), some embodiments may 'pretty-print' variables, which may be what the user desires when dealing with JSON or XML.
* def myJson={foo: 'bar', baz: [1, 2, 3] }
* print 'the value of myJson is:', myJson
　The above example results in the following output:
　20:29:11.290 [main] INFO com.company.karate—[print]
　　the value of
　　myJson is: {
　　　"foo": "bar",
　　　"baz": [
　　　　1,
　　　　2,
　　　　3
　　　]
　　}
　A built-in object will be described in greater detail later, but for now, it shall be noted that this is also injected into print (and even assert) statements, and it has a helpful pretty method, that takes a JSON argument and a prettyXml method that deals with XML. So a user may have also done:
* print 'the value of myJson is: \n'+karate.pretty(myJson)
Also refer to the configure keyword on how to switch on pretty-printing of all HTTP requests and responses.
'Native' data types
Native data types mean that a user may insert them into a script without having to worry about enclosing them in strings and then having to 'escape' double-quotes all over the place. Native data types seamlessly fit 'in-line' within a test script.
JSON
It shall be noted that the parser is 'lenient' so that a user does not have to enclose all keys in double-quotes.
* def cat={name: 'Billie', scores: [2, 5] }
* assert cat.scores[1]==5
When asserting for expected values in JSON or XML, a user may use match rather than assert.
* def cats=[{name: 'Billie' }, {name: 'Bob' }]
* match cats[1]=={name: 'Bob' }
Various embodiments' native support for JSON enables a user to assign parts of a JSON instance into another variable, which is useful when dealing with complex response payloads.
* def first=cats[0]
* match first=={name: 'Billie' }
For manipulating or updating JSON (or XML) using path expressions, refer to the set keyword.
XML
Given def cat=<cat><name>Billie</name><scores><score>2</score><score>5</score></score s></cat>
sadly, xpath list indexes start from 1
Then match cat/cat/scores/score[2]=='5'
but karate allows a user to traverse xml like json !!
Then match cat.cat.scores.score[1]==5
Embedded Expressions
Some embodiments provide a very useful JSON 'templating' approach. Variables may be referred to within JSON, for example:
When def user={name: 'john', age: 21}
And def lang='en'
Then def session={name: '#(user.name)', locale: '#(lang)', sessionUser: '#(user)' }
In this example, the rule is—if a string value within a JSON (or XML) object declaration is enclosed between #(and)—it may be evaluated as a JavaScript expression. And any variables which are alive in the context may be used in this expression.
This comes in useful in some cases—and avoids needing to use the set keyword or JavaScript functions to manipulate JSON. So a user may obtain both advantages: the elegance of JSON to express complex nested data—while at the same time being able to dynamically plug values (that could even be other JSON object-trees) into a JSON 'template'.
A special case of embedded expressions may remove a JSON key (or XML element/attribute) if the expression evaluates to null.
Enclosed JavaScript
An alternative to embedded expressions (for JSON only) is to enclose the entire payload within parentheses—which tells the behavior-driven development domain specific language (DSL) framework to evaluate it as pure JavaScript. This may be much simpler than embedded expressions in many cases, and JavaScript programmers may accomplish these in a much easier and/or efficient manner.
The example below shows the difference between embedded expressions and enclosed JavaScript:

When def user={name: 'john', age: 21}
And def lang='en'
* def embedded={name: '#(user.name)', locale: '#(lang)', sessionUser: '#(user)' }
* def enclosed=({name: user.name, locale: lang, sessionUser: user})
* match embedded==enclosed
So how may a user choose between the two approaches to create JSON? Embedded expressions are useful when the user has complex JSON read from files, because the user may automatically replace (or even remove in some embodiments) data-elements with values dynamically evaluated from variables. JSON may still be 'well-formed', and editable in the IDE or text-editor. Embedded expressions also make more sense in validation and schema-like short-cut situations.
Multi-Line Expressions
The keywords def, set, match and request take multi-line input as the last argument. This is useful when users would like to express a one-off lengthy snippet of text in-line, without having to split it out into a separate file. Here are some examples: # instead of:
* def cat=
<cat><name>Billie</name><scores><score>2</score><score>5</score></score s></cat>
this is more readable:
* def cat=
"""
<cat>
    <name>Billie</name>
    <scores>
        <score>2</score>
        <score>5</score>
    </scores>
</cat>
"""
example of a request payload in-line
Given request
"""
<?xml version='1.0' encoding='UTF-8'?>
<S:Envelope xmlns:S="http://schemas.xmlsoap.org/soap/envelope/">
<S:Body>
<ns2:QueryUsageBalance xmlns:ns2="http://www.mycompany.com/usage/V1">
    <ns2:UsageBalance>
        <ns2:LicenseId>12341234</ns2:LicenseId>
    </ns2:UsageBalance>
</ns2:QueryUsageBalance>
</S:Body>
</S:Envelope>
"""
example of a payload assertion in-line
Then match response==
"""
{id: {domain: "DOM", type: "entityId", value: "#ignore" },
  created: {on: "#ignore" },
  lastUpdated: {on: "#ignore" },
  entityState: "ACTIVE"
}
"""
table
The following examples demonstrate a more efficient way to create JSON.

Because JSON is a 'native' data type that various embodiments described herein understand, there is a more efficient way to create JSON using the provided support for expressing data-tables.
* table cats
  |name|age|
  |'Bob'|2|
  |'Wild'|4|
  |'Nyan'|3|
* match cats==[{name: 'Bob', age: 2}, {name: 'Wild', age: 4}, {name: 'Nyan', age: 3}]

More details about keyword match will be described below, but the advantages of the table keyword are clearly demonstrated. JSON may be combined with the ability to call other *.feature files to achieve dynamic data-driven testing in some embodiments.

It shall be noted that in the above example, string values within the table need to be enclosed in quotes. Otherwise they would be evaluated as expressions, which are useful for some dynamic data-driven situations:
* def one='hello'
* def two={baz: 'world' }
* table json
  |foo|bar|
  |one|{baz: 1}|
  |two.baz|['baz', 'ban']|
* match json==[{foo: 'hello', bar: {baz: 1} }, foo: 'world', bar: ['baz', 'ban'] }]

A user may nest chunks of JSON in tables in some embodiments. An alternate way to create data is using the set multiple syntax. It may be a 'transpose' of the table approach, and may be very convenient when, for example, there are a large number of keys per row or if the nesting is complex. Here is an example of what may be accomplished with the framework described herein:
* set search
  |path|0|1|2|
  |name.first|'John'|'Jane'||
  |name.last|'Smith'|'Doe'|'Waldo'|
  |age|20|||
* match search[0]=={name: {first: 'John', last: 'Smith' }, age: 20}
* match search[1]=={name: {first: 'Jane', last: 'Doe' } }
* match search[2]=={name: {last: 'Waldo' } }
text The following examples demonstrate that some embodiments need not parse text. Rather, these embodiments treat such text as raw text.

In some embodiments, a user may need to or desire to disable the default behavior of attempting to parse anything that looks like JSON (or XML) when using multi-line expressions. This may be relevant when manipulating GraphQL queries—because although they look suspiciously like JSON, they are not, and tend to confuse various modules described herein. And as shown in the example below, having text 'in-line' is useful especially when a user uses the Scenario Outline: and Examples: for data-driven tests involving place-holder substitutions in strings.
Scenario Outline:
note the 'text' keyword instead of 'def'
* text query=
"""
{
  hero(name: "<name>") {
    height
    mass
  }
}
"""
Given path 'graphql'
And request {query: '#(query)'}
And header Accept='application/json'
When method post
Then status 200
Examples:
|name|
|John|
|Smith|

Note that if a user may not necessarily need to inject Examples: into 'placeholders' enclosed within < and >, reading from a file with the extension *.txt may have been sufficient.

For placeholder-substitution, the replace keyword may be used in some embodiments, but with the advantage that the text may be read from a file or dynamically created.
replace The following examples demonstrate text placeholder replacement.

JSON and XML are natively supported by various embodiments described herein via the set keyword and replace is primarily intended for dealing with raw strings. But when a user deals with complex, nested JSON (or XML)—it may be easier in some cases to use replace, such as when the user would like to substitute multiple placeholders with one value, and when the user does not need array manipulation. Because replace automatically converts the result to a string, it may be desired or required to perform type conversion back to JSON (or XML) if applicable.

Some embodiments provide an elegant 'native-like' experience for placeholder substitution within strings or text content. This is useful in any situation where a user needs to concatenate dynamic string fragments to form content such as GraphQL or SQL.

The placeholder format defaults to angle-brackets, for example:
<replaceMe>. Here is example for replacing one placeholder at a time:
* def text='hello <foo> world'
* replace text.foo='bar'
* match text=='hello bar world'

The following examples demonstrate the ease of substituting multiple placeholders in a single, readable step as follows:
* def text='hello <one> world <two> bye'
* replace text
  |token|value|
  |one|'cruel'|
  |two|'good'|
* match text=='hello cruel world good bye'

Note how strings have to be enclosed in quotes. This is so that a user may mix expressions into text replacements as shown below. This example also shows how a user may use a custom placeholder format instead of the default:
* def text='hello <one>world ${two} bye'
* def first='cruel'
* def json={second: 'good' }
* replace text
  |token|value|
  |one|first|
  |${two}|json.second|
* match text=='hello cruel world good bye'
yaml
The following examples demonstrate importing YAML as JSON.

For users who may prefer YAML as a more efficient way to represent data, some embodiments allows these users to read YAML content 'in-line' or even from a file—and it will be auto-converted to JSON.

```
# reading yaml 'in-line', note the 'yaml' keyword instead of 'def'
* yaml foo=
"""
name: John
input:
   id: 1
   subType:
   name: Smith
   deleted: false
"""
# the data is now JSON, so a user may do JSON-things with it.
* match foo==
"""
{
   name: 'John',
   input: {
   id: 1,
   subType: {name: 'Smith', deleted: false}
   }
}
"""
# yaml from a file (the extension matters), and the data-type of 'bar' would be JSON
* def bar=read('data.yaml')
```

JavaScript Functions

JavaScript functions are also "native" to the behavior-driven development domain specific language (DSL) framework in some embodiments. Moreover, functions may take arguments. Standard JavaScript syntax rules apply in these embodiments.

```
* def greeter=function(name){return 'hello'+name}
* assert greeter('Bob')=='hello Bob'
```

When JavaScript executes in some embodiments, the built-in object provides some commonly used utility functions.

Java Interop

For more complex functions, users may use the multi-line 'doc-string' approach. This example actually calls into existing Java code, and being able to do this opens up a lot of options. The JavaScript interpreter may try to convert types across Java and JavaScript as smartly as possible. For example, JSON objects become Java Map-s, JSON arrays become Java List-s, and Java Bean properties are accessible (and update-able) using dot notation e.g. 'object.name'

```
* def dateStringToLong=
"""
function(s) {
   var SimpleDateFormat=Java.type('java.text.SimpleDateFormat');
   var sdf=new SimpleDateFormat("yyyy-MM-dd'T'HH:mm:ss.SSSZ");
   return sdf.parse(s).time; //'.getTime( )' would also have worked instead of '.time'
}
"""
* assert dateStringToLong("2016-12-24T03:39:21.081+0000")==1482550761081
```

More examples of Java interop and how to invoke custom code are described in the section on Calling Java.

The call keyword provides an alternate way of calling JavaScript functions that have one argument. The argument may be provided after the function name, without parentheses, which makes things slightly more readable (and less cluttered) especially when the solitary argument is JSON.

```
* def timeLong=call dateStringToLong '2016-12-24T03:39:21.081+0000'
* assert timeLong==1482550761081
# a better example, with a JSON argument
* def greeter=function(name){return 'Hello'+name.first+' '+name.last+'!'}
* def greeting=call greeter first: 'John', last: 'Smith' }
```

Reading Files

Some embodiments may re-use payload data, utility-functions, and/or even other test-scripts. Users may define complicated JSON (or XML) payloads in a file and then re-use this file in multiple scripts. Keywords such as set and remove allow users to 'tweak' payload-data to fit the scenario under test. Users may benefit from this great simplification in setting up tests for boundary conditions. Re-using payload data enables re-factoring tests when needed or desired, which also enhances maintainability of various artifacts in the behavior-driven development domain specific language (DSL) framework.

In some embodiments, the set (multiple) keyword may build complex, nested JSON (or XML) from scratch in a data-driven manner, and users may not even need to read from files for many situations. Test data may be within the main flow itself, which makes scripts highly human readable and understandable.

Reading files may be achieved using the read keyword. In some embodiments, the file may be expected to be in the same folder (package) as the *.feature file. In some embodiments, users may prefix the name with classpath: in which case the 'root' folder would be src/test/java (assuming the users are using the recommended folder structure).

Prefer classpath:

When a file is expected to be heavily re-used all across a project in some embodiments. Relative paths also work in these embodiments.

```
# json
* def someJson=read('some-json.json')
* def moreJson=read('classpath:more-json.json')
# xml
* def someXml=read('../common/my-xml.xml')
# import yaml (will be converted to json)
* def jsonFromYaml=read('some-data.yaml')
# string
* def someString=read('classpath:messages.txt')
# javascript (will be evaluated)
* def someValue=read('some-js-code.js')
# if the js file evaluates to a function, it may be re-used later using the 'call' keyword
* def someFunction=read('classpath:some-reusable-code.js')
* def someCallResult=call someFunction
# the following short-cut is also allowed
* def someCallResult=call read('some-js-code.js')
```

Users may also re-use other *.feature files from test-scripts as demonstrated immediately below.

```
# perfect for all those common authentication or 'set up' flows
* def result=call read('classpath:some-reusable-steps.feature')
```

In some embodiments where a file does not end in .json, .xml, .yaml, .js or .txt, this file may be treated as a stream which is typically what users would need for multipart file uploads.

```
* def someStream=read('some-pdf.pdf')
```

The .graphql and .gql extensions are also recognized (for GraphQL) but are handled the same way as .txt and treated as a string.

For JSON and XML files, the behavior-driven development DSL framework described herein may evaluate any embedded expressions on load. This enables more concise tests, and the file may be re-usable in multiple, data-driven tests.

Because it is internally implemented as a JavaScript function, users may mix calls to read( ) freely wherever JavaScript expressions are allowed:
* def someBigString=read('first.txt')+read('second.txt')

In some embodiments, users may even use JS expressions to dynamically choose a file based on some condition:
   * def someConfig=read('my-config-'+someVariable+'.json')

A common need may include, for example, using a file as the request body as demonstrated below.
Given request read('some-big-payload.json')
Or in a match:
And match response==read('expected-response-payload.json')

Type Conversion

Some embodiments may automatically convert JSON (and even XML) to Java Map objects. JSON arrays may become Java List-s. Users need not worry about this internal data-representation in at least some of these embodiments.

In some embodiments, for example, if a user acquired a string from some external source, or if a user generated JSON (or XML) by concatenating text or using replace, the user may want to convert a string to JSON and vice-versa. The user may even perform a conversion from XML to JSON if so desired or required.

One example of when a user may want to convert JSON (or XML) to a string is when the user are passing a payload to custom code via Java interop. Note that when passing JSON, the default Map and List representations should suffice for most needs (see example), and using them would avoid un-necessary string-conversion.

A user may use the following type markers instead of def (or the rarely used text) in some embodiments as demonstrated below:
   string—convert JSON or any other data-type (except XML) to a string
   json—convert XML, a map-like or list-like object, a string, or even a Java bean (POJO) into JSON
   xml—convert JSON, a map-like object, a string, or even a Java bean (POJO) into XML
   xmlstring—specifically for converting the map-like Karate internal representation of XML into a string Expressions under the behavior-driven development DSL framework described herein:

The following examples list some 'shapes' that the right-hand-side of an assignment statement may take:

| Example | Shape | Description |
| --- | --- | --- |
| * def foo = 'bar' | JS | simple strings, numbers or booleans |
| * def foo = 'bar' + baz[0] | JS | any valid JavaScript expression, and variables may be mixed in Some embodiments assume that users need JsonPath most of the time, so in some rare cases - a user may need to force these embodiments to evaluate the Right-Hand-Side as JavaScript, which is easily achieved by wrapping the RHS in parentheses |
| * def foo = (bar.length + 1) | JS | |
| * def foo = { bar: '#(baz)'} | JSON | anything that starts with a { or a [ is parsed as JSON, use text instead of def if a user needs to suppress the default behavior |
| * def foo = ({ bar: baz }) | JS | enclosed JavaScript, the result of which is exactly equivalent to the above |
| * def foo = <foo>bar</foo> | XML | anything that starts with a < is parsed as XML, use text instead of def if a user needs to suppress the default behavior |
| * def foo = function(arg){ return arg + bar } | JS Fn | anything that starts with function(. . .){ is parsed as a function. |
| * def foo = read('bar.json') | JS | using the built-in read() function |
| * def foo = $.bar[0] | JsonPath | short-cut JsonPath on the response |
| * def foo = /bar/baz | XPath | short-cut XPath on the response |
| * def foo = bar.baz[0] | var.JsonPath | JsonPath on the variable bar |
| * def foo = bar/baz/ban[1] | var/XPath | XPath on the variable bar |
| * def foo = get bar $..baz[?(@.ban)] | get JsonPath | JsonPath on the variable bar, use get in cases where some embodiments fail to detect JsonPath correctly on the RHS (especially when using filter-criteria). Users may also use get[0] to get the first item if the JsonPath evaluates to an array. |

| Example | Shape | Description |
| --- | --- | --- |
| * def foo = $bar..baz[?(@.ban)] | $var.JsonPath | convenience short-cut for the above |
| * def foo = get bar count(/baz//ban) | get XPath | XPath on the variable bar, use get in cases where some embodiments fail to detect XPath correctly on the RHS (especially when using XPath functions) |
| * def foo = karate.pretty(bar) | JS | using the built-in object in JS expressions |
| * def Foo = Java.type('com.mycompany.Foo') | JS-Java | Java Interop, and even package-name-spaced one-liners like java.lang.System.currentTimeMillis() are possible |
| * def foo = call bar { baz: '#(ban)'} | call | or callonce, where expressions like read('foo.js') are allowed as the object to be called or the argument |
| * def foo = bar({baz: ban}) | JS | equivalent to the above, JavaScript function invocation |

Core keywords may include, for example, url, path, request, method and status in some embodiments.

These keywords may be needed or used for HTTP operations and focus on setting one (un-named or 'key-less') value at a time and therefore don't need an=sign in the syntax.

url

Given url 'https://myhost.com/v1/cats'.

A URL remains constant until a user uses the url keyword again, so this is a good place to set-up the 'non-changing' parts of the r REST URL-s.

A URL may take expressions so the approach below is legal. Variables may come from global config.

Given url 'https://'+e2eHostName+'/v1/api'

If a user is trying to build dynamic URLs including query-string parameters in the form: http://myhost/some/path?foo=bar&search=true—please refer to the param keyword.

path

REST-style path parameters may include expressions that may be evaluated. Comma delimited values are supported which may be more convenient, and takes care of URL-encoding and appending '/' where needed. Given path 'documents/'+documentId+'load'
this is equivalent to the above
Given path 'documents', documentId, 'download'
or users may do the same on multiple lines
Given path 'documents'
And path documentId
And path 'download'

Note that the path 'resets' after any HTTP request is made but not the url. The Hello World is an example of 'REST-ful' use of the url when the test focuses on a single REST 'resource'. Look at how the path did not need to be specified for the second HTTP get call since/cats is part of the url.

If a user attempts to build a URL in the form ?myparam=value by using path the ? may be encoded into %3F. Use either the param keyword, e.g.: * param myparam='value' or url: * url 'http://example.com/v1?myparam' request In-line JSON:

Given request {name: 'Billie', type: 'LOL' }

In-line XML:

And request <cat><name>Billie</name><type>Ceiling</type></cat>

From a file in the same package. Use the classpath: prefix to load from the classpath instead.

Given request read('my-json.json')

Users could always use a variable:

And request myVariable

In most cases, users may not need to set the Content-Type header as some embodiments may automatically execute the right action depending on the data-type of the request.

Defining the request may be required in some embodiments where users are using an HTTP method that expects a body such as post. If users need to have an empty body, the users may use an empty string as shown below, and the users may force the right Content-Type header by using the header keyword.

Given request "
And header Content-Type='text/html' method

The HTTP verb—get, post, put, delete, patch, options, head, connect, trace.

Lower-case is fine.

When method post

During test-execution, it is upon the method keyword that the actual HTTP request is issued. In these embodiments, the step may be in the When form, for example: When method post. And steps that follow should logically be in the Then form.

When method get
the step that immediately follows the above would typically be:
Then status 200 status

This is a shortcut to assert the HTTP response code.

Then status 200

And this assertion may cause the test to fail if the HTTP response code is something else. See also responseStatus.

Keywords that set key-value pairs

Keywords may include param, header, cookie, form field and multipart field.

The syntax may include a '=' sign between the key and the value. The key should not be within quotes.

To make dynamic data-driven testing easier, the following keywords also exist: params, headers, cookies and form fields. They use JSON to build the relevant parts of the HTTP request.

param

Setting query-string parameters:

Given param someKey='hello'
   And param anotherKey=someVariable
   The above would result in a URL like: http://myhost/mypath?someKey=hello&anotherKey=foo. Note that the ? and & will be automatically inserted.
   Multi-value params are also supported:
      * param myParam='foo', 'bar'
   Users may also use JSON to set multiple query-parameters in one-line using params and this is especially useful for dynamic data-driven testing.

header

Users may use functions or expressions:

Given header Authorization=myAuthFunction( )
   And header transaction-id='test-'+myIdString
   In some embodiments, users need not set the Content-Type header as some embodiments may automatically do the right thing depending on the data-type of the request.
   Because of the ease of setting HTTP headers, some embodiments do not provide any special keywords for things like the Accept header. User may simply perform the following:
      Given path 'some/path'
      And request {some: 'data' }
      And header Accept='application/json'
      When method post
      Then status 200
   A usage pattern may include, for example, sending the same header(s) for every request, and configure headers (with JSON) is how users may set this up once for all subsequent requests. And if users do this within a Background: section, it would apply to all Scenario: sections within the *.feature file.
      * configure headers={'Content-Type': 'application/xml' }
   In this example above, Content-Type had to be enclosed in quotes because the hyphen—would cause problems otherwise.
   If users need headers to be dynamically generated for each HTTP request, use a JavaScript function with configure headers instead of JSON.
   Multi-value headers (though rarely used in the wild) are also supported:
      * header myHeader='foo', 'bar'
   Also refer to the headers keyword which uses JSON and makes some kinds of dynamic data-driven testing easier.

cookie

Setting a cookie:

Given cookie foo='bar'
   Users also have the option of setting multiple cookies in one-step using the cookies keyword.
   In some embodiments, any cookies returned in the HTTP response may be automatically set for any future requests. This mechanism works by calling configure cookies behind the scenes and if users need to stop auto-adding cookies for future requests, the users may refer to the following example:
      * configure cookies=null
   Also refer to the built-in variable responseCookies for how users may access and perform assertions on cookie data values.

form field

HTML form fields would be URL-encoded when the HTTP request is submitted (by the method step). Users would typically use these to simulate a user sign-in and then grab a security token from the response. For example:

Given path 'login'
   And form field username='john'
   And form field password='secret'
   When method post
   Then status 200
   And def authToken=response.token
   A good example of the use of form field for a typical sign-in flow is this OAuth 2 demo: oauth2.feature.
   Multi-values are supported the way a user may expect (e.g. for simulating check-boxes and multi-selects):
      * form field selected='apple', 'orange'
   Users may also dynamically set multiple fields in one step using the form fields keyword.

multipart field

In some embodiments, "multipart field" may be used for building multipart named (form) field requests. This may be combined with multipart file as shown below.

multipart file

Given multipart file myFile={read: 'test.pdf', filename: 'upload-name.pdf', contentType: 'application/pdf' }
   And multipart field message='hello world'
   When method post
   Then status 200
   Note that multipart file takes a JSON argument so that a user may set the filename and the contentType (mime-type) in one step.
      read: mandatory, —the name of a file, and the classpath: prefix also is allowed.
      filename: optional, will default to the multipart field name if not specified
      contentType: optional, will default to application/octet-stream
   When 'multipart' content is involved, the Content-Type header of the HTTP request may be configured to default to multipart/form-data. A user may override it by using the header keyword before the method step. Look at multipart entity for an example.

multipart entity

Multipart entity is technically not in the key-value form: multipart field name='foo', but logically belongs here in the documentation.
   Multipart entity may be used for multipart content items that don't have field-names. The example below demonstrates using the multipart/related content-type.
      Given path '/v2/documents'
      And multipart entity read('foo.json')
      And multipart field image=read('bar.jpg')
      And header Content-Type='multipart/related'
      When method post
      Then status 201

Keywords that set multiple key-value pairs in one step

Parameters, headers, cookies and form fields take a single JSON argument (which may be in-line or a variable reference), and this enables certain types of dynamic data-driven testing, especially because any JSON key with a null value will be ignored. Here is a good example in the demos: dynamic-params.feature params

* params {searchBy: 'client', active: true, someList: [1, 2, 3] } headers
      def someData={Authorization: 'sometoken', tx_id: '1234', extraTokens: ['abc', 'def'] }
   * headers someData cookies

* cookies {someKey: 'someValue', foo: 'bar' } form fields
    def credentials={username: '#(user.name)', password: 'secret', projects: ['one', 'two'] }
    form fields credentials
SOAP Because a SOAP request may need special handling, this is the case where the method step is not used to actually fire the request to the server.

soap action

The name of the SOAP action specified is used as the 'SOAPAction' header. The following is an example which also demonstrates how a user could assert for expected values in the response XML.

Given request read('soap-request.xml')
    When soap action 'QueryUsageBalance'
    Then status 200
    And match response /Envelope/Body/QueryUsageBalanceResponse/Result/Error/Code=='DAT_USAGE_1003'
    And match response/Envelope/Body/QueryUsageBalanceResponse==read('expected-response.xml')

Here is a working example of calling a SOAP service from an example test-suite: soap.feature There is also a few examples that show various ways of parameter-izing and dynamically manipulating SOAP requests. Various embodiments are flexible and allow users to choose options and evolve a pattern for tests—that fits the users' environment: xml.feature Managing Headers, SSL, Timeouts and HTTP Proxy configure Users may adjust configuration settings for the HTTP client used by various embodiments described herein using this keyword. The syntax is similar to def but instead of a named variable, users update configuration. The following section lists some examples of configuration keys that are supported in some embodiments:

| Key | Type | Description |
| --- | --- | --- |
| headers | JavaScript Function | See configure headers |
| headers | JSON | See configure headers |
| cookies | JSON | Just like configure headers, but for cookies. A user may not necessarily use this, as response cookies are auto-added to all future requests. However, if a user needs to clear any cookies, just do configure cookies = null at any time. |
| logPrettyRequest | boolean | Pretty print the request payload JSON or XML with indenting (default false) |
| logPrettyResponse | boolean | Pretty print the response payload JSON or XML with indenting (default false) |
| printEnabled | boolean | May be used to suppress the print output when not in 'dev mode' (default true) |
| ssl | boolean | Enable HTTPS calls without needing to configure a trusted certificate or key-store. |
| ssl | string | Like above, but force the SSL algorithm to one of these values. (The above form internally defaults to TLS if simply set to true). |
| followRedirects | boolean | Whether the HTTP client automatically follows redirects - (default true), refer to this example. |
| connectTimeout | integer | Set the connect timeout (milliseconds). The default is 30000 (30 seconds). |
| readTimeout | integer | Set the read timeout (milliseconds). The default is 30000 (30 seconds). |

| Key | Type | Description |
| --- | --- | --- |
| proxy | string | Set the URI of the HTTP proxy to use. |
| proxy | JSON | For a proxy that requires authentication, set the uri, username and password. (See example below). |
| httpClientClass | string | See karate-mock-servlet |
| httpClientInstance | Java Object | See karate-mock-servlet |
| userDefined | JSON | See karate-mock-servlet |

Examples:
pretty print the response payload
* configure logPrettyResponse=true
enable ssl (and no certificate is required)
* configure ssl=true
enable ssl and force the algorithm to TLSv1.2
* configure ssl='TLSv1.2'
time-out if the response is not received within 10 seconds (after the connection is established)
* configure readTimeout=10000
set the uri of the http proxy server to use
* configure proxy='http://my.proxy.host:8080'
    # proxy which needs authentication
* configure proxy={uri: 'http://my.proxy.host:8080', username: 'john', password: 'secret' }

If users need to set some of these 'globally' the users may easily do so using the karate object in karate-config.js.

Preparing, Manipulating and Matching Data

Now it is clear how various embodiments render expressing JSON or XML a much easier task with the behavior-driven development domain specific language (DSL) framework. If users read from a file, the advantage is that multiple scripts may re-use the same data.

When users have a JSON or XML object, some embodiments provide multiple ways to manipulate, extract or transform data. Users may easily assert that the data is as expected by comparing it with another JSON or XML object.

match

Payload Assertions/Smart Comparison

The match operation includes built-in intelligence because, for example, white-space does not matter, and the order of keys (or data elements) does not matter. Some embodiments are even able to ignore fields users choose—which is very useful when users want to handle server-side dynamically generated fields such as UUID-s, time-stamps, security-tokens and the like.

The match syntax involves a double-equals sign '==' to represent a comparison (and not an assignment '=').

Because match and set may perform well together, they are both introduced in the examples in the section below.

set

Manipulating Data

Setting values on JSON documents is a more efficient using the set keyword and JsonPath expressions.

* def myJson=foo: 'bar' }
* set myJson.foo='world'
* match myJson=={foo: 'world' }
add new keys. A user may use pure JsonPath expressions (notice how this is different from the above).
* set myJson $.hey='ho'
* match myJson=={foo: 'world', hey: 'ho' }
and even append to json arrays (or create them automatically)
* set myJson.zee[0]=5

```
* match myJson=={foo: 'world', hey: 'ho', zee: [5] }
# omit the array index to append
* set myJson.zee[ ]=6
* match myJson=={foo: 'world', hey: 'ho', zee: [5, 6] }
# nested json ? no problem
* set myJson.cat={name: 'Billie' }
* match myJson==foo: 'world', hey: 'ho', zee: [5, 6], cat:
{name: 'Billie' }
}
# and for match—the order of keys does not matter
* match myJson=={cat: {name: 'Billie' }, hey: 'ho', foo:
'world', zee: [5, 6]
}
# a user may ignore fields marked with '#ignore'
* match myJson=={cat: '#ignore', hey: 'ho', foo: 'world',
zee: [5, 6] }
```
XML and XPath works just as users normally expect.
```
* def cat=<cat><name>Billie</name></cat>
* set cat/cat/name='Jean'
* match cat/==<cat><name>Jean</name></cat>
# a user may even set whole fragments of xml
* def xml=<foo><bar>baz</bar></foo>
* set xml/foo/bar=<hello>world</hello>
*  match   xml==<foo><bar><hello>world</hello></
bar></foo>
```
Refer to the section on XPath Functions for examples of advanced XPath usage.

match and variables

In some embodiments, variables (and even expressions) are supported on the right-hand-side. So users may compare two JSON (or XML) payloads if the users so desire or require as shown in the simplified example below:
```
* def foo={hello: 'world', baz: 'ban' }
* def bar={baz: 'ban', hello: 'world' }
* match foo==bar
```
In some embodiments, the left-hand-side has to be either a variable name, or a 'named' Json-Path or XPath expression. And the right-hand-side may be any valid Karate expression.

match !=(not equals)

The 'not equals' operator !=works as users normally expect:
```
* def test=foo: 'bar' }
* match test !=foo: 'baz' }
```
Users may or may not need to use the !=(not-equals) operator ! in some embodiments. For example, user may use the sparingly in string, number or simple payload comparisons.

set multiple

Some embodiments provide an more efficient and human readable way to set multiple keys (via path expressions) in one step. For convenience, non-existent keys (or array elements) will be created automatically.
```
* def cat={name: ''}
* set cat
|path|value|
|name|'Bob'|
|age|5|
* match cat=={name: 'Bob', age: 5}
```
One additional advantage for JSON is that if the variable does not exist, it will be created automatically. Users may even create (or modify existing) JSON arrays by using multiple columns.
```
* set foo
|path|0|1|
|bar|'baz'|'ban'|
* match foo==[{bar: 'baz' }, {bar: 'ban' }]
```

The same concept may also apply to XML, and users may build complicated payloads from scratch in just a few, extremely readable lines. The value column may take expressions, even XML chunks.
```
* set search/acc:getAccountByPhoneNumber
|path|value|
|acc:phone/@foo|'bar'|
|acc:phone/acc:number[1] |1234|
|acc:phone/acc:number[2] |5678|
|acc:phoneNumberSearchOption|'all'|
* match search==
"""
<acc:getAccountByPhoneNumber>
<acc: phone foo="bar">
   <acc:number>1234</acc:number>
   <acc:number>5678</acc:number>
</acc:phone>
<acc:phoneNumberSearchOption>all</acc:phoneNum-
berSearchOption>
</acc:getAccountByPhoneNumber>
"""
```
remove This is like the opposite of set if users need to remove keys or data elements from JSON or XML instances. Users may even remove JSON array elements by index.
```
* def json={foo: 'world', hey: 'ho', zee: [1, 2, 3] }
* remove json.hey
* match json==foo: 'world', zee: [1, 2, 3] }
* remove json $.zee[1]
* match json==foo: 'world', zee: [1, 3] }
```
remove works for XML elements as well:
```
*  def  xml=<foo><bar><hello>world</hello></bar></
foo>
* remove xml/foo/bar/hello
* match xml==<foo><bar/></foo>
* remove xml/foo/bar
* match xml==<foo/>
```
Also take a look at how a special case of embedded-expressions may remove key-value pairs from a JSON (or XML) payload: Remove if Null.

Fuzzy/Approximate Matching

Ignore or Validate

When expressing expected results (in JSON or XML) users may mark some fields to be ignored when the match (comparison) is performed in some embodiments. Users may even use a regular-expression so that instead of checking for equality, Some embodiments may validate that the actual value conforms to the expected pattern.

In some of these embodiments, even when users have dynamic server-side generated values such as UUID-s and time-stamps appearing in the response, users may still assert that the full-payload matched in one step.
```
def cat={name: 'Billie', type: 'LOL', id: 'a9f7a56b-8d5c-
    455c-9d13-808461d17b91' }
match cat=={name: '#ignore', type: '#regex [A-Z]{3}',
    id: '#uuid' } # this will fail
#* match cat=={name: '#ignore', type: '#regex.{2}', id:
    '#uuid' }
```
The supported markers are the following:

| Marker | Description |
| --- | --- |
| #ignore | Skip comparison for this field |
| #null | Expects actual value to be null |
| #notnull | Expects actual value to be not-null |
| #array | Expects actual value to be a JSON array |

| Marker | Description |
| --- | --- |
| #object | Expects actual value to be a JSON object |
| #boolean | Expects actual value to be a boolean true or false |
| #number | Expects actual value to be a number |
| #string | Expects actual value to be a string |
| #uuid | Expects actual (string) value to conform to the UUID format |
| #regex STR | Expects actual (string) value to match the regular-expression 'STR' (see examples above) |
| #? EXPR | Expects the JavaScript expression 'EXPR' to evaluate to true, see self-validation expressions below |
| #[NUM] EXPR | Advanced array validation, see schema validation |
| #(EXPR) | For completeness, embedded expressions belong in this list as well |

Optional Fields

If two cross-hatch # symbols are used as the prefix (for example: ##number), it means that the key is optional or that the value may be null.

* def foo={bar: 'baz' }
* match foo=={bar: '#string', ban: '##string' }

Remove If Null

In some embodiments, users may combine the optional marker with an embedded expression as follows: if the embedded expression evaluates to null—the JSON key (or XML element or attribute) will be deleted from the payload (the equivalent of remove).

* def data=a: 'hello', b: null, c: null}
* def json={foo: '#(data.a)', bar: '#(data.b)', baz: '##(data.c)' }
* match json=={foo: 'hello', bar: null}

'Self' Validation Expressions

The special 'predicate' marker #? EXPR in the table above is an interesting one. It may be explained via examples.

Observe how the value of the field being validated (or 'self') is injected into the 'underscore' expression variable: '_'

*def date={month: 3}
* match date=={month: '#? _>0 &&_<13' }

What is even more interesting is that expressions may refer to variables:

*def date={month: 3}
* def min=1
*def max=12
* match date=={month: '#? _>=min &&_<=max' }

With the behavior-driven development domain specific language (DSL) framework, uses may evolve a set of utilities that validate all or some of the domain objects.

*def date={month: 3}
* def isValidMonth=function(m) {return m>=0 && m<=12}
* match date=={month: '#? isValidMonth(_)' }

Especially because strings may be easily coerced to numbers (and vice-versa) in Javascript, a user may combine built-in validators with the self-validation 'predicate' form like this: '#number? _>0'
given this invalid input (string instead of number)
* def date=month: '3' }
this will pass
* match date=={month: '#? _>0' }
but this 'combined form' will fail, which is what we want
* match date=={month: '#number? _>0' }

Referring to the JSON root

Users may actually refer to any JsonPath on the document via $ and perform cross-field or conditional validations ! This example uses contains and the #? 'predicate' syntax, and situations where this comes in useful will be apparent when we discuss match each.

Given def temperature={celsius: 100, fahrenheit: 212}
Then match temperature=={celsius: '#number', fahrenheit: '#? _==$.celsius*1.8+32' }
when validation logic is an 'equality' check, an embedded expression works better
Then match temperature contains {fahrenheit: '#($.celsius*1.8+32)' } match for Text and Streams
when the response is plain-text
Then match response=='Health Check OK'
And match response !='Error'
when the response is a file (stream)
Then match response==read('test.pdf')
incidentally, match and assert behave exactly the same way for strings
* def hello='Hello World!'
* match hello=='Hello World!'
* assert hello=='Hello World!'

Checking if a string is contained within another string is a very common need and match (name) contains works just like users normally expect:

* def hello='Hello World!'
* match hello contains 'World'
* match hello !contains 'blah' match header

Because asserting against header values in the response is a common task—match header has a special meaning. It short-cuts to the pre-defined variable responseHeaders and reduces some complexity—because strictly, HTTP headers are a 'multi-valued map' or a 'map of lists'—the Java-speak equivalent being Map<String, List<String>>.

so after a http request
Then match header Content-Type=='application/json'
'contains' works as well
Then match header Content-Type contains 'application'

Note the extra convenience where a user does not have to enclose the LHS key in quotes.

Users may always directly access the variable called responseHeaders if users wanted to do more checks, but a user may not necessarily need to.

Matching Sub-Sets of JSON Keys and Arrays
match contains
JSON Keys

In some cases where the response JSON is wildly dynamic, users may want to only check for the existence of some keys. And match (name) contains is how users may do so:

* def foo={bar: 1, baz: 'hello', ban: 'world' }
* match foo contains {bar: 1}
* match foo contains {baz: 'hello' }
* match foo contains {bar:1, baz: 'hello' }
this will fail
* match foo=={bar:1, baz: 'hello' }

(not) !contains

In some embodiments, it is useful to be able to check if a key-value-pair does not exist. This is enabled by prefixing contains with a ! (with no space in between).

* def foo={bar: 1, baz: 'hello', ban: 'world' }
* match foo !contains {bar: 2}
* match foo !contains {huh: '#notnull' }

The ! (not) operator is especially useful for contains and JSON arrays.
   * def foo=[1, 2, 3]
   * match foo !contains 4
   * match foo !contains [5, 6]
JSON Arrays JsonPath may be the tool of choice for slicing and dicing JSON into manageable chunks. It is worth taking a few minutes to go through the documentation and examples here: JsonPath Examples.

Here are some example assertions performed while scraping a list of child elements out of the JSON below. Observe how users may match the result of a JsonPath expression with users' expected data.
   Given def cat=
   """
   {
   name: 'Billie',
   kittens: [
      {id: 23, name: 'Bob' },
      {id: 42, name: 'Wild' }
   ]
   }
   """
   # normal 'equality' match. note the wildcard '*' in the JsonPath (returns an array)
   Then match cat.kittens[*].id==[23, 42]
   # when inspecting a json array, 'contains' just checks if the expected items exist
   # and the size and order of the actual array does not matter
   Then match cat.kittens[*].id contains 23
   Then match cat.kittens[*].id contains [42]
   Then match cat.kittens[*].id contains [23, 42]
   Then match cat.kittens[*].id contains [42, 23]
   # a user may assert against nested objects within JSON arrays !
   Then match cat.kittens contains [{id: 42, name: 'Wild' }, {id: 23, name: 'Bob' }]
   # . . . and even ignore fields at the same time !
   Then match cat.kittens contains {id: 42, name: '#string' }

It is worth mentioning that to do the equivalent of the last line in Java, users would typically have to traverse two Java Objects, one of which is within a list, and users would have to check for nulls as well.

When users use various embodiments described herein, all the data assertions may be done in pure JSON and without needing a thick forest of companion Java objects. When users read JSON objects from (re-usable) files, even complex response payload assertions may be accomplished in just a single line of script with the behavior-driven development domain specific language (DSL) framework described herein.
match contains only For those cases where users need to assert that all array elements are present but in any order the users may perform the following:
   * def data=foo: [1, 2, 3] }
   * match data.foo contains 1
   * match data.foo contains [2]
   * match data.foo contains [3, 2]
   * match data.foo contains only [3, 2, 1]
   * match data.foo contains only [2, 3, 1]
   # this will fail
   #* match data.foo contains only [2, 3]
Validate every element in a JSON array
match each The match keyword may be made to iterate over all elements in a JSON array using the each modifier. The following is an working example:
   * def data=foo: [{bar: 1, baz: 'a' }, {bar: 2, baz: 'b' }, {bar: 3, baz: 'c'}]}
   * match each data.foo=={bar: '#number', baz: '#string' }
   # a user may use 'contains' the way the user would expect
   * match each data.foo contains {bar: '#number' }
   * match each data.foo contains {bar: '#? _!=4' }
   # some more examples of validation macros
   * match each data.foo contains {baz: "#? _!='z'" }
   * def isAbc=function(x) {return x=='a'||x=='b'|x=='c' }
   * match each data.foo contains {baz: '#? isAbc(_)' }

Here is another example that uses match each, contains and the #? 'predicate' marker to validate that the value of totalPrice is always equal to the roomPrice of the first item in the room Information array.
   Given def json=
   """
   {
   "hotels": [
      {"roomInformation": [{"roomPrice": 618.4}], "totalPrice": 618.4},
      {"roomInformation": [{"roomPrice": 679.79}], "totalPrice": 679.79}
   ]
   }
   """
   Then match each json.hotels contains {totalPrice: '#? _==_$.roomInformation[0].roomPrice' }
   # when validation logic is an 'equality' check, an embedded expression works better
   Then match each json.hotels contains {totalPrice: '#(_$.roomInformation[0].roomPrice)' }
Referring to self While $ always refers to the JSON 'root', note the use of _$ above to represent the 'current' node of a match each iteration. Here is a recap of symbols that may be used in JSON embedded expressions:
Evaluates To
Symbol
$ The 'root' of the JSON document in scope
_ The value of 'self'
_$ The 'parent' of 'self' or 'current' item in the list, relevant when using match each There is a shortcut for match each explained in the next section that may be quite useful, especially for 'in-line' schema-like validations.
Schema Validation Various embodiments provide a much simpler and more powerful way than JSON-schema to validate the structure of a given payload. Users may even mix domain and conditional validations and perform all assertions in a single step.

But first, a special short-cut for array validation needs to be introduced:
   * def foo=['bar', 'baz']
   # should be an array
   * match foo=='#[ ]'
   # should be an array of size 2
   * match foo=='#[2]'
   # should be an array of strings with size 2
   * match foo=='#[2] #string'
   # each array element should have a 'length' property with value 3
   * match foo=='#[ ]? _.length==3'
   # should be an array of strings each of length 3
   * match foo=='#[ ] #string? _.length==3' should be null or an array of strings
* match foo=='##[ ] #string'

This 'in-line' short-cut for validating JSON arrays is similar to how match each works. In these embodiments, complex payloads (that include arrays) may easily be validated in one step by combining validation markers like so:

def oddSchema={price: '#string', status: '#? _<3', ck: '##number',
name: '#regex[0-9X]' }
* def isValidTime=read('time-validator.js')
When method get
Then match response==
"""
{
id: '#regex[0-9]+',
count: '#number',
odd: '#(oddSchema)',
data: {
   countryId: '#number',
   countryName: '#string',
   leagueName: '##string',
   status: '#number? _>=0',
   sportName: '#string',
   time: '#? isValidTime(_)'
},
odds: '#[ ] oddSchema'
}
"""

In these examples, the re-use of the oddSchema both as an embedded-expression and as an array validation (on the last line).

In some embodiments, users may perform conditional/cross-field validations and even business-logic validations at the same time.

optional (may be null) and if present should be an array of size greater than zero
* match $.odds=='##[_>0]'
should be an array of size equal to $.count
* match $.odds=='#[$.count]'
use a predicate function to validate each array element
* def isValidOdd=function(o){return o.name.length==1}
* match $.odds=='#[ ]? isValidOdd(_)' contains short-cuts

In some embodiments where payloads are complex (or highly dynamic), users may use contains semantics. Some embodiments provide the following short-cut symbols designed to be mixed into embedded expressions:

Symbol Means
^ contains
^^ contains only
!^ not contains

So given the following data:
* def foo=[{a: 1, b: 'x' }, {a: 2, b: 'y' }]
* def exact={a: '#number', b: '#string' }
* def partial={a: '#number' }
* def nope={c: '#boolean' }
* def reversed=[{a: 2, b: 'y' }, {b: 'x', a: 1}]
* def first=a: 1, b: 'x' }
* def others=[{a: 3, b: 'u' }, {a: 4, b: 'v' }]

Here are the alternative forms compared with the 'normal' form. Note that the short-cut forms on the right all resolve to 'equality' (==) matches, which enables them to be 'in-lined' into a full payload match, using embedded expressions.

| Normal Form | In-Line Form |
|---|---|
| * match foo[0] == exact | * match foo[0] == '#(exact)' |
| * match foo[0] contains partial | * match foo[0] == '#(^partial)' |
| * match foo[0] !contains nope | * match foo[0] == '#(!^ nope)' |
| * match each foo == exact | * match foo == '#[] exact' |
| * match each foo contains partial | * match foo == '#[] ^partial' |
| * match each foo !contains nope | * match foo == '#[] !^nope' |
| * match foo contains only reversed | * match foo == '#(^^reversed)' |
| * match foo contains first | * match foo == '#(^first)' |
| * match foo !contains others | * match foo == '#(!^others)' |
| * assert foo.length == 2 | * match foo == '#[2]' |

The last one illustrated above is a different from the rest, and this short-cut form is the recommended way to validate the length of a JSON array. As a rule, prefer match over assert, because match failure messages are more detailed and descriptive.

In some tests, these are very useful when the order of items in arrays returned from the server is not guaranteed. Users may easily assert that all expected elements are present, even in nested parts of the JSON—while doing a match on the full payload.

* def cat=
"""
{
name: 'Billie',
kittens: [
   {id: 23, name: 'Bob' },
   {id: 42, name: 'Wild' }
]
}
"""
* def expected=[{id: 42, name: 'Wild' }, {id: 23, name: 'Bob' }]
* match cat=={name: 'Billie', kittens: '#(^^expected)' } get

By now, it should be clear that JsonPath may be used for extracting JSON 'trees' out of a given object. The get keyword allows a user to save the results of a JsonPath expression for later use—which is especially useful for dynamic data-driven testing.

* def cat=
"""
{
name: 'Billie',
kittens: [
   {id: 23, name: 'Bob' },
   {id: 42, name: 'Wild' }
]
}
"""
* def kitnums=get cat.kittens[*].id
* match kitnums==[23, 42]
* def kitnames=get cat $.kittens[*].name
* match kitnames==['Bob', 'Wild']

get short-cut

The 'short cut' $variableName form is also supported. So the above could be re-written as follows:
* def kitnums=$cat.kittens[*].id
* match kitnums==[23, 42]
* def kitnames=$cat.kittens[*].name
* match kitnames==['Bob', 'Wild']

get plus index

An advantage that the get syntax supports (not the $ short-cut form) is to return a single element if the right-hand-side evaluates to a list-like result (e.g. a JSON array). This is advantageous because the moment users use a wildcard [*] (or search filter) in JsonPath, users get a list back even though users typically may be only interested in the first item.

* def actual=23
so instead of this
* def kitnums=get cat.kittens[*].id
* match actual==kitnums[0]
a user may do this in one line
* match actual==get[0] cat.kittens[*].id JsonPath filters JsonPath filter expressions are very useful for extracting elements that meet some filter criteria out of arrays.

* def cat=
"""
{
name: 'Billie',
kittens: [
   {id: 23, name: 'Bob' },
   {id: 42, name: 'Wild' }
]
}
"""
find single kitten where id==23
* def bob=get[0] cat.kittens[?(@.id==23)]
* match bob.name=='Bob'
using the karate object if the expression is dynamic
*    def    temp=karate.jsonPath(cat,    "$.kittens[?(@.name=="'+bob.name+111)]11)
* match temp[0]==bob Users may not need this in some embodiments, but the second-last line above shows how the karate object may be used to evaluate a JsonPath if the filter expression depends on a variable.

XPath Functions

When handling XML, users may need to call XPath functions, for example to get the count of a node-set. A valid XPath expression is allowed on the left-hand-side of a match statement.

* def myXml=
"""
<records>
<record index="1">a</record>
<record index="2">b</record>
<record index="3" foo="bar">c</record>
</records>
"""
* match foo count(/records//record)==3
* match foo//record[@index=2]=='b'
* match foo//record[@foo='bar']=='c'

Advanced XPath

Some XPath expressions return a list of nodes (instead of a single node). But because users may express a list of data-elements as a JSON array—even these XPath expressions may be used in match statements.

* def teachers=
"""
<teachers>
<teacher department="science">
  <subject>math</subject>
  <subject>physics</subject>
</teacher>
<teacher department="arts">
  <subject>political education</subject>
  <subject>english</subject>
</teacher>
</teachers>
"""
* match teachers Meacher[@department='science']/subject==['math', 'physics']

Special Variables

These are 'built-in' variables, there are only a few and all of them give the users access to the HTTP response.

response

After every HTTP call this variable is set with the response body, and is available until the next HTTP request over-writes it. Users may easily assign the whole response (or just parts of it using Json-Path or XPath) to a variable, and use it in later steps.

The response may be automatically available as a JSON, XML or String object depending on what the response contents are.

As a short-cut, when running JsonPath expressions—'$' represents the response. This has the advantage that users may use pure JsonPath and be more concise. For example:

the three lines below are equivalent
Then match response $=={name: 'Billie' }
Then match response=={name: 'Billie' }
Then match $=={name: 'Billie' }
the three lines below are equivalent
Then match response.name=='Billie'
Then match response $.name=='Billie'
Then match $.name=='Billie'

And similarly for XML and XPath, '/' represents the response the four lines below are equivalent
Then match response/==<cat><name>Billie</name></cat>
Then match response/==<cat><name>Billie</name></cat>
Then match response==<cat><name>Billie</name></cat>
Then match/==<cat><name>Billie</name></cat>
the three lines below are equivalent
Then match response/cat/name=='Billie'
Then match response/cat/name=='Billie'
Then match/cat/name=='Billie' responseCookies

The responseCookies variable may be set upon any HTTP response and is a map-like (or JSON-like) object. It may be easily inspected or used in expressions.

* assert responseCookies['my.key'].value=='someValue'
karate's unified data handling means that even 'match' works
* match responseCookies contains {time: '#notnull' }
. . . which means that checking if a cookie does NOT exist is a piece of cake
* match responseCookies !contains {blah: '#notnull' }
save a response cookie for later use
* def time=responseCookies.time.value An advantage of the behavior-driven development domain specific language (DSL) framework described herein is that cookies from the previous response may be collected and passed as-is as part of the next HTTP request. This is what is normally expected and simulates a web-browser—which renders scripting code including, for example, HTML-form based authentication into test-flows a much easier, straightforward, and efficient task.

Each item within responseCookies is itself a 'map-like' object. Typically users would examine the value property as in the example above, but domain and path are also available.

responseHeaders

See also match header which is what users may need.

But if users need or desire to use values in the response headers—they will be in a variable named responseHeaders. Note that it is a 'map of lists' so users will need to do things like this:

* def contentType=responseHeaders['Content-Type'][0]

As in the responseCookies example described above, users may use match to run complex validations on the responseHeaders.

responseStatus

Users may need to use the status keyword in some embodiments. In some embodiments where users need to use the HTTP response code in an expression or save it for later, users may get it as an integer:

* def uploadStatusCode=responseStatus responseTime

The response time (in milliseconds) for every HTTP request would be available in a variable called response-Time. Users may use this to assert that the response was returned within the expected time like so:

When method post
Then status 201
And assert responseTime <1000

HTTP Header Manipulation
configure headers

Some embodiments provide pluggable custom header manipulation for all or some HTTP requests. For an HTTP request made from these embodiments, the internal flow is as follows:

did we configure the value of headers ?
if so, is the configured value a JavaScript function ?
if so, a call is made to that function.
did the function invocation return a map-like (or JSON) object ?
all the key-value pairs are added to the HTTP headers.
or is the configured value a JSON object ?
all the key-value pairs are added to the HTTP headers.

This makes setting up of complex authentication schemes for test-flows a more efficient and easier task. It typically ends up being a one-liner that appears in the Background section at the start of users' test-scripts. Users may re-use the function users create across the whole project.

Here is an example JavaScript function that uses some variables in the context (which have been possibly set as the result of a sign-in) to build the Authorization header.

In the example below, note the use of the karate object for getting the value of a dynamic variable. This is preferred because it takes care of situations such as if the value is 'undefined' in JavaScript.

```
function( ){
  var uuid=''+java.util.UUID.randomUUID( ); // convert to string
  var out={// so now the txid_header would be a unique uuid for each request
    txid_header: uuid,
    ip_header: '123.45.67.89', // hard coded here, but also may be as dynamic as desired or required
  };
  var authString='';
  var authToken=karate.get('authToken'); // use the 'karate' helper to do a 'safe' get of a 'dynamic' variable
  if (authToken) {// and if 'authToken' is not null . . .
    authString=',auth_type=MyAuthScheme'
      +',auth_key='+authToken.key
      +',auth_user='+authToken.userId
      +',auth_project='+authToken.projectId;
  }
  // the 'appId' variable here is expected to have been set via karate-config.js (bootstrap init) and will never change
  out['Authorization']='My_Auth app_id='+appId+authString;
  return out;
}
```

Assuming the above code is in a file called my-headers.js, the next section on calling other feature files shows how it looks like in action at the beginning of a test script.

Notice how once the authToken variable is initialized, it is used by the above function to generate headers for every HTTP call made as part of the test flow.

If a few steps in a flow need to temporarily change (or completely bypass) the currently-set header-manipulation scheme, just update the headers configuration value or set it to null in the middle of a script.

Code Reuse/Common Routines
call

In any complex testing endeavor, users may need 'common' code that is to be re-used across multiple test scripts. A example need includes performing a 'sign in', or create a fresh user as a pre-requisite for the scenarios being tested.

There are two types of code that may be call-ed. *.feature files and JavaScript functions.

Calling other *.feature files

When users have a sequence of HTTP calls that need to be repeated for multiple test scripts, some embodiments allow users to treat a *.feature file as a re-usable unit. Users may also pass parameters into the *.feature file being called, and extract variables out of the invocation result.

Here is an example of how to call another feature file, using the read function:

Feature: some feature
Background:
* configure headers=read('classpath:my-headers.js')
* def signIn=call read('classpath:my-signin.feature') {username: 'john', password: 'secret' }
* def authToken=signIn.authToken
Scenario: some scenario
main test steps The contents of my-signin.feature are shown below. A few points to note:

Some embodiments pass all context 'as-is' into the feature file being invoked. This means that all or at least some of the configuration variables and configure settings would be available to use, for example loginUrlBase in the example below.

Users may add (or over-ride) variables by passing a call 'argument' as shown above. Only one JSON argument is allowed, but this does not limit users in any way as users may use any complex JSON structure. Users may even initialize the JSON in a separate step and pass it by name, especially if it is complex. Observe how using JSON for parameter-passing makes things super-readable. In the 'called' feature, the argument may also be accessed using the built-in variable: _arg.

All variables that were defined (using def) in the 'called' script would be returned as 'keys' within a JSON-like object. Note that this includes 'built-in' variables, which means that things like the last value of response would also be returned. In the example above users may see that the JSON 'envelope' returned—is assigned to the variable named signIn. And then getting hold of any data that was generated by the 'called' script is as efficient as accessing it by name, for example signIn.authToken as shown above. This design has the following advantages:

'called' Karate scripts don't need to use any special keywords to 'return' data and may behave like 'normal' tests in 'stand-alone' mode if needed the data 'return' mechanism is 'safe', there is no danger of the 'called' script over-writing any variables in the 'calling' (or parent) script (unless users explicitly choose to use shared scope in some embodiments)

the need to explicitly 'unpack' variables by name from the returned 'envelope' keeps things readable and maintainable in the 'caller' script Feature: here are the contents of 'my-signin.feature'
Scenario:
Given url loginUrlBase
And request {userId: '#(username)', userPass: '#(password)' }
When method post
Then status 200
And def authToken=response
second HTTP call, to get a list of 'projects'
Given path 'users', authToken.userId, 'projects'
When method get
Then status 200
logic to 'choose' first project
And set authToken.projectId=response.projects[0].projectId;

The above example actually makes two HTTP requests—the first is a standard 'sign-in' POST and then (for illustrative purposes) another HTTP call (a GET) is made for retrieving a list of projects for the signed-in user, the first one is 'chosen' and added to the returned 'auth token' JSON object.

So users get the picture, any kind of complicated 'sign-in' flow may be scripted and re-used.

In the above example, the end-result of the call to my-signin.feature resulted in the authToken variable being initialized.

Data-Driven Features

If an argument passed to the call of a *.feature file is a JSON array, the feature is invoked for each item in the array in some embodiments. Each array element is expected to be a JSON object, and for each object—the behavior will be as described above.

In these embodiments, the return value from the call step will be a JSON array of the same size as the input array. And each element of the returned array will be the 'envelope' of variables that resulted from each iteration where the *.feature got invoked.

Here is an example that combines the table keyword with calling a *.feature. Observe how the get shortcut is used to 'distill' the result array of variable 'envelopes' into an array consisting only of response payloads.

* table kittens
|name|age|
='Bob'|2|
|'Wild'|1|
|'Nyan' |3|
* def result=call read('cat-create.feature') kittens
* def created=$result[*].response
* match each created=={id: '#number', name: '#string', age: '#number'}

* match created[*].name contains only ['Bob', 'Wild', 'Nyan']

And here is how cat-create.feature could look like:
@ignore
Feature:
Scenario:
Given url someUrlFromConfig
And path 'cats'
And request {name: '#(name)', age: '#(age)' }
When method post
Then status 200

If users replace the table with perhaps a JavaScript function call that gets some JSON data from some datasource, users may imagine how users may go about dynamic data-driven testing.

The aforementioned example demonstrates how to effectively use the unique combination of Cucumber and JsonPath that various embodiments provide.

Built-in variables for call

Although all properties in a passed JSON-like argument may be 'unpacked' into the current scope as separate 'named' variables in some embodiments, accessing the whole argument and this may be done via _arg in some embodiments. If being called in a loop, a built-in variable called _loop may also be available that will hold the value of the current loop index. In these embodiments, users may do things like this: * def name=name+_loop-, or users may use the loop index value for looking up other values that may be in scope—in a data-driven style.

Refers To
Variable
_arg the single call (or callonce) argument, will be null if there was none
_loop the current iteration index if being called in a loop, will be −1 if not Refer to this demo feature for an example: kitten-create.feature Calling JavaScript Functions Examples of defining and using JavaScript functions appear in earlier sections of this document. Being able to define and re-use JavaScript functions is a powerful capability of various embodiments described herein. For example, users may:

call re-usable functions that take complex data as an argument and return complex data that may be stored in a variable call and interoperate with Java code if needed share and re-use test utilities or 'helper' functionality across the entire organization of a user In some scripts, users may also use this capability of various embodiments to configure headers where the specified JavaScript function uses the variables that result from a sign in to manipulate headers for all subsequent HTTP requests.

The configuration 'bootstrap' routine provided by some embodiments may be a JavaScript function.

The object

A JavaScript function or expression at runtime has access to a utility object in a variable named: karate. This provides the following methods:

| Operation | Description |
|---|---|
| karate.set(name, value) | sets the value of a variable (immediately), which may be needed in case any other routines (such as the configured headers) depend on that variable this is only needed when dealing with XML and |

-continued

| Operation | Description |
|---|---|
| karate.set(name, path, value) | when users need to conditionally build elements. This may be explained via an example, and it behaves the same way as the set keyword. |
| karate.remove (name, path) | similar to the above, again very rarely used - when needing to perform conditional removal of XML nodes. |
| karate.get(name) | Behaves the same way as the remove keyword. get the value of a variable by name (or JsonPath expression), if not found - this returns null which is easier to handle in JavaScript (than undefined) |
| karate.jsonPath (json, expression) | brings the power of JsonPath into Karate-JS, and users may find an example here. |
| karate.read(filename) | read from a file, behaves exactly like read |
| karate.log(. . . args) | log to the same logger (and log file) being used by the parent process, logging may be suppressed with configure printEnabled set to false |
| karate.pretty(value) | return a 'pretty-printed', nicely indented string representation of the JSON value, also see: print |
| karate.prettyXml (value) | return a 'pretty-printed', nicely indented string representation of the XML value, also see: print |
| karate.env | gets the value (read-only) of the environment property 'karate.env', and this is typically used for bootstrapping configuration |
| karate.properties [key] | get the value of any Java system-property by name, useful for advanced custom configuration |
| karate.configure (key, value) | does the same thing as the configure keyword, and a very useful example is to do karate.configure('connectTimeout', 5000); in karate-config.js - which has the 'global' effect of not wasting time if a connection cannot be established within 5 seconds |
| karate.toBean(json, className) | converts a JSON string or map-like object into a Java bean (or POJO), given the Java class name as the second argument, refer to this file for an example |
| karate.call (fileName, [arg]) | invoke a *.feature file or a JavaScript function the same way that call works (with an optional solitary argument) for really advanced needs, users may programmatically generate a snippet of JavaScript which may be evaluated at run-time, users may find an example here for advanced users - scripts |
| karate.eval (expression) | |
| karate.tags | may introspect the tags that apply to the current scope, refer to this example: tags.feature |
| karate.tag Values | for even more advanced users - Karate natively supports tags in a @name=val1,val2 format, and there is an inheritance mechanism where Scenario level tags may over-ride Feature level tags, refer to this example: tags.feature |

JS function argument rules for call

When using call (or callonce), only one argument is allowed. But this does not limit users in any way, because similar to how users may call *.feature files, users may pass a whole JSON object as the argument. In the case of the call of a JavaScript function, users may also pass a JSON array or a primitive (string, number, boolean) as the solitary argument, and the function implementation is expected to handle whatever is passed.

Instead of using call (or callonce) in some embodiments, users may be free to call JavaScript functions 'normally' and then users may use more than one argument in some other embodiments.

* def adder=function(a, b){return a+b}
* assert adder(1, 2)==3

Return types

In some embodiments, one value may be returned. In some other embodiments, users may return a JSON object. There are two things that may happen to the returned value. Either—it may be assigned to a variable like so.

* def returnValue=call myFunction

Or—if a call is made without an assignment, and if the function returns a map-like object, it will add each key-value pair returned as a new variable into the execution context.

while this looks innocent . . .
. . . behind the scenes, it could be creating (or over-writing) a bunch of variables !
* call someFunction In the above example, this feature exists is to quickly set (or over-write) a bunch of config variables when needed. In fact, this is the mechanism used when karate-config.js is processed on start-up.

Shared Scope

This behavior where all key-value pairs in the returned map-like object get automatically added as variables—applies to the calling of *.feature files as well. In other words, when call or callonce is used without a def, the 'called' script not only shares all variables (and config) but may update the shared execution context. This is very useful to boil-down those 'common' steps that users may have to perform at the start of multiple test-scripts—into one-liners.

* def config={user: 'john', password: 'secret' }
this next line may perform many steps and result in multiple variables set for the rest of the script
* call read('classpath:common-setup.feature') config Users may use callonce rather than call in case users have multiple Scenario sections or Examples. Note the 'inline' use of the read function as a short-cut above. This applies to JS functions as well:

* call read('my-function.js')

HTTP Basic Authentication Example

Some embodiments do not provide 'out of the box' support for any particular HTTP authentication scheme. In some embodiments, the behavior-driven development domain specific language (DSL) framework is designed so that users may plug-in what the users need, without needing to compile Java code. Users may get to choose how to manage a user's environment-specific configuration values such as user-names and passwords.

First the JavaScript file, basic-auth.js:

function(creds) {
  var temp=creds.username+':'+creds.password;
  var Base64=Java.type('java.util.Base64');
  var encoded=Base64.getEncoder( ).encodeToString(temp.bytes),
  return 'Basic'+encoded;
}

And here's how it works in a test-script using the header keyword.

* header Authorization=call read('basic-auth.js') {username: 'john', password: 'secret' }

Users may set this up for all subsequent requests or dynamically generate headers for each HTTP request if a user configures headers.

Calling Java

There are examples of calling JVM classes in the section on Java Interop and in the file-upload demo.

Calling any Java code can be accomplished with ease. Given this custom, user-defined Java class:

package com.mycompany;
import java.util.HashMap;
import java.util.Map;
public class JavaDemo {
  public Map<String, Object> doWork(String fromJs) {
    Map<String, Object> map=new HashMap< >( );
    map.put("someKey", "hello"+fromJs);
    return map;
  }
}

```
public static String doWorkStatic(String fromJs) {
    return "hello"+fromJs;
}
}
```

The following example illustrates how it may be called from a test-script, and yes, even static methods may be invoked:

```
* def doWork=
"""
function(arg) {
var JavaDemo=Java.type('com.mycompany.JavaDemo');
var jd=new JavaDemo( );
return jd.doWork(arg);
}
"""

# in this case the solitary 'call' argument is of type string
* def result=call doWork 'world'
* match result=={someKey: 'hello world' }
# using a static method—observe how java interop is truly seamless !
* def JavaDemo=Java.type('com.mycompany.JavaDemo')
* def result=JavaDemo.doWorkStatic('world')
* assert result=='hello world'
```

In some embodiments, JSON may be automatically converted to Map (or List) when making the cross-over to Java.

callonce

Cucumber has a limitation where Background steps are re-run for every Scenario. And if users have a Scenario Outline, this happens for every row in the Examples. This is a problem especially for expensive, time-consuming HTTP calls, and this has been an open issue for a long time.

The callonce keyword in some embodiments behaves exactly like call but is guaranteed to execute only once. The results of the first call are cached, and any future calls will simply return the cached result instead of executing the JavaScript function (or feature) again and again.

This does require users to move 'set-up' into a separate *.feature (or JavaScript) file. But this totally makes sense for things not part of the 'main' test flow and which typically need to be re-usable anyway.

So users may indeed get the same effect as using a @BeforeClass annotation, and users may find an example in the karate-demo.

Advanced/Tricks

Polling

Waiting or performing a 'sleep' until a certain condition is met is a common need, and this demo example should get the users up and running:

polling.feature.

Conditional Logic

The keywords Given When Then are only for decoration and should not be thought of as similar to an if—then—else statement. And as a testing framework, some embodiments discourage tests that give different results on every run.

In some embodiments, if users really need or desire to implement 'conditional' checks, this may be one pattern:

```
* def filename=(zone=='zone1' ? 'test1.feature': 'test2.feature')
* def result=call read(filename)
```

And this may provide more options such as:

```
* def expected=(zone=='zone1' ? {foo: '#string' }: {bar: '#number' })
* match response==expected
```

Commonly Needed Utilities

Because of the ease and popularity of Java-interop, some embodiments do not include any random-number functions, uuid generator or date/time utilities out of the box. Users simply roll their own.

Here is an example of how to get the current date, and formatted the way users may want:

```
* def getDate=
"""
function( ) {
var SimpleDateFormat=Java.type('java.text.SimpleDateFormat');
var sdf=new SimpleDateFormat('yyyy/MM/dd');
var date=new java.util.Date( );
return sdf.format(date),
}
"""
* def temp=getDate( )
* print temp
```

Here below are a few more common examples:

Utility Recipe
System Time function( ){return java.lang.System.currentTimeMillis( )}
UUID function( ){return java.util.UUID.randomUUID( )+"}

The above is good for at least the purposes of random string generation for most situations.

GraphQL/RegEx Replacement Example

As a demonstration of the power and flexibility of various embodiments described herein, here is an example that reads a GraphQL string (which could be from a file) and manipulates it to build custom dynamic queries and filter criteria.

Here this JavaScript utility function replacer.js uses a regular-expression to replace-inject a criteria expression into the right place, given a GraphQL query.

```
function(args) {
var query=args.query;
var regex=new RegExp('\\s'+args.field+'\\s*{'); // the RegExp object is standard JavaScript
return query.replace(regex, ' '+args.field+'('+args.criteria+'){');
}
```

Once the function is declared, observe how calling it and performing the replacement is an elegant one-liner.

```
* def replacer=read('replacer.js')
# this 'base GraphQL query' would also likely be read from a file in real-life
* def query='query q {company {taxAgencies {edges {node {id, name} } } } }'
# the next line is where the criteria is injected using the regex function
* def query=call replacer {query: '#(query)', field: 'taxAgencies', criteria: 'first: 5' }
# and here is the result of the 'replace'
* assert query=='query q {company {taxAgencies(first: 5) {edges {node {id, name} } } } y
Given request {query:'#(query)' }
And header Accept='application/json'
When method post
Then status 200
* def agencies=$.data.company.taxAgencies.edges
* match agencies[0].node=={id: '#uuid', name: 'John Smith' }
```

Tags

The behavior-driven development domain specific language (DSL) framework provides a great way to sprinkle meta-data into test-scripts—which gives users some interesting options when running tests in bulk. The most common use-case would be to partition the tests into 'smoke', 'regression' and the like—which enables being able to selectively execute a sub-set of tests.

The documentation on how to run tests via the command line has an example of how to use tags to decide which tests to not run (or ignore). The Cucumber wiki has more information on tags.

For advanced users, some embodiments support being able to query for tags within a test, and even tags in a @name=value form. Refer to the karate.tags and karate.tagValues methods on the JS object.

Dynamic Port Numbers

In situations where users start an (embedded) application server as part of the test set-up phase, a typical challenge is that the HTTP port may be determined at run-time. So how may users get this value injected into the Karate configuration?

It so happens that the object has a field called properties which may read a Java system-property by name like this: karate.properties['myName']. Since the object is injected within karate-config.js on start-up, it is an efficient and effective way for other processes within the same JVM to pass configuration values into some embodiments at run-time.

The following Wiremock based unit-test code further illustrates how this may be done.

HelloWorldTest.java—see line #30
karate-config.js—see line #10
hello-world.feature—see line #6

Java API

It should be clear now that some embodiments provide a more effective and efficient way to make HTTP requests compared to how a user would have done so in Java. It is also possible to invoke a feature file via a Java API which may be very useful in some test-automation situations.

A common use case is to mix API-calls into a larger test-suite, for example a Selenium or WebDriver UI test. So users may use some embodiments to set-up data via API calls, then run the UI test-automation, and finally again use these embodiments to assert that the system-state is as expected.

There are two static methods in com.company.karate.cucumber.CucumberRunner (runFeature( ) and runClasspathFeatureQ) which may be explained in this demo unit-test: JavaApiTest.java.

Users may optionally pass in variable values or over-ride config via a HashMap or leave the second-last argument as null. The variable state after feature execution would be returned as a Map<String, Object>. The last boolean argument is whether the karate-config.js should be processed or not.

Data Driven Tests

The behavior-driven development domain specific language (DSL) framework includes the concept of Scenario Outlines where users may re-use a set of data-driven steps and assertions, and the data may be declared in a very user-friendly fashion. Observe the usage of Scenario Outline: instead of Scenario: and the new Examples: section.

Users should take a minute to compare this with the exact same example implemented in REST-assured and TestNG.

Feature: karate answers 2
Background:
url 'http://localhost:8080'
Scenario Outline: given circuit name, validate country
Given path 'api/f1/circuits<name>.json'
When method get
Then match $.MRData.CircuitTable.Circuits[0].Location.country=='<country>'
Examples:
|name|country|
|monza|Italy|
|spa|Belgium|
|sepang|Malaysia|
Scenario Outline: given race number, validate number of pitstops for Max Verstappen in 2015
Given path 'api/f1/2015/<race>/drivers/max_verstappen/pitstops.json'
When method get
Then assert response.MRData.RaceTable.Races[0].PitStops.length==<stops>
Examples:
|race|stops|
|1|1|
|2|3|
|3|2|
|4|2|

This is great for testing boundary conditions against a single end-point, with the added bonus that a test becomes even more readable. This approach may certainly enable product-owners or domain-experts who are not programmer-folk, to review, and even collaborate on test-scenarios and scripts. Again, it shall be noted that this Appendix section describes some working examples to demonstrate some capabilities of the behavior-driven development DSL framework described herein, yet these working examples are not intended to limit the scope of the behavior-driven development DSL framework described herein, unless otherwise specifically claimed.

What is claimed is:

1. A system, comprising:
a processor;
memory having instructions stored thereon which, when executed by the processor, performs an operation for testing software products or services using a behavior-driven development domain specific language (DSL) framework, the operation comprising:
a test framework stored at least partially in memory of a computing system and configured at least to identify one or more input payloads for testing a software product or service that comprises a Web service, wherein the software product or service operates on one or more application servers;
the test framework further configured to normalize data or information in at least the one or more input payloads into normalized data or information;
the test framework further configured to recursively test one or more components of the software product or service; wherein the test framework that recursively tests the one or more components is further configured to identify and apply one or more macros for testing the one or more components of the software product or service; and
the test framework further configured to generate results of testing the one or more components of the software product or service.

2. The system of claim 1, wherein the test framework recursively tests the one or more components of the software product or service, without starting at least one application server of the one or more application servers on which the software product or service executes.

3. The system of claim 1, wherein the test framework that recursively tests the one or more components is further configured to validate one or more responses of the software product or service against one or more corresponding expected responses for the one or more components of the software product or service.

4. The system of claim 3, wherein the test framework is further configured to use a single layer for testing the software product or service, to perform setup routines only once, and to perform dynamic data-driven testing for the software product or service with multi-threaded parallel execution.

5. The system of claim 1, wherein the test framework is further configured to implement one or more tests for testing the software product or service to produce a smaller codebase size with one or more statically typed, non-dynamic programming language, without using programming languages that support dynamic typing; the test framework is further configured to implement at least one test of the one or more tests using Jayway JsonPath, without using GPath; and the test framework is configured to provide a pluggable HTTP client abstraction that supports pluggable HTTP clients.

6. The system of claim 5, wherein the test framework is further configured to test one or more servlets for the software product or services at least by mocking the software product or service or a portion thereof, without using containers for the one or more servlets; and the test framework is further configured to reuse one or more HTTP integration tests without changes at least by switching a first environment to a second environment, and without checking whether one or more local ports are free.

7. The system of claim 6, wherein the test framework is further configured to validate nested objects while ignoring one or more fields in the one or more input payloads at least by using DeepEqual or randomly ordered assertions for JSON arrays or XML; the test framework is further configured to compare the one or more input payloads for equality while ignoring at least a portion of the one or more input payloads; the test framework is configured to perform data-driven testing for the software product or service, without using third-party test frameworks; and the test framework is configured to update or modify one or more JSON elements, one or more nested JSON elements, or one or more XML elements in the one or more input payloads by using at least one of one or more paths, one or more embedded expressions, or one or more built-in string replacement keywords, when the test framework is testing the software product or service.

8. The system of claim 7, wherein the test framework is further configured to test the software product or service without requiring HTTPS or SSL certificates; the test framework is further configured to switch environment configurations at least by editing a corresponding configuration file, without using dependency injection frameworks; and the test framework is configured to provide custom authentication without compilation.

9. The system of claim 8, wherein the test framework is further configured to implement XP without using non-W3C standard Xpath; the test framework is further configured to execute the one or more tests for testing the software product or service, without compiling the one or more tests; the test framework is further configured to provide native, built-in support for tags and groups without using third-party testing frameworks; and the test framework is further configured to compare two documents of heterogeneous types.

10. A computer implemented method for testing software products or services using a behavior-driven development domain specific language (DSL) framework, comprising:

identifying, at a test framework stored at least partially in memory of a computing system and functioning in conjunction with at least one microprocessor of the computing system, one or more input payloads for testing a software product or service that comprises a Web service, wherein the software product or service operates on one or more application servers;

normalizing data or information, at the test framework, in at least the one or more input payloads into normalized data or information;

recursively testing, at the test framework, one or more components of the software product or service; wherein the test framework that recursively tests the one or more components is further configured to identify and apply one or more macros for testing the one or more components of the software product or service; and generating results of testing the one or more components of the software product or service.

11. The computer implemented method of claim 10, further comprising:

recursively testing the one or more components of the software product or service, without starting at least one application server of the one or more application servers on which the software product or service executes.

12. The computer implemented method of claim 11, the act of recursively testing the one or more components further comprising:

validating one or more responses of the software product or service against one or more corresponding expected responses for the one or more components of the software product or service;

accommodating one or more tests for testing the software product or service with a single abstraction layer;

performing setup routines only once for testing the software product or service; and performing dynamic data-driven testing for the software product or service with multi-threaded parallel execution.

13. The computer implemented method of claim 10, further comprising:

implementing one or more tests for testing the software product or service to produce a smaller codebase size with one or more statically typed, non-dynamic programming language, without using programming languages that support dynamic typing;

implementing at least one test of the one or more tests using Jayway JsonPath, without using GPath; and providing a pluggable HTTP client abstraction that supports pluggable HTTP clients.

14. The computer implemented method of claim 13, further comprising:

testing one or more servlets for the software or services at least by mocking the software product or service or a portion thereof, without using containers for the one or more servlets; and reusing one or more HTTP integration tests without changes at least by switching a first environment to a second environment, and without checking whether one or more local ports are free.

15. The computer implemented method of claim 14, further comprising:

validating nested objects while ignoring one or more fields in the one or more input payloads at least by using DeepEqual or randomly ordered assertions for JSON arrays or XML;

comparing the one or more input payloads for equality while ignoring at least a portion of the one or more input payloads;

performing data-driven testing for the software product or service, without using third-party test frameworks; and updating or modifying one or more JSON elements, one or more nested JSON elements, or one or more XML elements in the one or more input payloads by using at least one of one or more paths, one or more embedded expressions, or one or more built-in string replacement keywords, when the test framework is testing the software product or service.

16. The computer implemented method of claim 15, further comprising:

testing the software product or service without requiring HTTPS or SSL certificates;

switching environment configurations at least by editing a corresponding configuration file, without using dependency injection frameworks; and providing custom authentication without compilation.

17. The computer implemented method of claim 16, further comprising:

implementing XPath without using non-W3C standard Xpath;

executing one or more tests for testing the software product or service, without compiling the one or more tests;

providing native, built-in support for tags and groups without using third-party testing frameworks; and comparing two documents of heterogeneous types.

18. A computer program product comprising a non-transitory machine readable storage medium having stored thereupon a sequence of instructions which, when executed by a mobile communication device, causes at least one computing system to perform a set of acts for testing software products or services using a behavior-driven development domain specific language (DSL) framework, the set of acts comprising:

at least one computing system identifying, at a test framework stored at least partially in memory of the at least one computing system and functioning in conjunction with at least one microprocessor of the at least one computing system, one or more input payloads for testing a software product or service that comprises a Web service, wherein the software product or service operates on one or more application servers;

the at least one computing system normalizing data or information, at the test framework, in at least the one or more input payloads into normalized data or information;

the at least one computing system recursively testing, at the test framework, one or more components of the software product or service; wherein the test framework that recursively tests the one or more components is further configured to identify and apply one or more macros for testing the one or more components of the software product or service; and the at least one computing system generating results of testing the one or more components of the software product or service.

19. The computer program product of claim 18, the set of acts further comprising:

the at least one computing system recursively testing the one or more components of the software product or service, without starting at least one application server of the one or more application servers on which the software product or service executes.

20. The computer program product of claim 19, the set of acts further comprising:

the at least one computing system validating one or more responses of the software product or service against one or more corresponding expected responses for the one or more components of the software product or service;

the at least one computing system accommodating one or more tests for testing the software product or service with a single abstraction layer;

the at least one computing system performing setup routines only once for testing the software product or service; and the at least one computing system performing dynamic data-driven testing for the software product or service with multi-threaded parallel execution.

21. The computer program product of claim 18, the set of acts further comprising:

the at least one computing system implementing one or more tests for testing the software product or service to produce a smaller codebase size with one or more statically typed, non-dynamic programming language, without using programming languages that support dynamic typing;

the at least one computing system implementing at least one test of the one or more tests using Jayway JsonPath, without using GPath; and the at least one computing system providing a pluggable HTTP client abstraction that supports pluggable HTTP clients.

22. The computer program product of claim 21, the set of acts further comprising:

the at least one computing system testing one or more servlets for the software or services at least by mocking the software product or service or a portion thereof, without using containers for the one or more servlets; and the at least one computing system reusing one or more HTTP integration tests without changes at least by switching a first environment to a second environment, and without checking whether one or more local ports are free.

23. The computer program product of claim 22, the set of acts further comprising:

the at least one computing system validating nested objects while ignoring one or more fields in the one or more input payloads at least by using DeepEqual or randomly ordered assertions for JSON arrays or XML;

the at least one computing system comparing the one or more input payloads for equality while ignoring at least a portion of the one or more input payloads;

the at least one computing system performing data-driven testing for the software product or service, without using third-party test frameworks; and the at least one computing system updating or modifying one or more JSON elements, one or more nested JSON elements, or one or more XML elements in the one or more input payloads by using at least one of one or more paths, one or more embedded expressions, or one or more built-in string replacement keywords, when the test framework is testing the software product or service.

24. The computer program product of claim 23, the set of acts further comprising:
- the at least one computing system testing the software product or service without requiring HTTPS or SSL certificates;
- the at least one computing system switching environment configurations at least by editing a corresponding configuration file, without using dependency injection frameworks; and
- the at least one computing system providing custom authentication without compilation.

25. The computer program product of claim 24, the set of acts further comprising:
- the at least one computing system implementing XPath without using non-W3C standard Xpath;
- the at least one computing system executing one or more tests for testing the software product or service, without compiling the one or more tests;
- the at least one computing system providing native, built-in support for tags and groups without using third-party testing frameworks; and
- the at least one computing system comparing two documents of heterogeneous types.

26. A system, comprising:
- a processor;
- memory having instructions stored thereon which, when executed by the processor, performs an operation for testing software products or services using a behavior-driven development domain specific language (DSL) framework, the operation comprising:
- a test framework stored at least partially in memory of a computing system and configured at least to identify one or more input payloads for testing a software product or service that comprises a Web service, wherein the software product or service operates on one or more application servers;
- the test framework further configured to normalize data or information in at least the one or more input payloads into normalized data or information;
- the test framework further configured to recursively test one or more components of the software product or service;
- the test framework is further configured to implement one or more tests for testing the software product or service to produce a smaller codebase size with one or more statically typed, non-dynamic programming language, without using programming languages that support dynamic typing; the test framework is further configured to implement at least one test of the one or more tests using Jayway JsonPath, without using GPath;
- the test framework is configured to provide a pluggable HTTP client abstraction that supports pluggable HTTP clients; and
- the test framework further configured to generate results of testing the one or more components of the software product or service.

27. A computer implemented method for testing software products or services using a behavior-driven development domain specific language (DSL) framework, comprising:
- identifying, at a test framework stored at least partially in memory of a computing system and functioning in conjunction with at least one microprocessor of the computing system, one or more input payloads for testing a software product or service that comprises a Web service, wherein the software product or service operates on one or more application servers;
- normalizing data or information, at the test framework, in at least the one or more input payloads into normalized data or information;
- recursively testing, at the test framework, one or more components of the software product or service;
- implementing, at the test framework, one or more tests for testing the software product or service to produce a smaller codebase size with one or more statically typed, non-dynamic programming language, without using programming languages that support dynamic typing; the test framework is further configured to implement at least one test of the one or more tests using Jayway JsonPath, without using GPath;
- providing, at the test framework, a pluggable HTTP client abstraction that supports pluggable HTTP clients; and
- generating results of testing the one or more components of the software product or service.

28. A computer program product comprising a non-transitory machine readable storage medium having stored thereupon a sequence of instructions which, when executed by a mobile communication device, causes at least one computing system to perform a set of acts for testing software products or services using a behavior-driven development domain specific language (DSL) framework, the set of acts comprising:
- at least one computing system identifying, at a test framework stored at least partially in memory of the at least one computing system and functioning in conjunction with at least one microprocessor of the at least one computing system, one or more input payloads for testing a software product or service that comprises a Web service, wherein the software product or service operates on one or more application servers;
- the at least one computing system normalizing data or information, at the test framework, in at least the one or more input payloads into normalized data or information;
- the at least one computing system recursively testing, at the test framework, one or more components of the software product or service;
- the at least one computing system, at the test framework, further configured to implement one or more tests for testing the software product or service to produce a smaller codebase size with one or more statically typed, non-dynamic programming language, without using programming languages that support dynamic typing; the test framework is further configured to implement at least one test of the one or more tests using Jayway JsonPath, without using GPath;
- the at least one computing system, at the test framework, configured to provide a pluggable HTTP client abstraction that supports pluggable HTTP clients; and
- the at least one computing system generating results of testing the one or more components of the software product or service.

* * * * *